(12) United States Patent
Helmstetter et al.

(10) Patent No.: US 12,030,547 B2
(45) Date of Patent: *Jul. 9, 2024

(54) STEERING WHEEL ASSEMBLY

(71) Applicants: ZF Passive Safety Systems US Inc., Washington, MI (US); ZF Automotive Germany GmbH, Aschaffenburg (DE); ZF Overseas, Inc., Valley View, OH (US)

(72) Inventors: Matthias Helmstetter, Aschaffenburg (DE); Jeff Harvey, Sterling Heights, MI (US); Christopher Baucher, Washington, MI (US); Marco Tumminello, Niedernberg (DE); Christopher Staab, Haibach (DE); Daekyo Jang, Gyeonggi-do (KR)

(73) Assignees: ZF OVERSEAS, INC., Valley View, OH (US); ZF PASSIVE SAFETY SYSTEMS US INC., Washington, MI (US); ZF AUTOMOTIVE SAFETY GERMANY GMBH, Aschaffenburg (DE)

(*) Notice: Subject to any disclaimer, the term of this patent is extended or adjusted under 35 U.S.C. 154(b) by 32 days.

This patent is subject to a terminal disclaimer.

(21) Appl. No.: 17/460,731

(22) Filed: Aug. 30, 2021

(65) Prior Publication Data

US 2021/0387660 A1  Dec. 16, 2021

Related U.S. Application Data

(63) Continuation-in-part of application No. PCT/US2021/027582, filed on Apr. 16, 2021, which
(Continued)

(51) Int. Cl.
*B62D 1/04* (2006.01)
*B60R 21/203* (2006.01)
(Continued)

(52) U.S. Cl.
CPC .............. *B62D 1/04* (2013.01); *B62D 1/06* (2013.01); *B60R 21/203* (2013.01); *B62D 1/10* (2013.01); *B62D 5/0445* (2013.01)

(58) Field of Classification Search
CPC .............. B62D 1/06; B62D 1/10; B62D 1/11; B62D 1/183; B62D 5/0445; B60R 21/203
See application file for complete search history.

(56) References Cited

U.S. PATENT DOCUMENTS 10,562,558 B1 * 2/2020 Spahn ..................... B62D 1/10
10,569,799 B2 * 2/2020 Kim ........................ B62D 1/181
(Continued)

FOREIGN PATENT DOCUMENTS

DE  102017223111 A1 * 6/2019
DE  102019205965 A1 * 10/2020 .............. B62D 1/04
(Continued)

OTHER PUBLICATIONS

USPTO Machine Translation (retrieved from FIT database) of DE 102020202146 A1, Kandler et al., Aug. 19, 2021. (Year: 2023).*
(Continued)

*Primary Examiner* — Daniel D Yabut
(74) *Attorney, Agent, or Firm* — TAROLLI, SUNDHEIM, COVELL & TUMMINO L.L.P.

(57) ABSTRACT

A steering wheel assembly for a vehicle includes a support member connectable to a vehicle steering column. A steering wheel has first and second rim portions. At least one of the first and second rim portions is pivotable about a pivot axis between a steering position and a folded position. At least one linear actuator is connected to the support member and operably connected to at least one of the first and second rim portions. Actuation of the linear actuator pivots at least one of the first and second rim portions about the pivot axis.

20 Claims, 41 Drawing Sheets

Related U.S. Application Data is a continuation of application No. 16/851,401, filed on Apr. 17, 2020, now Pat. No. 11,453,429.

(51) Int. Cl.
  *B62D 1/06* (2006.01)
  *B62D 1/10* (2006.01)
  *B62D 5/04* (2006.01)

(56) References Cited

U.S. PATENT DOCUMENTS

| | | | | |
|---|---|---|---|---|
| 11,453,429 | B2* | 9/2022 | Helmstetter | B62D 1/04 |
| 2016/0325662 | A1* | 11/2016 | Nash | B62D 1/04 |
| 2017/0297606 | A1 | 10/2017 | Kim et al. | |
| 2018/0334183 | A1* | 11/2018 | Beauregard | B62D 1/06 |
| 2019/0071113 | A1* | 3/2019 | Board | B62D 1/14 |
| 2019/0291772 | A1* | 9/2019 | Kreutz | B62D 1/10 |
| 2019/0308655 | A1* | 10/2019 | Ochi | B62D 1/10 |
| 2021/0031822 | A1* | 2/2021 | Watanabe | B62D 1/187 |

FOREIGN PATENT DOCUMENTS

| | | | | |
|---|---|---|---|---|
| DE | 102019134898 A1 | | 6/2021 | |
| DE | 102020202146 A1 | * | 8/2021 | |
| EP | 3800108 A1 | * | 4/2021 | B62D 1/06 |
| EP | 3800109 A1 | * | 4/2021 | B62D 1/06 |
| FR | 2965536 A1 | * | 4/2012 | B62D 1/183 |
| WO | WO-2017060149 A1 | * | 4/2017 | B60R 21/09 |

OTHER PUBLICATIONS

USPTO Machine Translation (retrieved from FIT database) of DE 102019205965 A1, Ory, Oct., 29, 2020. (Year: 2023).*
Supplementary European Search Report for corresponding European Application Serial No. EP21788041, dated Mar. 28, 2024, pp. 1-2.

* cited by examiner

STEERING WHEEL ASSEMBLY

RELATED APPLICATIONS

This application is a continuation-in-part of PCT/US21/27582, filed Apr. 16, 2021, and claiming priority from U.S. patent application Ser. No. 16/851,401, filed Apr. 17, 2020, the subject matter of which are incorporated herein by reference in their entirety.

FIELD OF THE INVENTION

The present invention relates to a steering wheel assembly for a vehicle. More particularly, the present invention relates to a steering wheel assembly for a vehicle having a steering wheel that is movable between a steering position and a folded position.

BACKGROUND OF THE INVENTION

Certain vehicles are capable of switching between a driver operating mode in which the driver operates the vehicle and an autonomous operating mode in which the vehicle operates with little or no driver input. In vehicles that are switchable between driver and autonomous operating modes, a steering wheel of the vehicle typically remains in the same position regardless of what operating mode the vehicle is in.

SUMMARY OF THE INVENTION

According to an aspect of the invention, alone or in combination with any other aspect, a steering wheel assembly for a vehicle includes a support member connectable to a vehicle steering column. A steering wheel has first and second rim portions. At least one of the first and second rim portions is pivotable about a pivot axis between a steering position and a folded position. At least one linear actuator is connected to the support member and operably connected to at least one of the first and second rim portions. Actuation of the linear actuator pivots at least one of the first and second rim portions about the pivot axis.

According to another aspect, alone or in combination with any other aspect, the at least one linear actuator can be operably connected to the first and second rim portions. Actuation of the at least one linear actuator can pivot the first rim portion about a first pivot axis and the second rim portions about a second pivot axis. The first and second pivot axes can extend generally parallel to each other and transverse to a steering axis of the steering wheel.

According to another aspect, alone or in combination with any other aspect, the at least one linear actuator can be operably connected to only the second rim portion. The second rim portion can be pivotable by the at least one linear actuator about the pivot axis. The first rim portion may not be pivotable.

According to another aspect, alone or in combination with any other aspect, the at least one linear actuator can be operably connected to both the first and second rim portions of the steering wheel. Actuation of the linear actuator can pivot the first and second rim portions together as a single unit about a single pivot axis.

According to another aspect, alone or in combination with any other aspect, the at least one linear actuator can pivot the entirety of the steering wheel about a single pivot axis.

BRIEF DESCRIPTION OF THE DRAWINGS

The foregoing and other features of the invention will become apparent to one skilled in the art to which the invention relates upon consideration of the following description of the invention with reference to the accompanying drawings, in which.

DETAILED DESCRIPTION OF THE INVENTION

Figure 1:
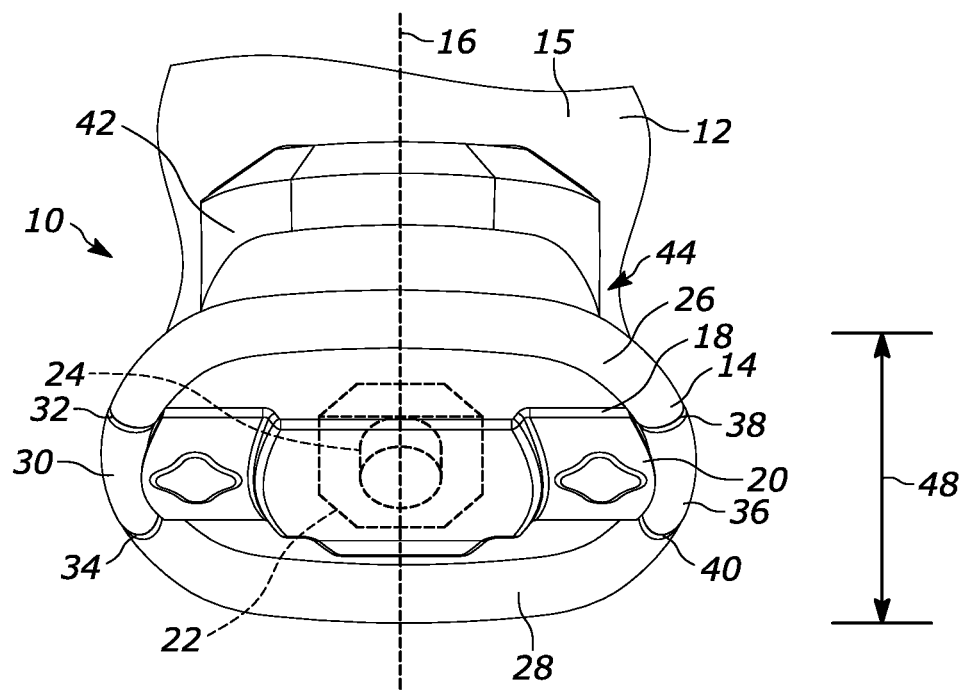
FIG. 1 is a front view of a steering wheel assembly having a steering wheel in a first position.

FIG. 1 illustrates a steering wheel assembly 10 for a vehicle 12. The steering wheel assembly 10 includes a steering wheel 14 connected to a steering column that extends through a dashboard or support surface 15 of the vehicle 12. The steering wheel 14 is rotatable about a steering axis 16 relative to the dashboard or support surface 15. The steering wheel assembly 10 also includes an airbag module 18. The airbag module may be connected to the steering wheel 14 in any desired manner. The airbag module 18 has a housing 20, an airbag 22 and an inflator 24. The airbag 22 is inflatable from a stored condition in which the airbag is stored in the housing 20 to a deployed condition in which the airbag is positioned between a vehicle occupant and the steering wheel 14. The inflator 24 is in the housing 20 and configured to provide inflation fluid to the airbag 22 to inflate the airbag from the stored condition to the deployed condition.

During operation of the vehicle 12, a vehicle occupant can turn the steering wheel 14 to operate and steer the vehicle. However, there may be periods in which use of the steering wheel 14 is not required, such as when the vehicle 12 is being driven autonomously (i.e., with little or no occupant input) or when the vehicle is parked. During these periods of non-use, the steering wheel 14 can be moved from a steering position to a folded position.

As shown in FIG. 1, in the steering position, the steering wheel 14 can have a generally rounded configuration. The steering wheel 14, in the steering position, has a first or upper rim portion 26 and a second or lower rim portion 28. A first central rim portion 30 extends between first ends 32, 34 of the first and second rim portions 26, 28. A second central rim portion 36 extends between second ends 38, 40 of the first and second rim portions 26, 28. Alternatively, the first and second central rim portions 30, 36 can be formed as one piece with the first rim portion 26 and/or the second rim portion 28. The first and second rim portions 26, 28 extend transverse to the steering axis 16 when in the steering position.

Figure 2:
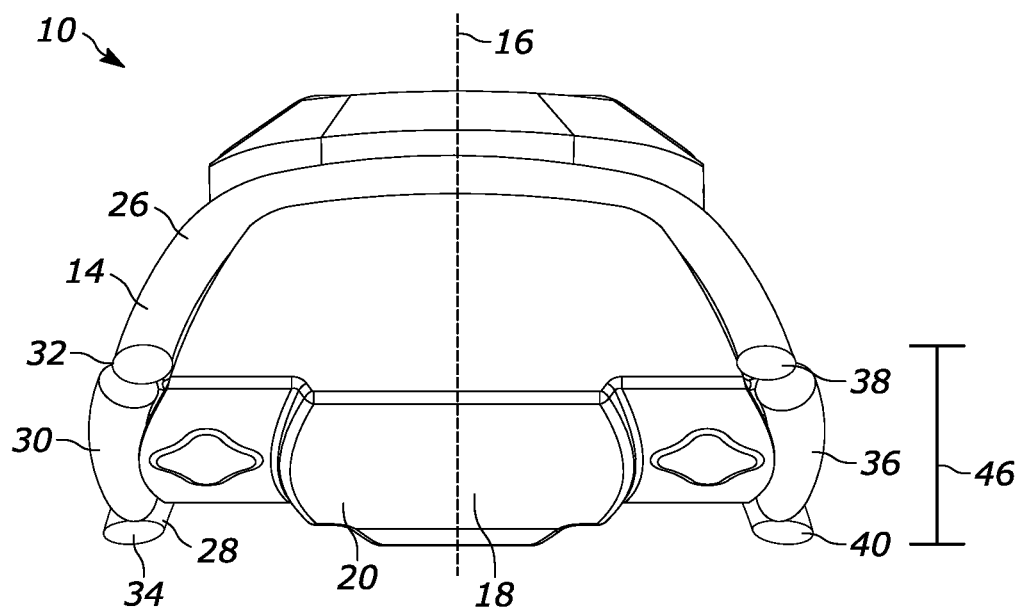
FIG. 2 is a front view of the steering wheel assembly of FIG. 1 having the steering wheel in a second position.

As shown in FIG. 2, when the steering wheel 14 is in the folded position, the first and second rim portions 26, 28 extend generally parallel to and/or in the same general direction as the steering axis 16. When the steering wheel 14 is in the folded position, the first rim portion 26 extends into a first receiving portion 42 in the housing 20 and the second rim portion 28 extends into a second receiving portion 44 in the housing. During the periods of non-use of the steering wheel 14, the first and second rim portions 26, 28 can be moved away from the vehicle occupant so that the vehicle occupant has more space within the vehicle 12 than when the steering wheel is in the steering position. The steering wheel 14, when in the folded position, has a first height 46 measured in a direction transverse to the steering axis 16 (FIG. 2). The steering wheel 14, when in the steering position, has a second height 48 measured in the direction transverse to the steering axis 16 (FIG. 1). The height 46 is less than the height 48. Alternatively, the height 46 can be greater than or equal to the height 48. Once the steering wheel 14 has been moved to the folded position, the steering wheel can be moved toward and/or into the dashboard or support surface 15 through which the steering wheel extends to provide additional space for the vehicle occupant that would otherwise be unavailable.

Figure 3:
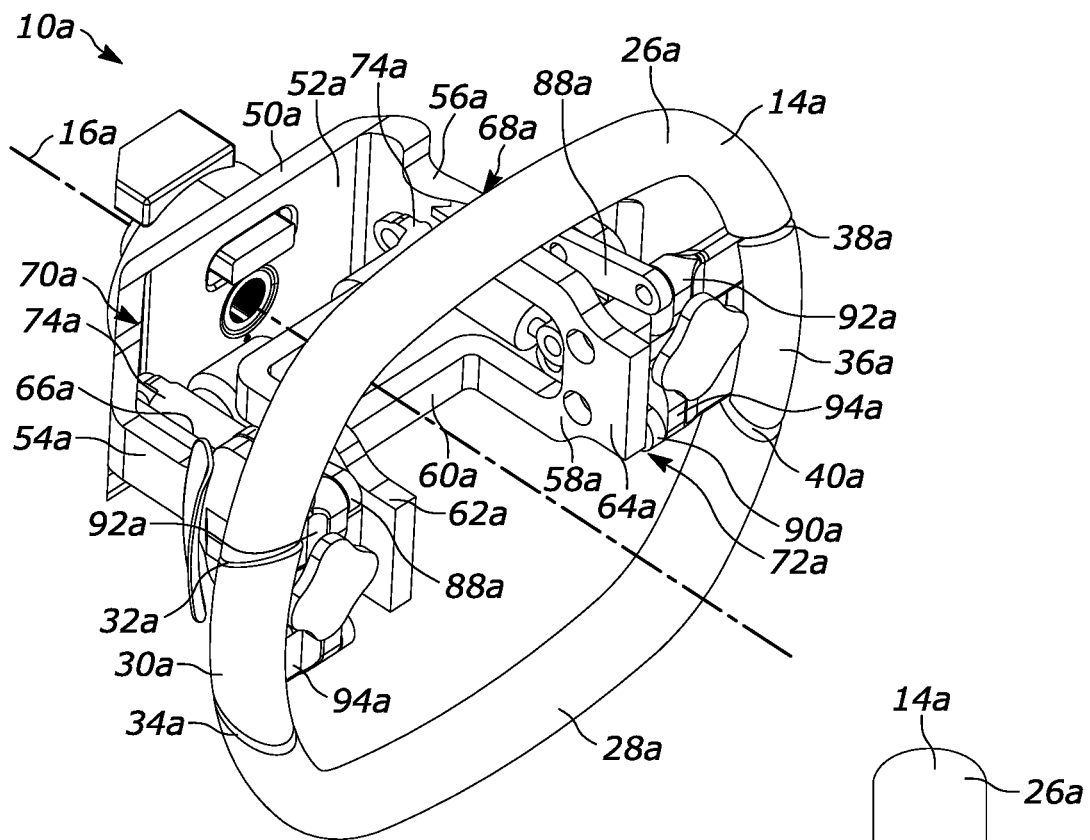
FIG. 3 is a partial perspective view of an example configuration of the steering wheel assembly of FIG. 1, including the steering wheel in the first position.
Figure 4:
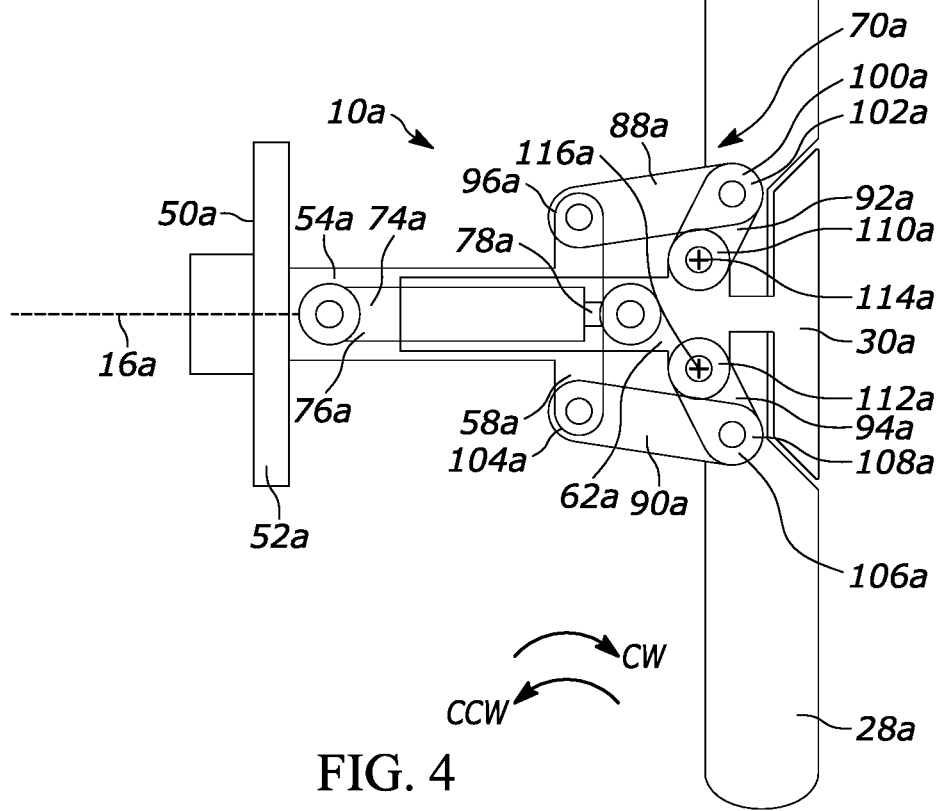
FIG. 4 is a schematic side view of the example configuration of the steering wheel assembly of FIG. 3, including the steering wheel in the first position.
Figure 57:
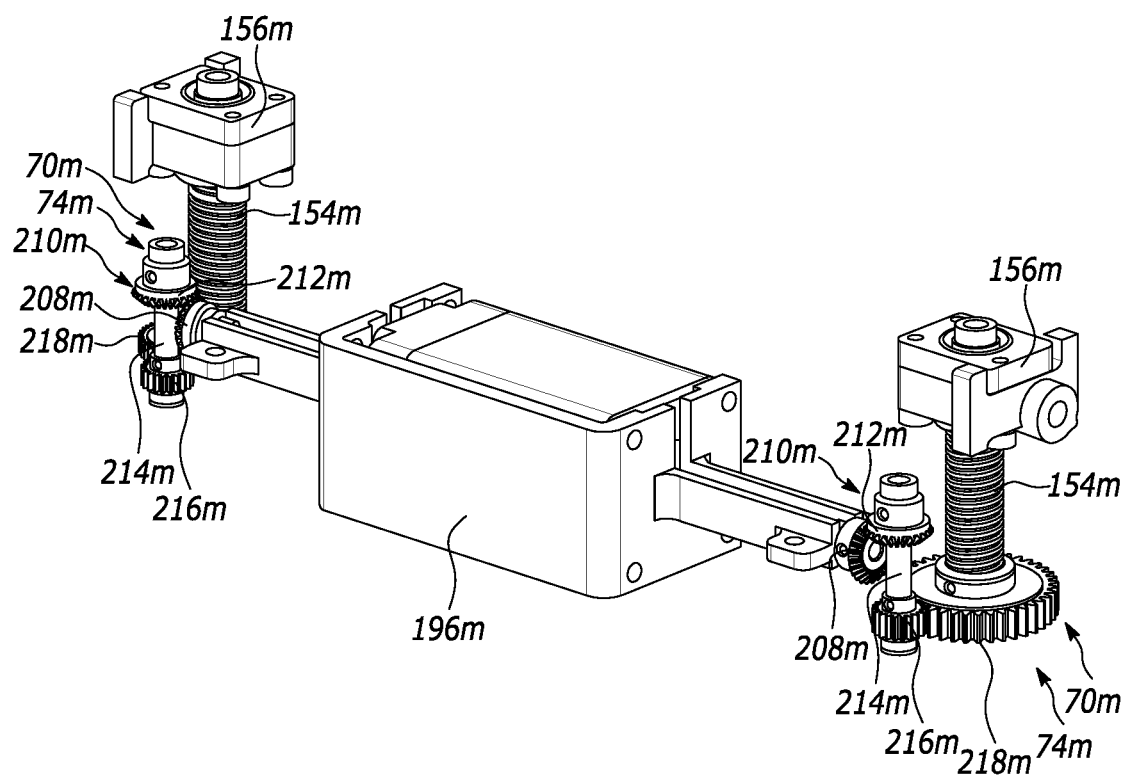
FIG. 57 is a schematic perspective top view of a portion of the steering wheel assembly of FIG. 54.

FIGS. 3-57 depict example steering wheel assemblies configured to move a steering wheel between steering and folded positions. The example steering wheel assemblies are not necessarily exclusive of each other. Certain features can be shared and/or combined between the example steering wheel assemblies whether expressly stated, shown, or not. Common elements shared between the example steering wheel assemblies may be unnumbered in certain Figures or may have the same reference numbers with the addition of an associated alphabetical mark. Description of common elements may not be repeated for brevity. Further, the airbag module 18 has not been depicted in the example steering wheel assemblies of FIGS. 3-57 for clarity.

FIGS. 3-7 depict an example steering wheel assembly 10a. The steering wheel assembly 10a includes a support member 50a having a base portion 52a connectable to a steering column that extends through the dashboard or support surface 15. First and second support arms 54a, 56a extend from the base portion. The first and second support arms 54a, 56a extend generally parallel to each other and the steering axis 16. First and second rim portions 26a, 28a of a steering wheel 14a have first ends 32a, 34a connected to the first support arm 54a by links 88a, 90a. Second ends 38a, 40a of the first and second rim portions 26a, 28a are connected to the second support arm 56a by other links 88a, 90a.

First and second central rim portions 30a, 36a of the steering wheel 14a can be connected to a carriage 58a. The carriage 58a includes a base portion 60a and first and second carriage arms 62a, 64a that extend from the base portion. The first and second carriage arms 62a, 64a extend generally parallel to each other and the steering axis 16. The first carriage arm 62a has a first extension 61a connected thereto that extends generally parallel to the first carriage arm. The first extension 61a slides in a first guide channel 66a on the first support arm 54a. The second carriage arm 64a has a second extension 63a connected thereto that extends generally parallel to the second carriage arm. The second extension 63a slides in a second guide channel 68a on the second support arm 56a. The first and second guide channels 66a, 68a guide linear movement of the carriage 58a relative to the support member 50a.

Figure 5:
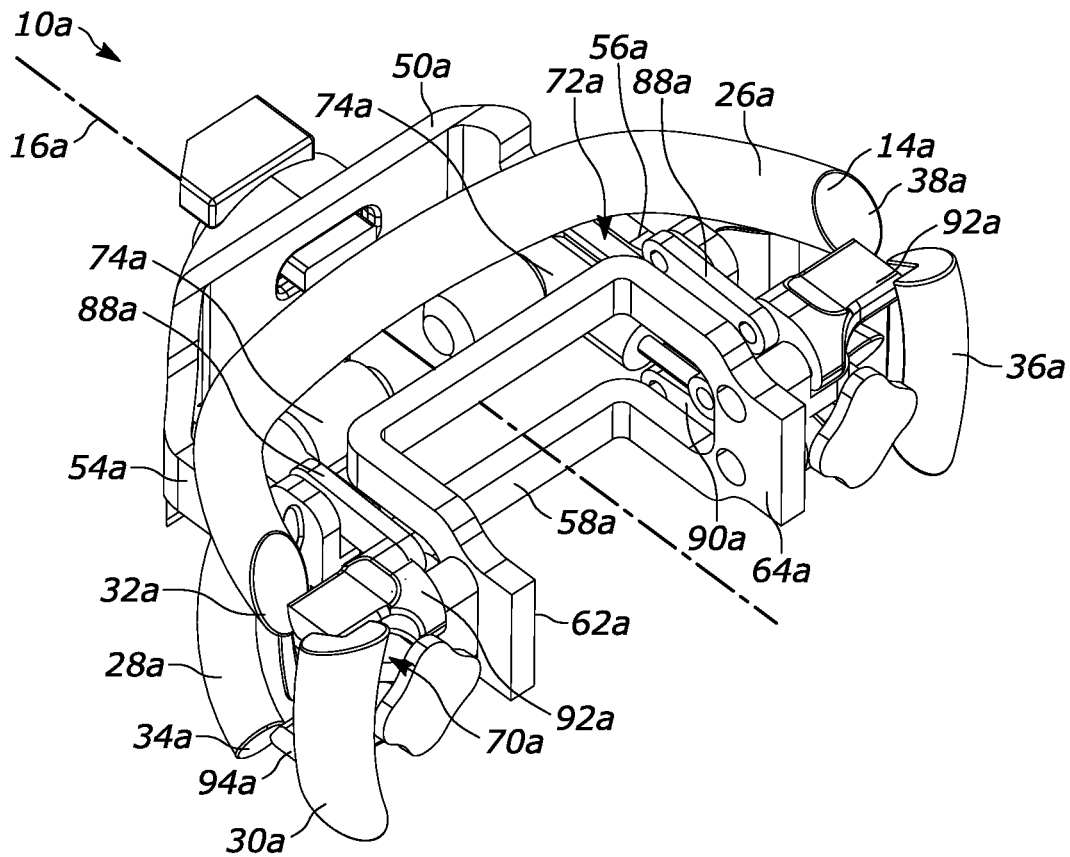
FIG. 5 is a partial perspective view of the example configuration of the steering wheel assembly of FIG. 3, including the steering wheel in the second position.
Figure 6:
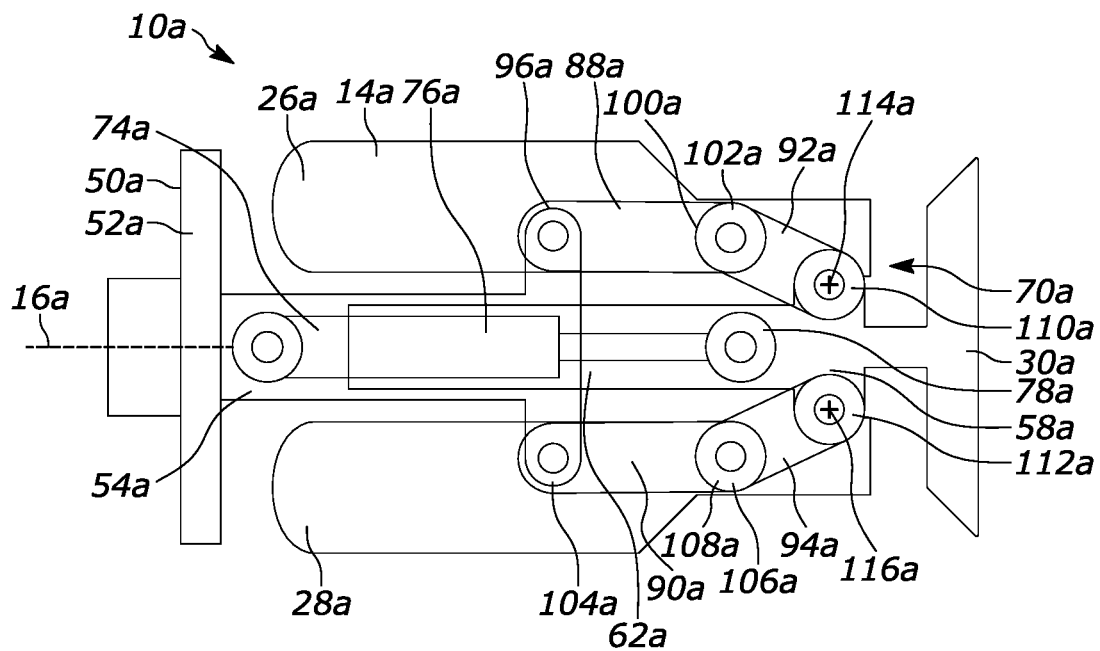
FIG. 6 is a schematic side view of the example configuration of the steering wheel assembly of FIG. 5, including the steering wheel in the second position.
Figure 7:
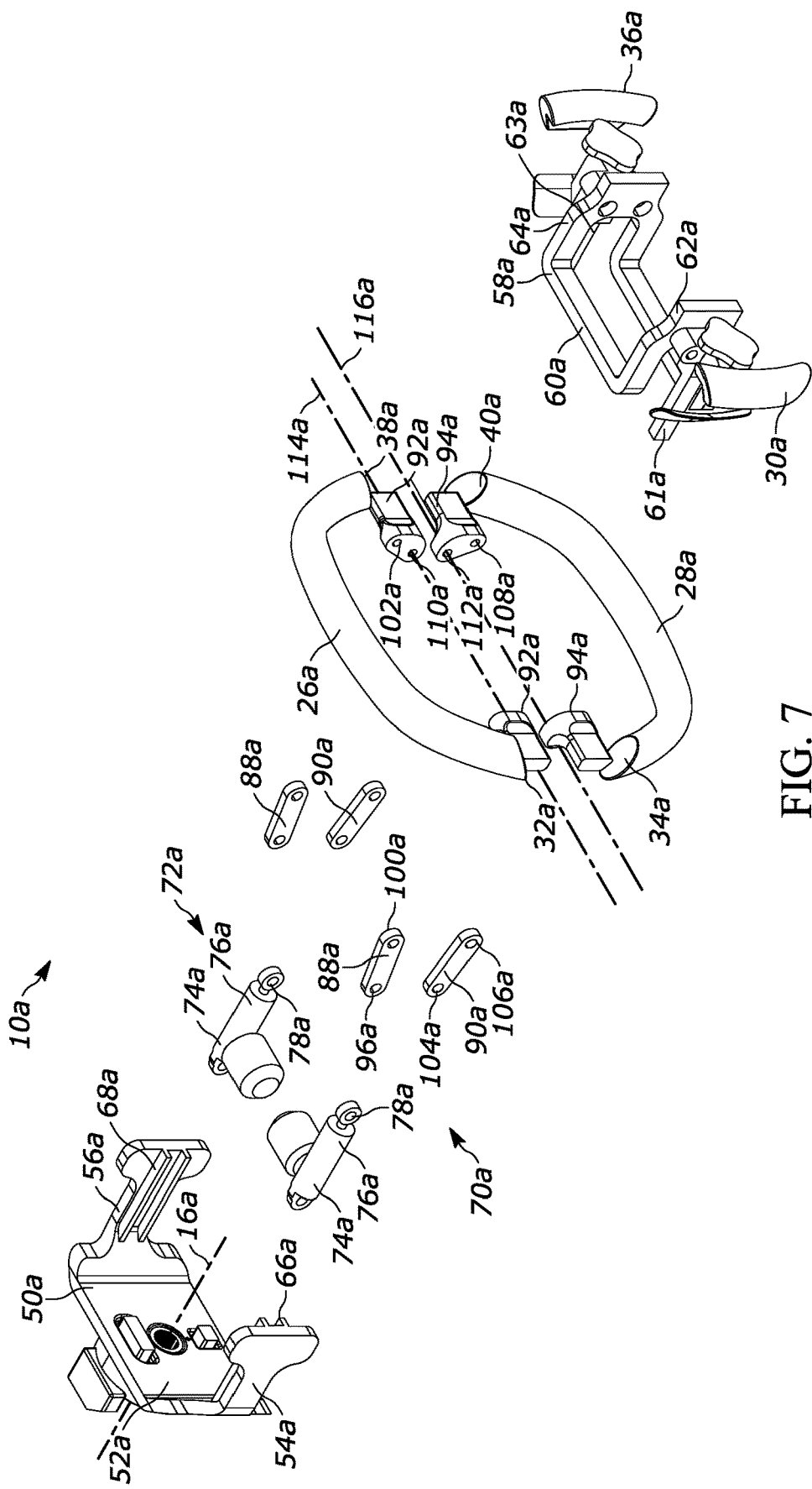
FIG. 7 is an exploded view of the steering wheel assembly of FIG. 3.

The steering wheel 14a can be moved between the steering and folded positions by switching portions 70a, 72a of the steering wheel assembly 10a. As shown in FIGS. 3 and 5, the steering wheel assembly 10a has a first switching portion 70a adjacent the first support arm 54a. A second switching portion 72a is adjacent the second support arm 56a. The first and second switching portions 70a, 72a mirror one another and operate in a similar manner. Thus, for the sake of brevity, only the first switching portion 70a will be described below.

As shown in FIGS. 3-7, the first switching portion 70a includes a linear actuator 74a having a mounting portion 76a and a driving portion 78a. The mounting portion 76a is connected to the first support arm 54a. The driving portion 78a is linearly movable within the mounting portion 76a relative to the mounting portion and to the support member 50a. The driving portion 78a is connected to the first carriage arm 62a. As shown in FIGS. 3-7, the driving and mounting portions 78a, 76a of the linear actuator 74a can be a piston rod and a cylinder, respectively. The linear actuator 74a can be electrically, hydraulically, and/or pneumatically powered. The linear actuator 74a can be electrically connected to a controller that actuates the linear actuator when the vehicle occupant desires and/or when certain vehicle conditions are met, such as when the vehicle 12 is parked.

A first end 96a of the first link 88a is pivotably connected to the first support arm 54a. A second end 100a of the first link 88a is pivotably connected to a first end 102a of a first pivot extension 92a. The first pivot extension 92a is on the first end 32a of the first rim portion 26a. The first pivot extension 92a can be formed as one piece with the first rim portion 26a.

A first end 104a of the second link 90a is pivotably connected to the first support arm 54a. A second end 106a of the second link 90a is pivotably connected to a first end 108a of a second pivot extension 94a. The second pivot extension 94a is on the first end 34a of the second rim portion 28a. The second pivot extension 94a can be formed as one piece with the second rim portion 28a. Second ends 110a, 112a of the first and second pivot extensions 92a, 94a are pivotably connected to the first carriage arm 62a.

As shown in FIGS. 3-6, with the steering wheel 14a in the steering position, actuation of the linear actuator 74a causes the first and second rim portions 26a, 28a to pivot relative to the support member 50a from the steering position to the folded position. Upon actuation of the linear actuator 74a, the driving portion 78a linearly moves relative to the mounting portion 76a away from the base portion 52a of the support member 50a. The driving portion 78a linearly moves the carriage 58a away from the base portion 52a relative to the support member 50a. The linearly moving carriage 58a causes the first pivot extension 92a to pivot in a counterclockwise direction CCW relative to the second end 100a of the first link 88a. The linearly moving carriage 58a also causes the second pivot extension 94a to pivot in a clockwise direction CW relative to the second end 106a of the second link 90a.

As the first pivot extension 92a pivots relative to the first link 88a, the first rim portion 26a pivots in the counterclockwise direction CCW relative to the carriage 58a from the steering position to the folded position. The first rim portion 26a pivots about a first pivot axis 114a relative to the carriage 58a. As the second pivot extension 94a pivots relative to the second link 90a, the second rim portion 28a pivots in the clockwise direction CW relative to the carriage 58a from the steering position to the folded position. The second rim portion 28a pivots about a second pivot axis 116a relative to the carriage 58a. The first and second pivot axes 114a, 116a extend generally parallel to each other and transverse to the steering axis 16a.

The linear actuator 74a can be actuated to reverse the above described process and cause the first and second rim portions 26a, 28a to pivot about the first and second pivot axes 114a, 116a, respectively, relative to the carriage 58a from the folded position to the steering position.

Although not shown in FIGS. 3-7, the housing 20, the airbag 22 and/or the inflator 24 can be connected to the carriage 58a so that linear motion of the carriage moves the housing, the airbag and/or the inflator relative to the support member 50a.

FIGS. 8-12 depict another example steering wheel assembly 10b. The support member 50b of the steering wheel assembly 10b is substantially similar to the support member 50a of steering wheel assembly 10a. However, the support member 50b includes a central portion 118b that extends between the first and second support arms 54b, 56b. Portions of the airbag module 18 may fixedly connected to the central portion 118b of the support member 50b. Further, the support member 50b does not include first and second guide channels 66a, 66b.

Pivot extensions 92b, 94b on first ends 32b, 34b of first and second rim portions 26b, 28b of a steering wheel 14b are pivotably connected to the first support arm 54b. Pivot extensions 92b, 94b on second ends 38b, 40b of the first and second rim portions 26b, 28b are pivotably connected to the second support arm 56b. A first central rim portion 30a is connected to the first support arm 54b. A second central rim portion 36b is connected to the second support arm 56b.

Figure 8:
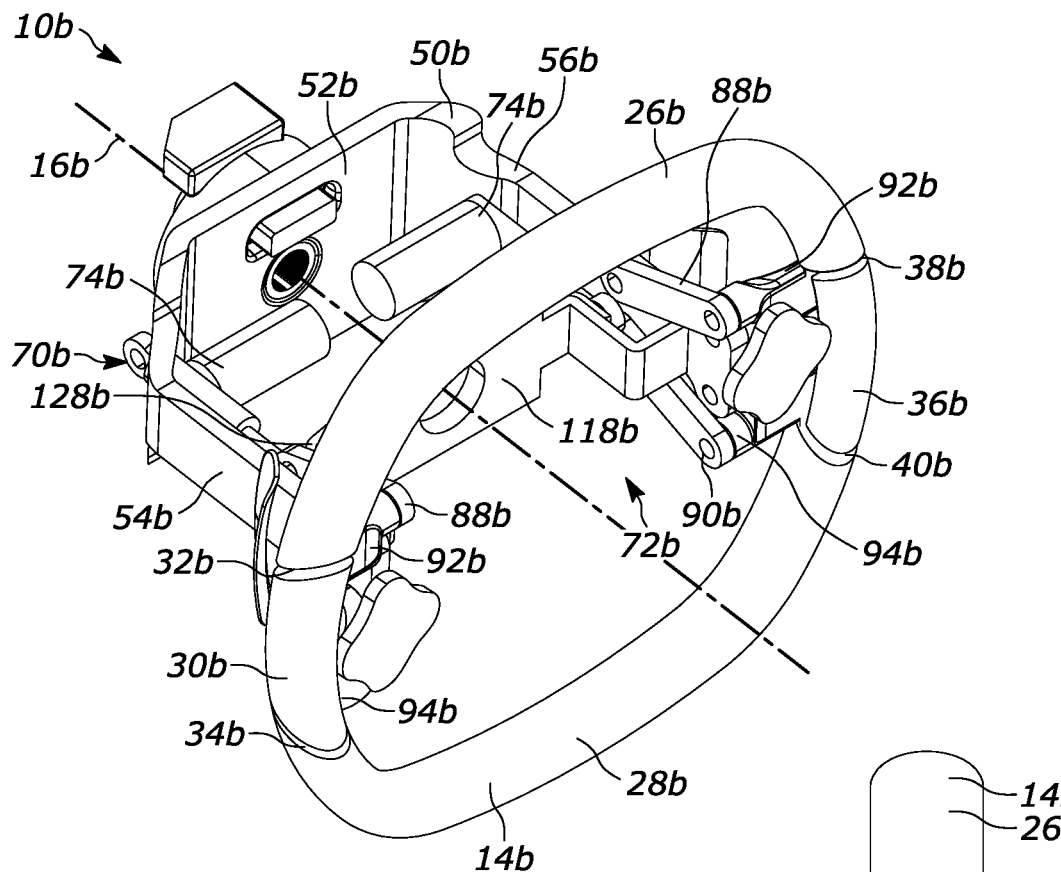
FIG. 8 is a partial perspective view of an example configuration of the steering wheel assembly of FIG. 1, including the steering wheel in the first position.
Figure 9:
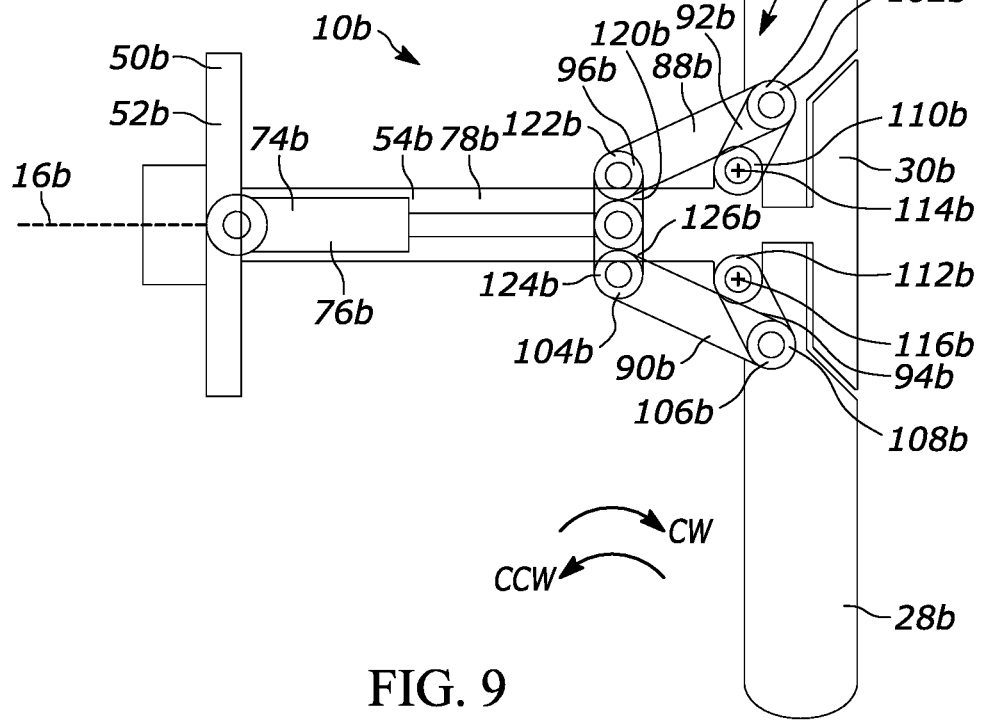
FIG. 9 is a schematic side view of the example configuration of the steering wheel assembly of FIG. 8, including the steering wheel in the first position.
Figure 10:
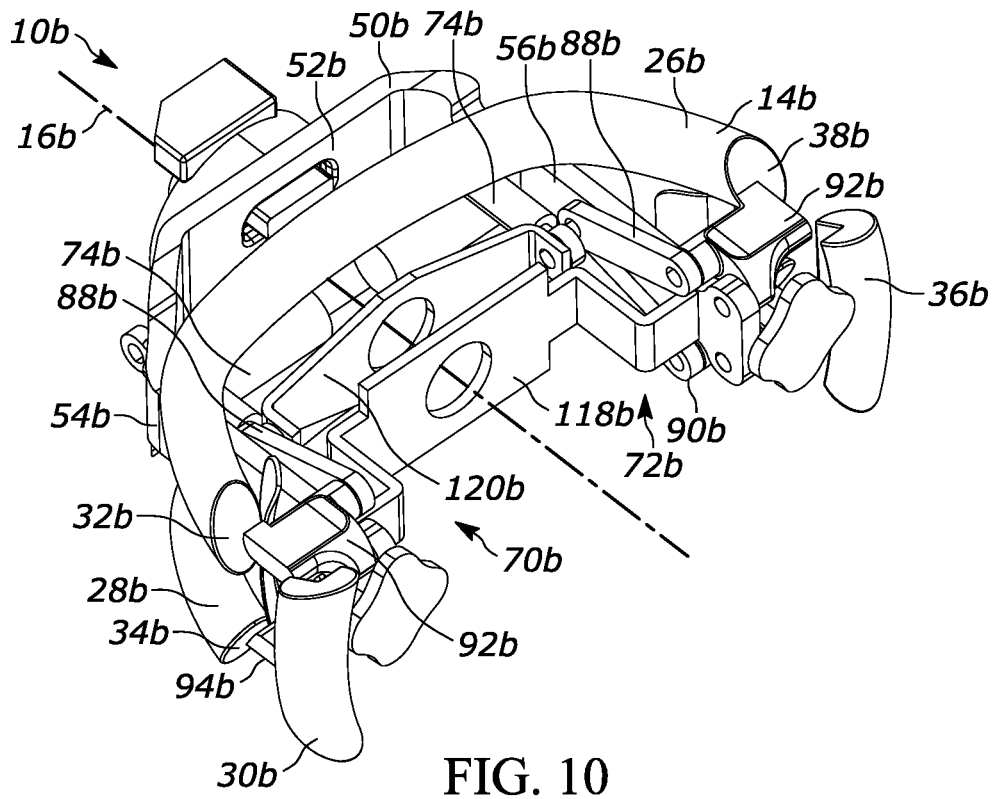
FIG. 10 is a partial perspective view of the example configuration of the steering wheel assembly of FIG. 8, including the steering wheel in the second position.
Figure 11:
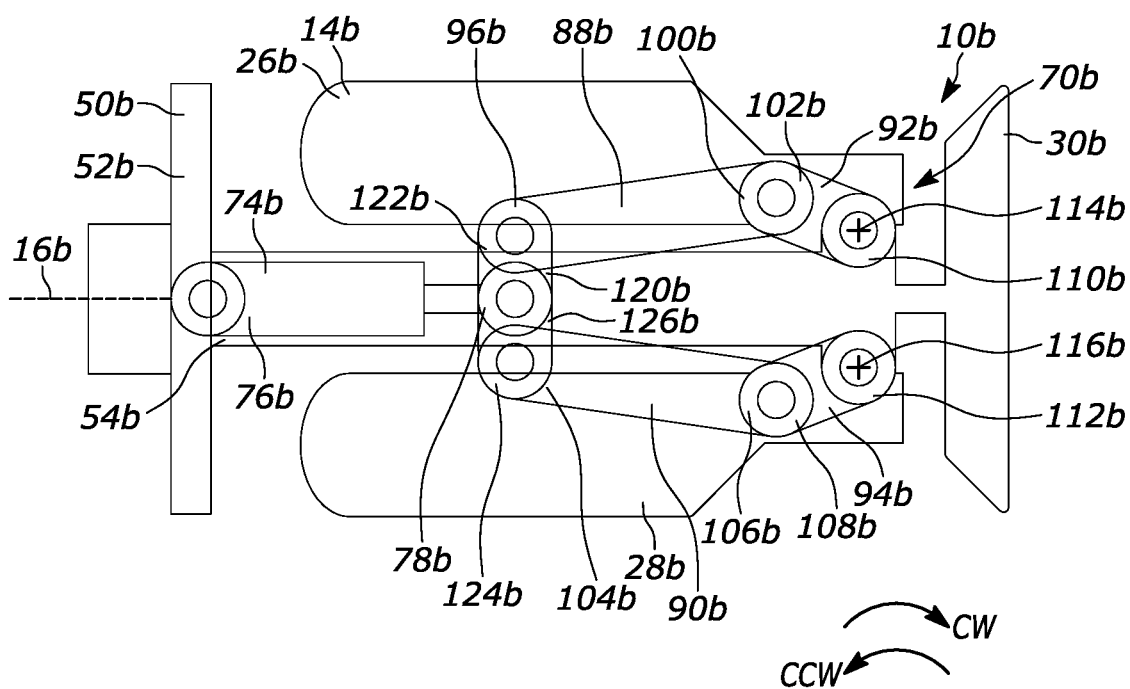
FIG. 11 is a schematic side view of the example configuration of the steering wheel assembly of FIG. 10, including the steering wheel in the second position.
Figure 12:
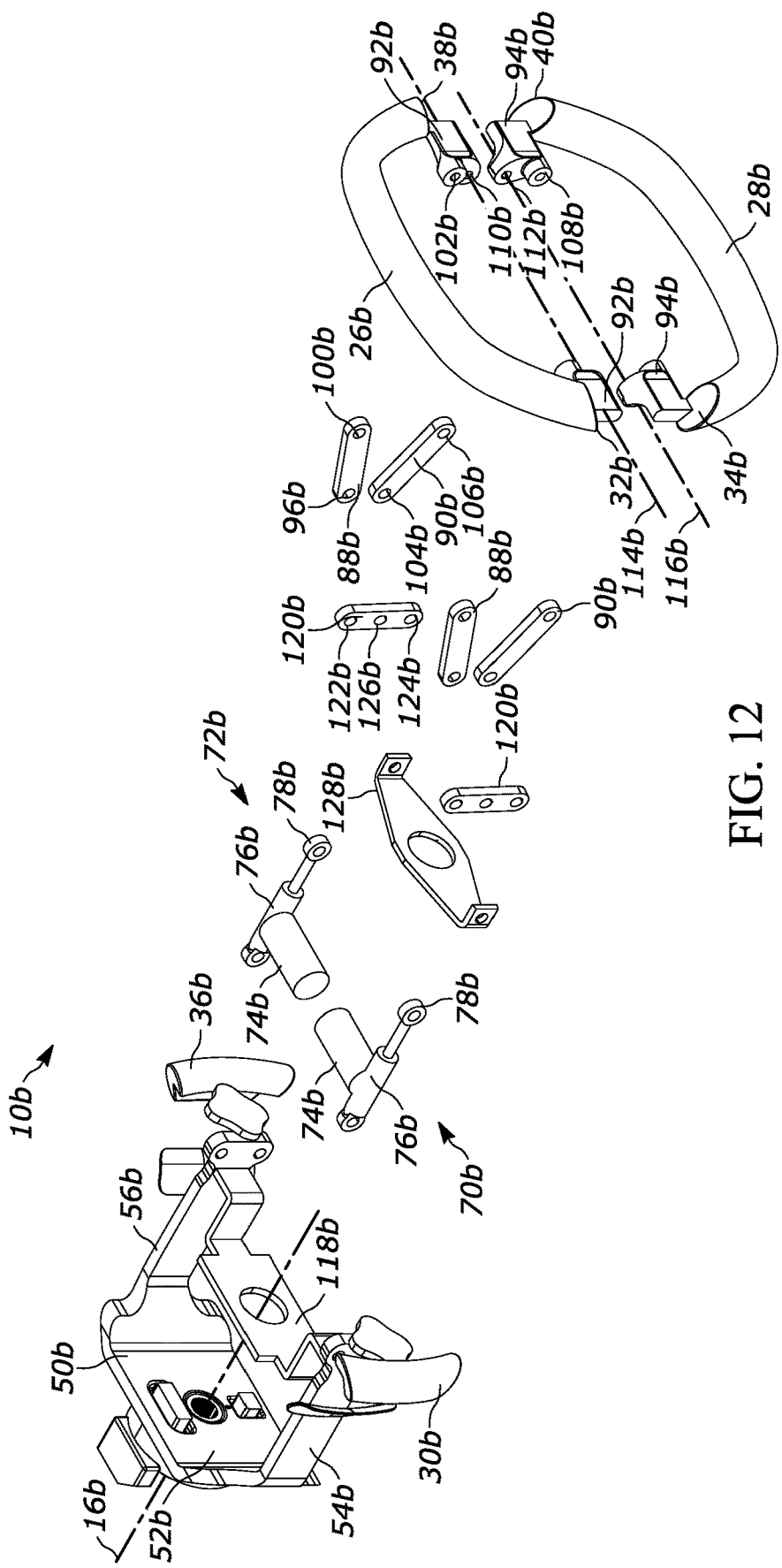
FIG. 12 is an exploded view of the steering wheel assembly of FIG. 8.

The steering wheel 14b can be moved between the steering and folded positions by switching portions 70b, 72b of the steering wheel assembly 10b. As shown in FIGS. 8 and 10, the steering wheel assembly 10b has a first switching portion 70b adjacent the first support arm 54b and a second switching portion 72b adjacent the second support arm 56b. The first and second switching portions 70b, 72b mirror one another and operate in a similar manner. Thus, for the sake of brevity, only the first switching portion 70b will be described below.

As shown in FIGS. 8-12, the first switching portion 70b includes a linear actuator 74b having a mounting portion 76b and a driving portion 78b. The mounting portion 76b is connected to the support member 50b. The driving portion 78b is operably connected to the first and second rim portions 26b, 28b.

A first end 96b of a first link 88b is pivotably connected to a first end 122b of a connecting link 120b. A second end 100b of the first link 88b is pivotably connected to a first end 102b of the first pivot extension 92b. A first end 104b of a second link 90b is pivotably connected to a second end 124b of the connecting link 120b. A second end 106b of the second link 90b is pivotably connected to a first end 108b of the second pivot extension 94b. Second ends 110b, 112b of the first and second pivot extensions 92b, 94b are pivotably connected to the first support arm 54b. The connecting link 120b has a central portion 126b that is connected to the linear actuator 74b. Alternatively, the connecting link 120b can be omitted and the first ends 96b, 104b of the first and second links 88b, 90b can be connected directly to the driving portion 78b of the linear actuator 74b.

The steering wheel assembly 10b can also include a switching portion connector 128b that extends between and interconnects the driving portions 78b of the linear actuators 74b. The switching portion connector 128b is linearly movable by the linear actuators 74b relative to the support member 50b. The switching portion connector 128b helps ensure that the driving portions 78b of the linear actuators 74b move together when actuated.

As shown in FIGS. 8-11, with the steering wheel 14b in the steering position, actuation of the linear actuator 74b causes the first and second rim portions 26b, 28b to pivot relative to the support member 50b from the steering position to the folded position. Upon actuation of the linear actuator 74b, the driving portion 78b linearly moves relative to the mounting portion 76b toward the base portion 52b of the support member 50b. The driving portion 78b linearly moves the switching portion connector 128b and the connecting link 120b toward the base portion 52b relative to the support member 50b. The first and second links 88b, 90b move toward the base portion 52b with the connecting link 120b when the linear actuator 74b is actuated. The first pivot extension 92b pivots in the counterclockwise direction CCW relative to the support member 50b. The second pivot extension 94b pivots in the clockwise direction CW relative to the support member 50b.

As the first pivot extension 92b pivots relative to the support member 50b, the first rim portion 26b pivots in the counterclockwise direction CCW relative to the support member 50b from the steering position to the folded position. The first rim portion 26b pivots about a first pivot axis 114b relative to the support member 50b. As the second pivot extension 94b pivots relative to the support member 50b, the second rim portion 28b pivots in the clockwise direction CW relative to the support member 50b from the steering position to the folded position. The second rim portion 28b pivots about a second pivot axis 116b relative to the support member 50b. The first and second pivot axes 114b, 116b extend generally parallel to each other and transverse to the steering axis 16b.

The linear actuator 74b can be actuated to reverse the above described process and cause the first and second rim portions 26b, 28b to pivot about the first and second pivot axes 114b, 116b, respectively, relative to the support member 50b from the folded position to the steering position.

FIGS. 13-17 depict another example steering wheel assembly 10c. The support member 50c of the steering wheel assembly 10c is substantially similar to the support member 50b of steering wheel assembly 10b. However, the central portion 118c extends from the base portion 52c of the support member 50c instead of between the first and second support arms 54c, 56c. Portions of the airbag module 10 may fixedly connected to the central portion 118c of the support member 50c.

Pivot extensions 92c, 94c on first ends 32c, 34c of the first and second rim portions 26c, 28c of a steering wheel 14c are pivotably connected to the first support arm 54c. Pivot extensions 92c, 94c on second ends 38c, 40c of the first and second rim portions 26c, 28c are pivotably connected to the second support arm 56c. A first central rim portion 30c is connected to the first support arm 54c. A second central rim portion 36c is connected to the second support arm 56c.

Figure 13:
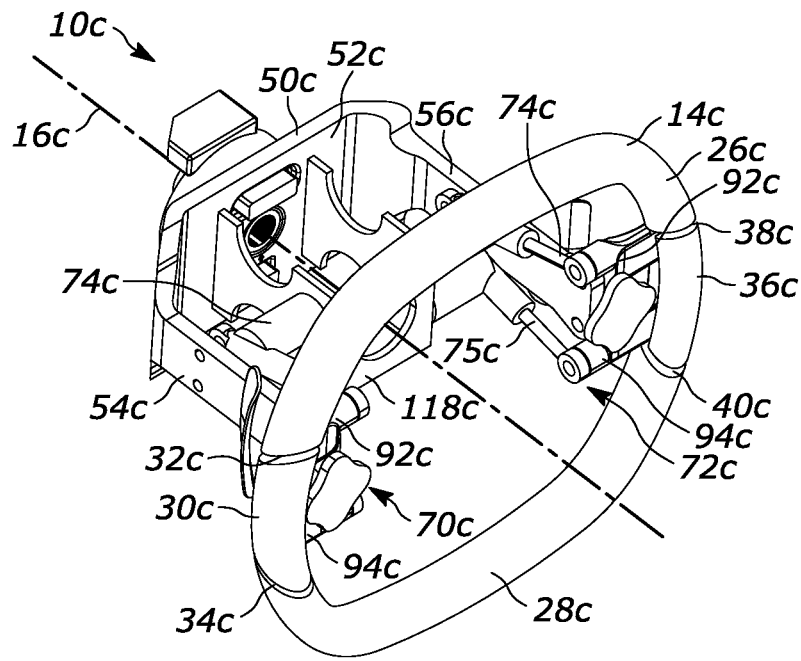
FIG. 13 is a partial perspective view of an example configuration of the steering wheel assembly of FIG. 1, including the steering wheel in the first position.
Figure 14:
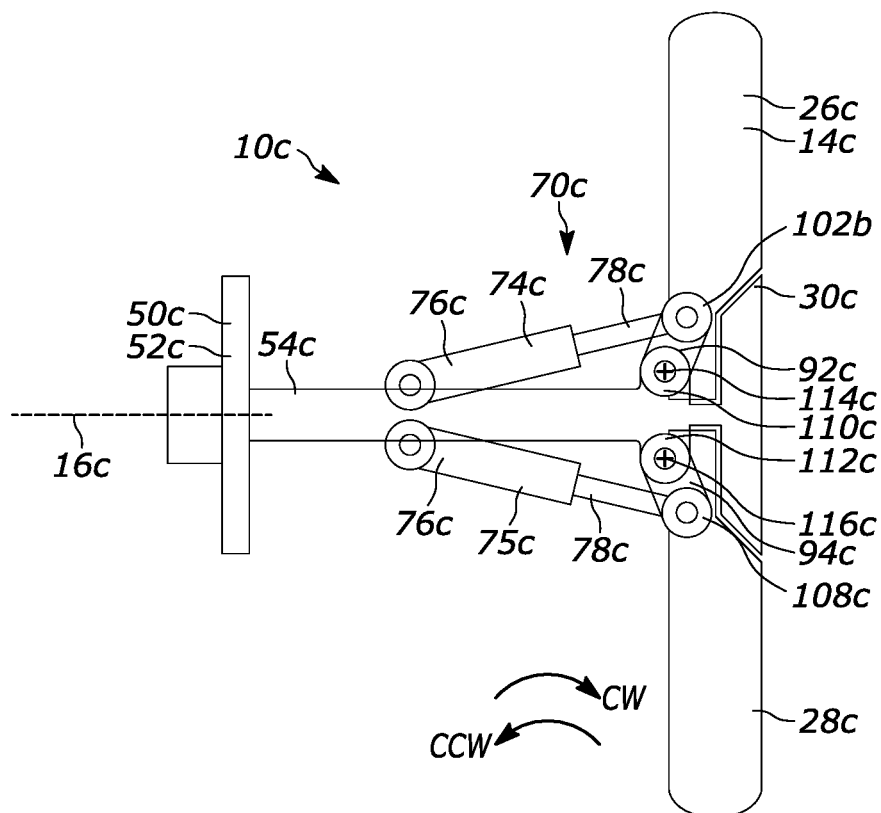
FIG. 14 is a schematic side view of the example configuration of the steering wheel assembly of FIG. 13, including the steering wheel in the first position.
Figure 15:
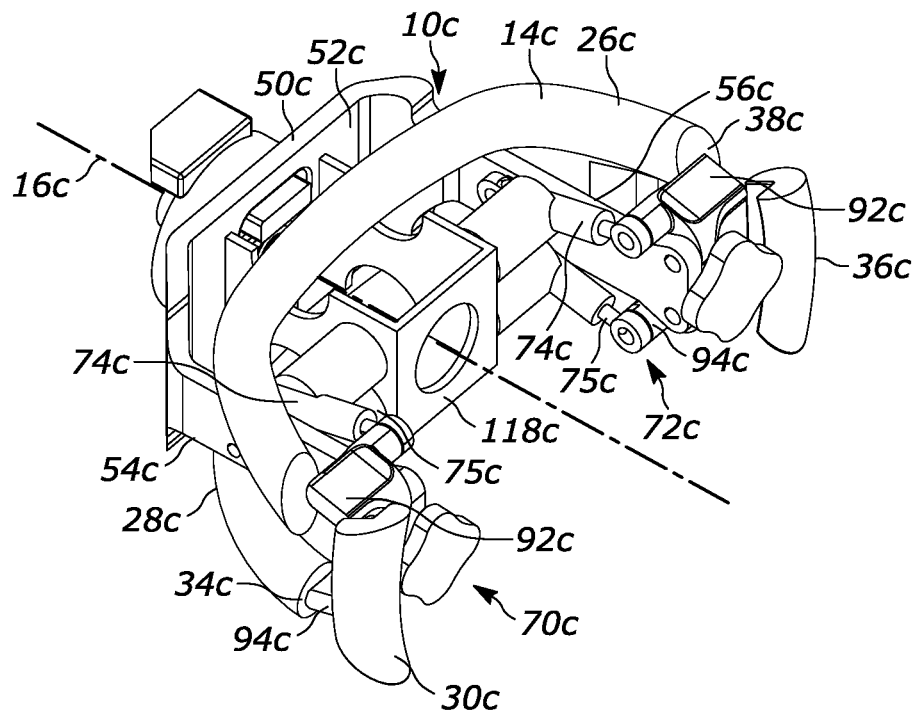
FIG. 15 is a partial perspective view of the example configuration of the steering wheel assembly of FIG. 13, including the steering wheel in the second position.
Figure 16:
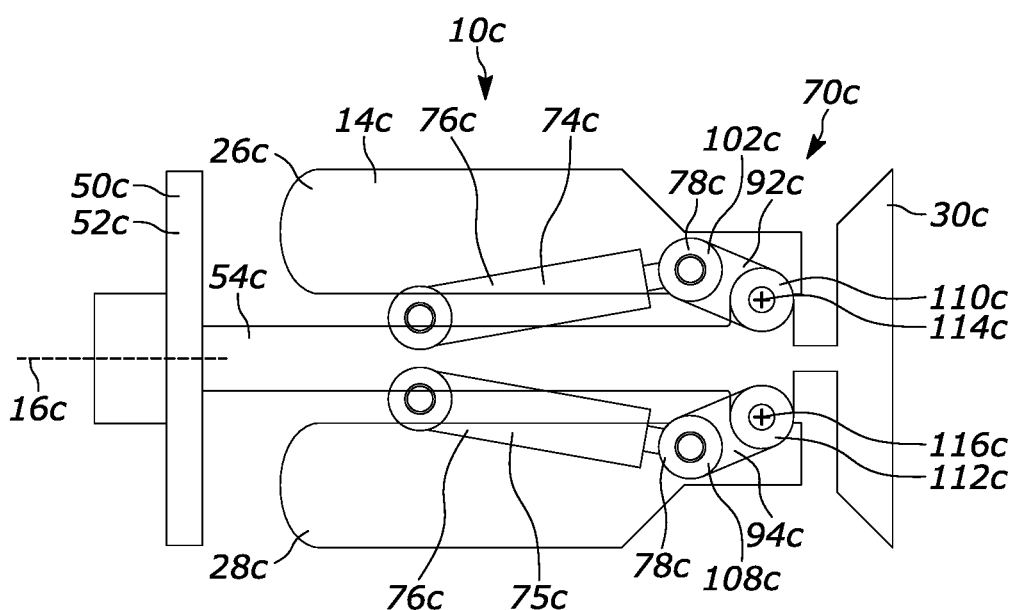
FIG. 16 is a schematic side view of the example configuration of the steering wheel assembly of FIG. 15, including the steering wheel in the second position.
Figure 17:
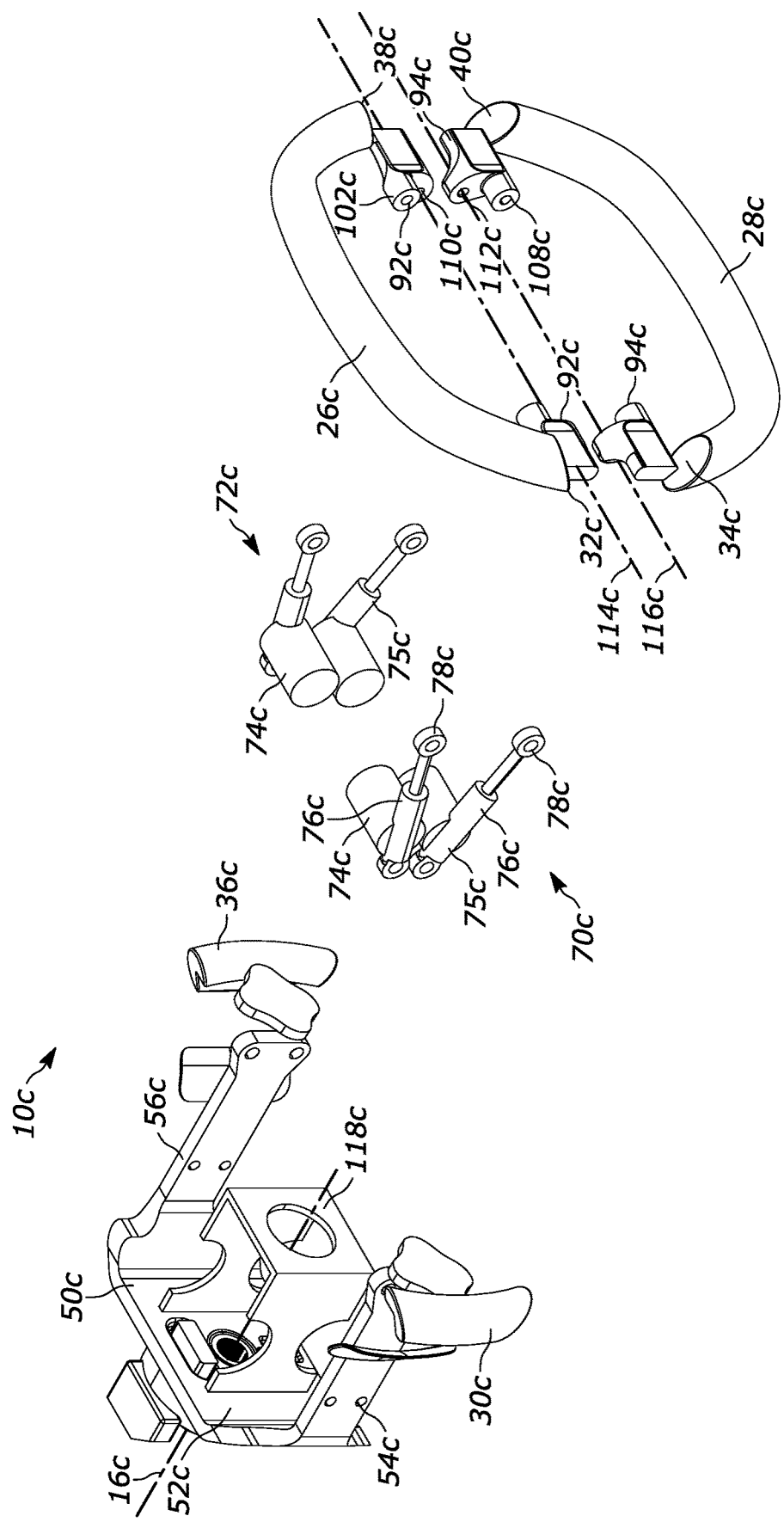
FIG. 17 is an exploded view of the steering wheel assembly of FIG. 13.
Figure 18:
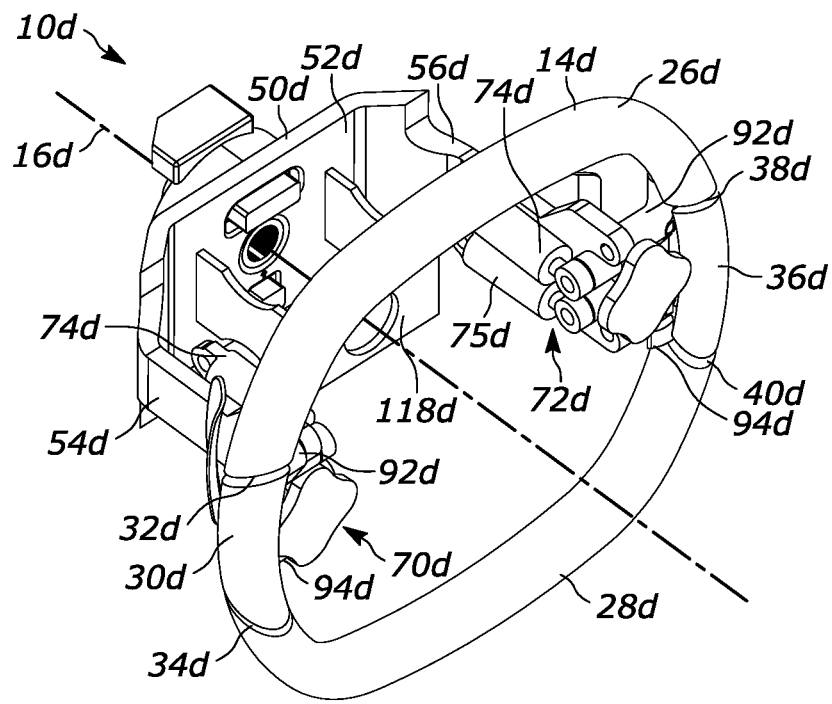
FIG. 18 is a partial perspective view of an example configuration of the steering wheel assembly of FIG. 1, including the steering wheel in the first position.
Figure 19:
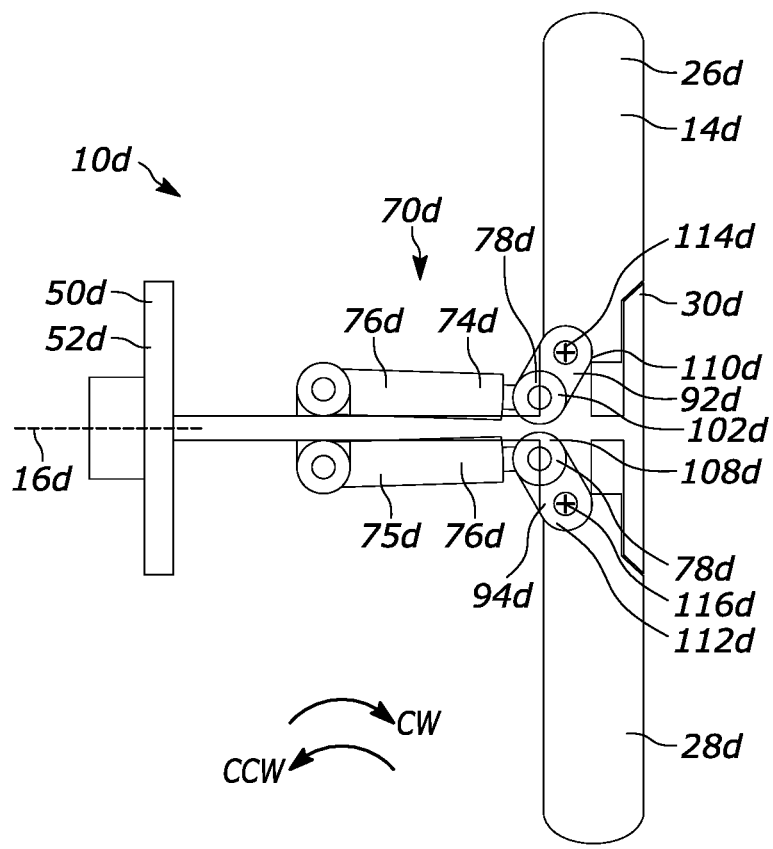
FIG. 19 is a schematic side view of the example configuration of the steering wheel assembly of FIG. 18, including the steering wheel in the first position.
Figure 20:
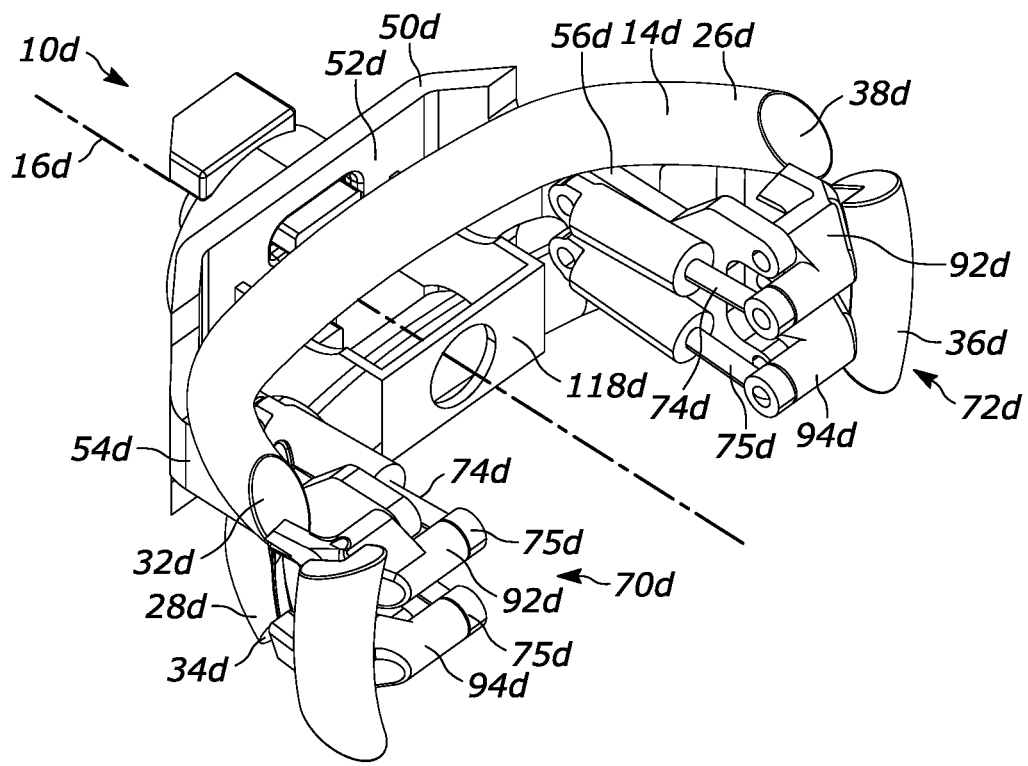
FIG. 20 is a partial perspective view of the example configuration of the steering wheel assembly of FIG. 18, including the steering wheel in the second position.
Figure 21:
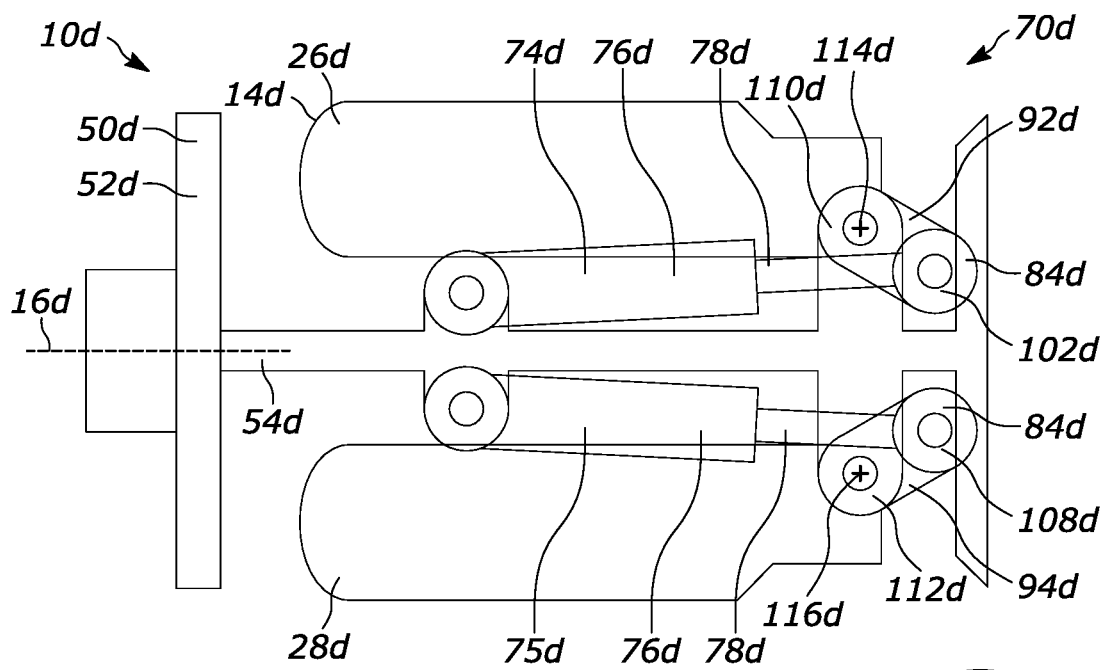
FIG. 21 is a schematic side view of the example configuration of the steering wheel assembly of FIG. 20, including the steering wheel in the second position.
Figure 22:
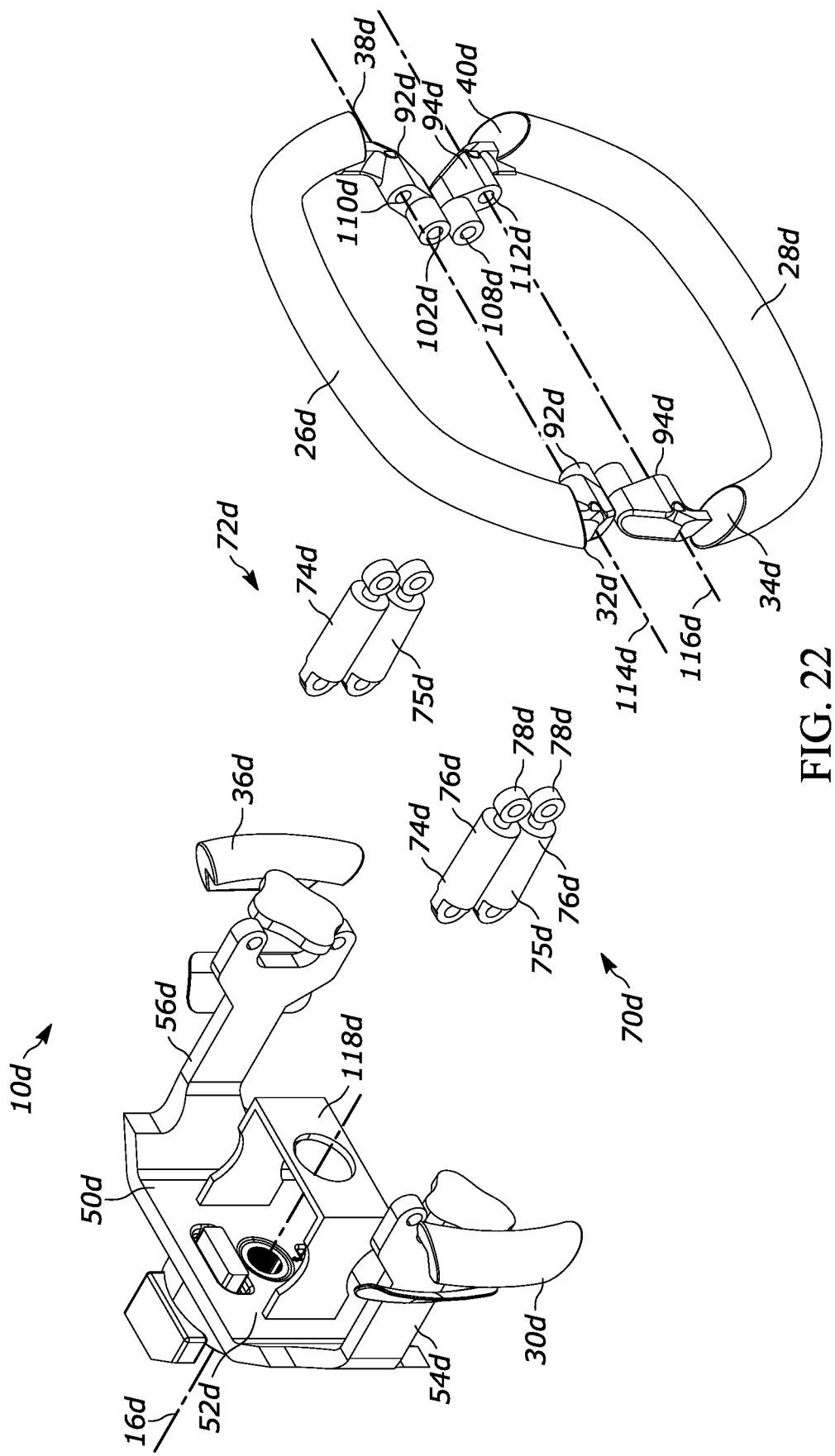
FIG. 22 is an exploded view of the steering wheel assembly of FIG. 18.

The steering wheel 14c can be moved between the steering and folded positions by switching portions 70c, 72c of the steering wheel assembly 10c. As shown in FIGS. 13 and 15, the steering wheel assembly 10c has a first switching portion 70c adjacent the first support arm 54c and a second switching portion 72c adjacent the second support arm 56c. The first and second switching portions 70c, 72c mirror one another and operate in a similar manner. Thus, for the sake of brevity, only the first switching portion 70c will be described below.

As shown in FIGS. 13-17, the first switching portion 70c includes first and second linear actuators 74c, 75c each having a mounting portion 76c and a driving portion 78c. Each mounting portion 76c of the first and second linear actuators 74c, 75c is connected to the first support arm 54c. The driving portion 78c of the first linear actuator 74c is operably connected to the first end 32c of the first rim portion 26c. The driving portion 78c of the second linear actuator 75c is operably connected to the first end 34c of the second rim portion 28c. The first and second linear actuators 74c, 75c can be electrically connected to a controller that actuates the first and second linear actuators. The controller can actuate the first and second linear actuators 74c, 75c so that the driving portions 78c of the first and second linear actuators linearly move simultaneously or consecutively.

A first end 102c of the first pivot extension 92c is pivotably connected to the driving portion 78c of the first linear actuator 74c. A second end 110c of the first pivot extension 92c is pivotably connected to the first support arm 54c. A first end 108c of the second pivot extension 94c is pivotably connected to driving portion 78c of the second linear actuator 75c. A second end 112c of the second pivot extension 94c is pivotably connected to the first support arm 54c.

As shown in FIGS. 13-16, with the steering wheel 14c in the steering position, actuation of the first and second linear actuators 74c, 75c causes the first and second rim portions 26c, 28c to pivot relative to the support member 50c from the steering position to the folded position. Upon actuation of the first and second linear actuators 74c, 75c, the driving portions 78c linearly move relative to the mounting portions 76c toward the base portion 52c of the support member 50c. The linearly moving driving portion 78c of the first linear actuator 74c pivots the first pivot extension 92c in the counterclockwise direction CCW relative to the support member 50c. The linearly moving driving portion 78c of the second linear actuator 75c pivots the second pivot extension 94c in the clockwise direction CW relative to the support member 50c.

As the first pivot extension 92c pivots relative to the support member 50c, the first rim portion 26c pivots in the counterclockwise direction CCW relative to the support member 50c from the steering position to the folded position. The first rim portion 26c pivots about a first pivot axis 114c relative to the support member 50c. As the second pivot extension 94c pivots relative to the support member 50c, the second rim portion 28c pivots in the clockwise direction CW relative to the support member 50c from the steering position to the folded position. The second rim portion 28c pivots about a second pivot axis 116c relative to the support member 50c. The first and second pivot axes 114c, 116c extend generally parallel to each other and transverse to the steering axis 16c.

The first and second linear actuators 74c, 75c can be actuated to reverse the above described process and cause the first and second rim portions 26c, 28c to pivot about the first and second pivot axes 114c, 116c, respectively, relative to the support member 50c from the folded position to the steering position.

FIGS. 18-22 depict another example steering wheel assembly 10d. The steering wheel assembly 10d has a similar structure to the structure of the steering wheel assembly 10c. When the steering wheel 14d is in the steering position, actuation of the first and second linear actuators 74d, 75d causes the first and second rim portions 26d, 28d to pivot relative to the support member 50d from the steering position to the folded position. Upon actuation of the first and second linear actuators 74d, 75d, the driving portions 78d linearly move relative to the mounting portions 76d away from the base portion 52d of the support member 50d. The linearly moving driving portion 78d of the first linear actuator 74d pivots the first pivot extension 92d in the counterclockwise direction CCW relative to the support member 50d. The linearly moving driving portion 78d of the second linear actuator 75d pivots the second pivot extension 94d in the clockwise direction CW relative to the support member 50d.

As the first pivot extension 92d pivots relative to the support member 50d, the first rim portion 26d pivots in the counterclockwise direction CCW relative to the support member 50d from the steering position to the folded position. The first rim portion 26d pivots about a first pivot axis 114d relative to the support member 50d. As the second pivot extension 94d pivots relative to the support member 50d, the second rim portion 28d pivots in the clockwise direction CW relative to the support member 50d from the steering position to the folded position. The second rim portion 28d pivots about a second pivot axis 116d relative to the support member 50d. The first and second pivot axes 114d, 116d extend generally parallel to each other and transverse to the steering axis 16d.

The first and second linear actuators 74d, 75d can be actuated to reverse the above described process and cause the first and second rim portions 26d, 28d to pivot about the first and second pivot axes 114d, 116d, respectively, relative to the support member 50d from the folded position to the steering position.

FIGS. 23-27 depict another example steering wheel assembly 10e. The support member 50e of the steering wheel assembly 10e is substantially similar to the support member 50c of steering wheel assembly 10c. Pivot extensions 92e, 94e on first ends 32e, 34e of the first and second rim portions 26e, 28e of a steering wheel 14e are pivotably connected to the first support arm 54e. Pivot extensions 92e, 94e on second ends 38e, 40e of the first and second rim portions 26e, 28e are pivotably connected to the second support arm 56e. A first central rim portion 30e is connected to the first support arm 54e. A second central rim portion 36e is connected to the second support arm 56e.

Figure 23:
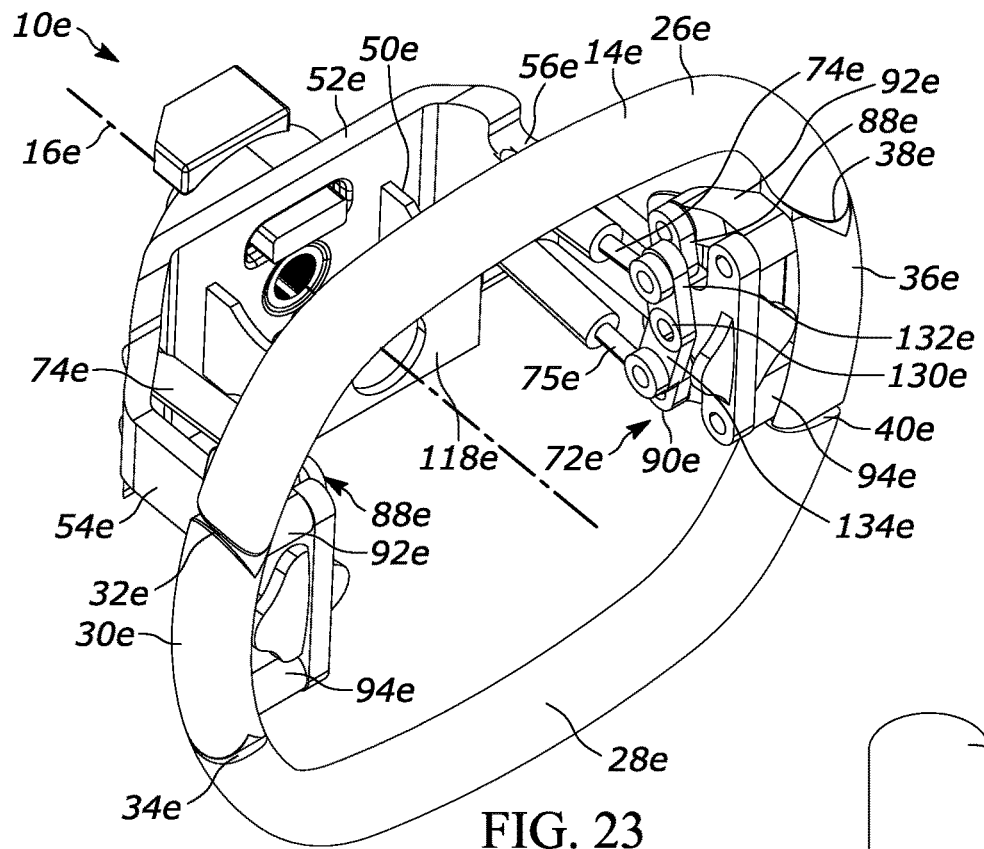
FIG. 23 is a partial perspective view of an example configuration of the steering wheel assembly of FIG. 1, including the steering wheel in the first position.
Figure 24:
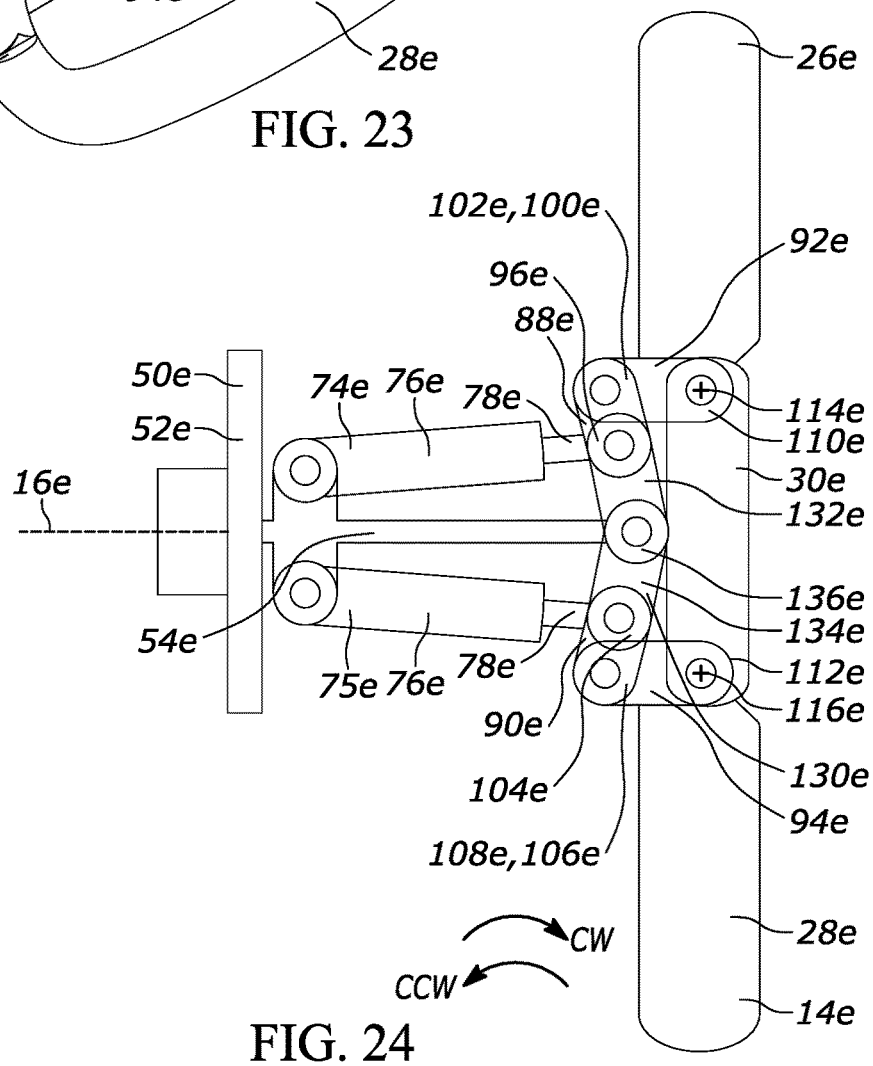
FIG. 24 is a schematic side view of the example configuration of the steering wheel assembly of FIG. 23, including the steering wheel in the first position.
Figure 25:
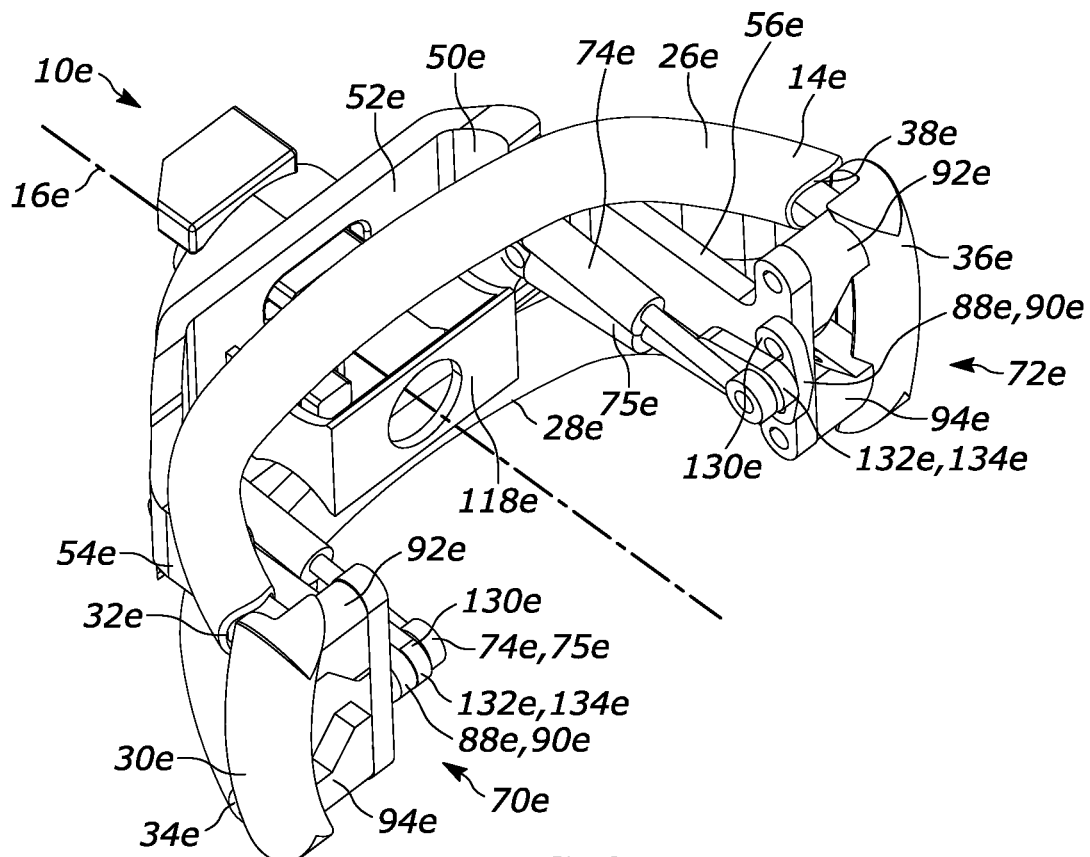
FIG. 25 is a partial perspective view of the example configuration of the steering wheel assembly of FIG. 23, including the steering wheel in the second position.

The steering wheel 14e can be moved between the steering and folded positions by switching portions 70e, 72e of the steering wheel assembly 10e. As shown in FIGS. 23 and 25, the steering wheel assembly 10e has a first switching portion 70e adjacent the first support arm 54e and a second switching portion 72e adjacent the second support arm 56e. The first and second switching portions 70e, 72e mirror one another and operate in a similar manner. Thus, for the sake of brevity, only the first switching portion 70e will be described below.

As shown in FIGS. 23-27, the first switching portion 70e includes first and second linear actuators 74e, 75e each having a mounting portion 76e and a driving portion 78e. Each mounting portion 76e of the first and second linear actuators 74e, 75e is pivotably connected to the first support arm 54e. The driving portion 78e of the first linear actuator 74e is operably connected to the first end 32e of the first rim portion 26e. The driving portion 78e of the second linear actuator 75e is operably connected to the first end 34e of the second rim portion 28e.

The first switching portion 70e further includes a pivot mechanism 130e. The pivot mechanism 130e has first and second pivot arms 132e, 134e that are pivotable relative to a central portion 136e of the pivot mechanism. The central portion 136e of the pivot mechanism 130e is fixedly connected to the support member 50e so that the first and second pivot arms 132e, 134e are pivotable relative to the support member.

The first pivot arm 132e of the pivot mechanism 130e is pivotably connected to both the driving portion 78e of the first linear actuator 74e and a first end 96e of a first link 88e. A second end 100e of the first link 88e is pivotably connected to a first end 102e of the first pivot extension 92e. A second end 110e of the first pivot extension 92e is pivotably connected to the first support arm 54e. The second pivot arm 134e of the pivot mechanism 130e is pivotably connected to both the driving portion 78e of the second linear actuator 75e and a first end 104e of a second link 90e. A second end 106e of the second link 90e is pivotably connected to a first end 108e of the second pivot extension 94e. A second end 112e of the second pivot extension 94e is pivotably connected to the first support arm 54e.

As shown in FIGS. 23-26, with the steering wheel 14e in the steering position, actuation of the first and second linear actuators 74e, 75e causes the first and second rim portions 26e, 28e to pivot relative to the support member 50e from the steering position to the folded position. Upon actuation of the first and second linear actuators 74e, 75e, the driving portions 78e linearly move relative to the mounting portions 76e away from the base portion 52e of the support member 50e. The linearly moving driving portion 78e of the first linear actuator 74e pivots the first pivot arm 132e of the pivot mechanism 130e in the clockwise direction CW relative to the support member 50e. The first linear actuator 74e also pivots in the clockwise direction CW relative to the support member 50e.

The first linear actuator 74e also causes the first link 88e to pivot the first pivot extension 92e in the counterclockwise direction CCW relative to the support member 50e. As the first pivot extension 92e pivots relative to the support member 50e, the first rim portion 26e pivots in the counterclockwise direction CCW relative to the support member 50e from the steering position to the folded position. The first rim portion 26e pivots about a first pivot axis 114e relative to the support member 50e.

The linearly moving driving portion 78e of the second linear actuator 75e pivots the second pivot arm 134e of the pivot mechanism 130e in the counterclockwise direction CCW relative to the support member. The second linear actuator 75e pivots in the counterclockwise direction CCW relative to the support member 50e. The second linear actuator 75e causes the second link 90e to pivot the second pivot extension 94e in the clockwise direction CW relative to the support member 50e.

As the second pivot extension 94e pivots relative to the support member 50e, the second rim portion 28e pivots in the clockwise direction CW relative to the support member 50e from the steering position to the folded position. The second rim portion 28e pivots about a second pivot axis 116e relative to the support member 50e. The first and second pivot axes 114e, 116e extend generally parallel to each other and transverse to the steering axis 16e.

Figure 26:
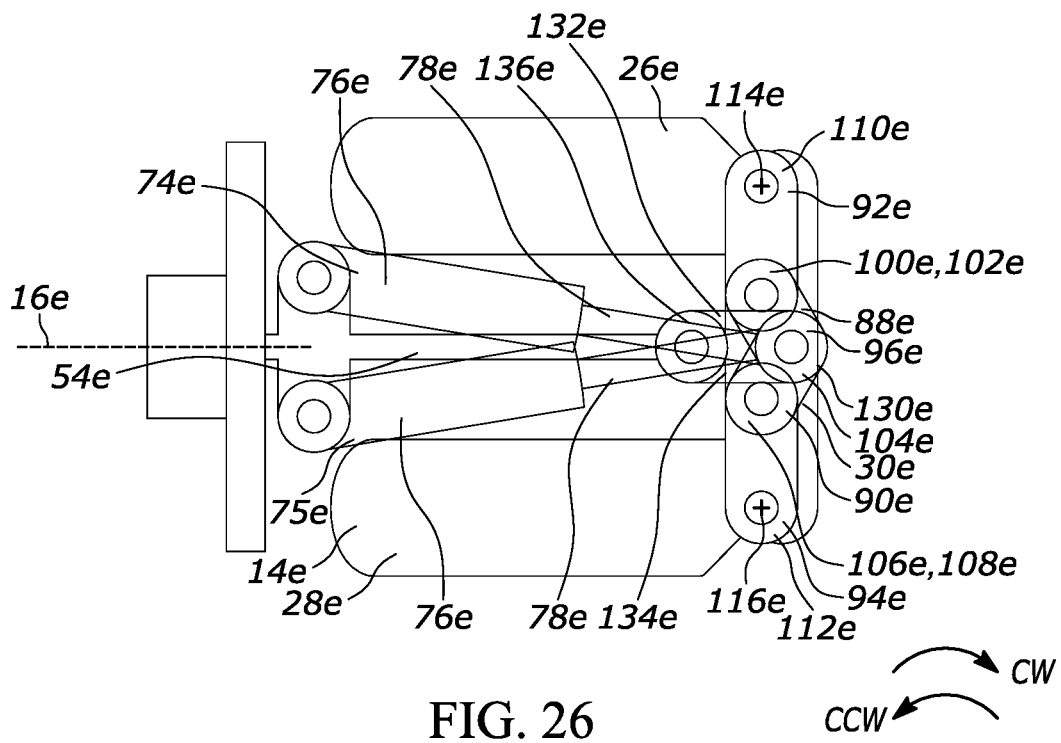
FIG. 26 is a schematic side view of the example configuration of the steering wheel assembly of FIG. 25, including the steering wheel in the second position.
Figure 27:
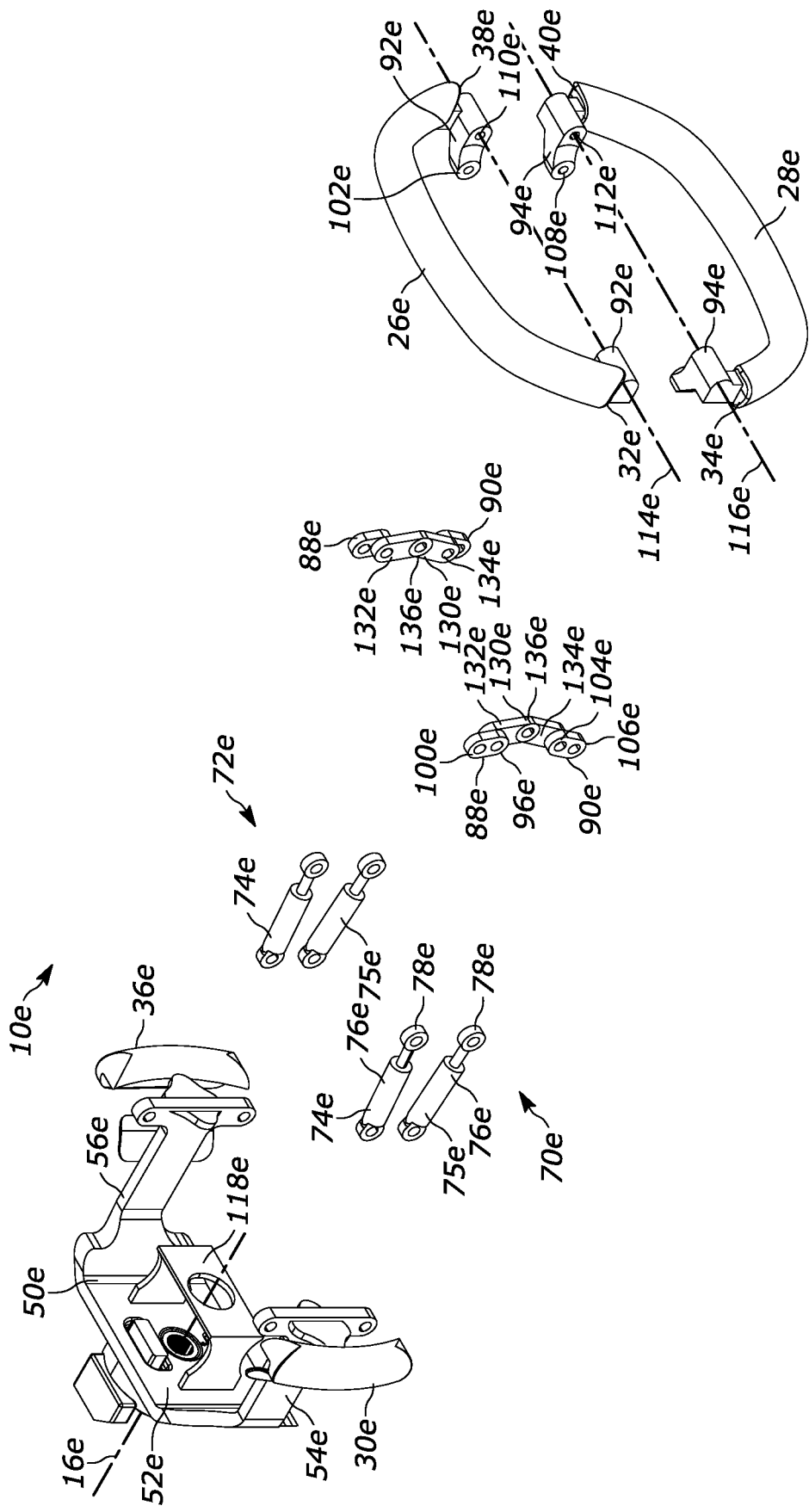
FIG. 27 is an exploded view of the steering wheel assembly of FIG. 23.

As shown in FIGS. 25-26, the pivotable connection between the driving portion 78e of the first linear actuator 74e, the first link 88e and the first pivot arm 132e can be coextensive with the pivotable connection between the driving portion 78e of the second linear actuator 75e, the second link 90e and the second pivot arm 134e when the steering wheel 14e is in the folded position.

The first and second linear actuators 74e, 75e can be actuated to reverse the above described process and cause the first and second rim portions 26e, 28e to pivot about the first and second pivot axes 114e, 116e, respectively, relative to the support member 50e from the folded position to the steering position.

FIGS. 28-32 depict another example steering wheel assembly 10f. The support member 50f of the steering wheel assembly 10f is substantially similar to the support member 50c of steering wheel assembly 10c. First ends 32f, 34f of the first and second rim portions 26f, 28f of a steering wheel 14f are connected to the first support arm 54f by links 88f, 90f. Second ends 38f, 40f of the first and second rim portions 26f, 28f are connected to the second support arm 56f by other links 88f, 90f. A first central rim portion 30f is connected to the first support arm 54f. A second central rim portion 36f is connected to the second support arm 56f.

Figure 28:
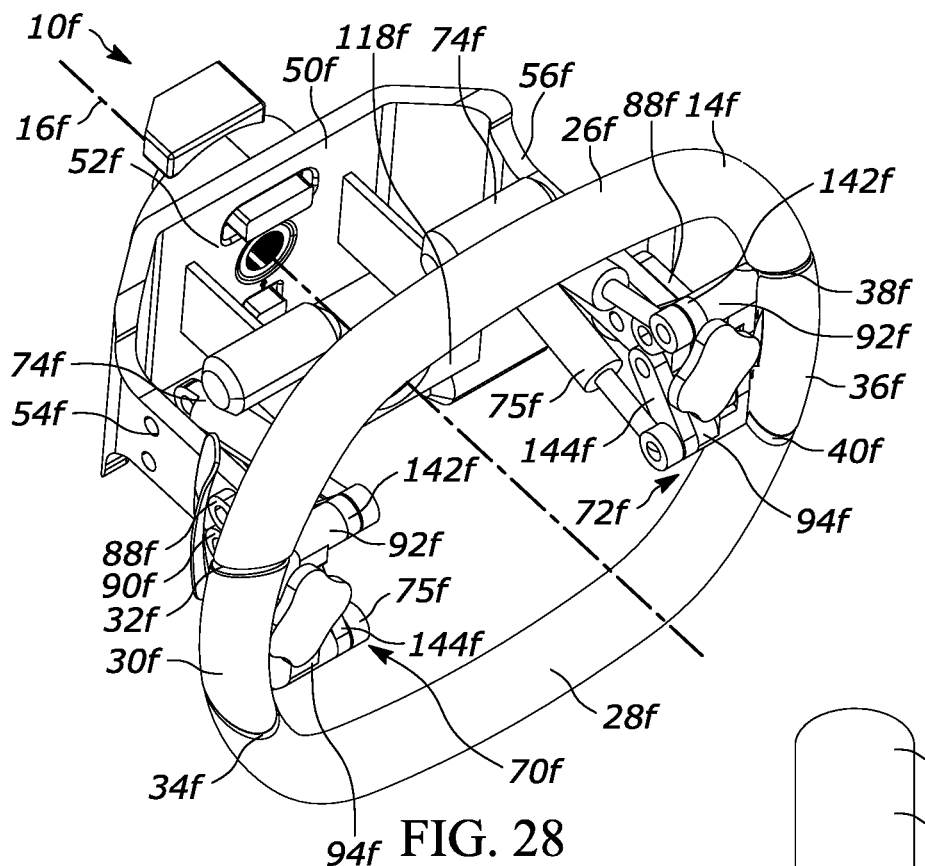
FIG. 28 is a partial perspective view of an example configuration of the steering wheel assembly of FIG. 1, including the steering wheel in the first position.
Figure 29:
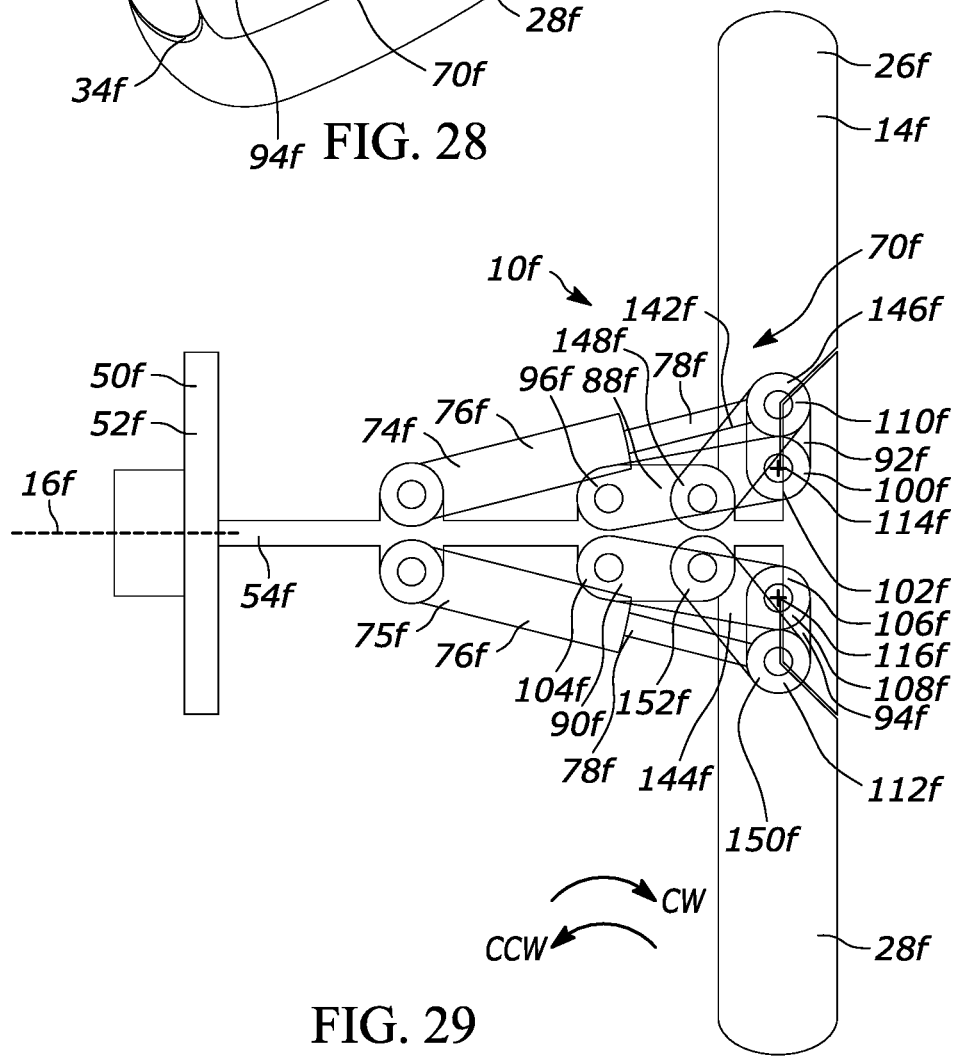
FIG. 29 is a schematic side view of the example configuration of the steering wheel assembly of FIG. 28, including the steering wheel in the first position.
Figure 30:
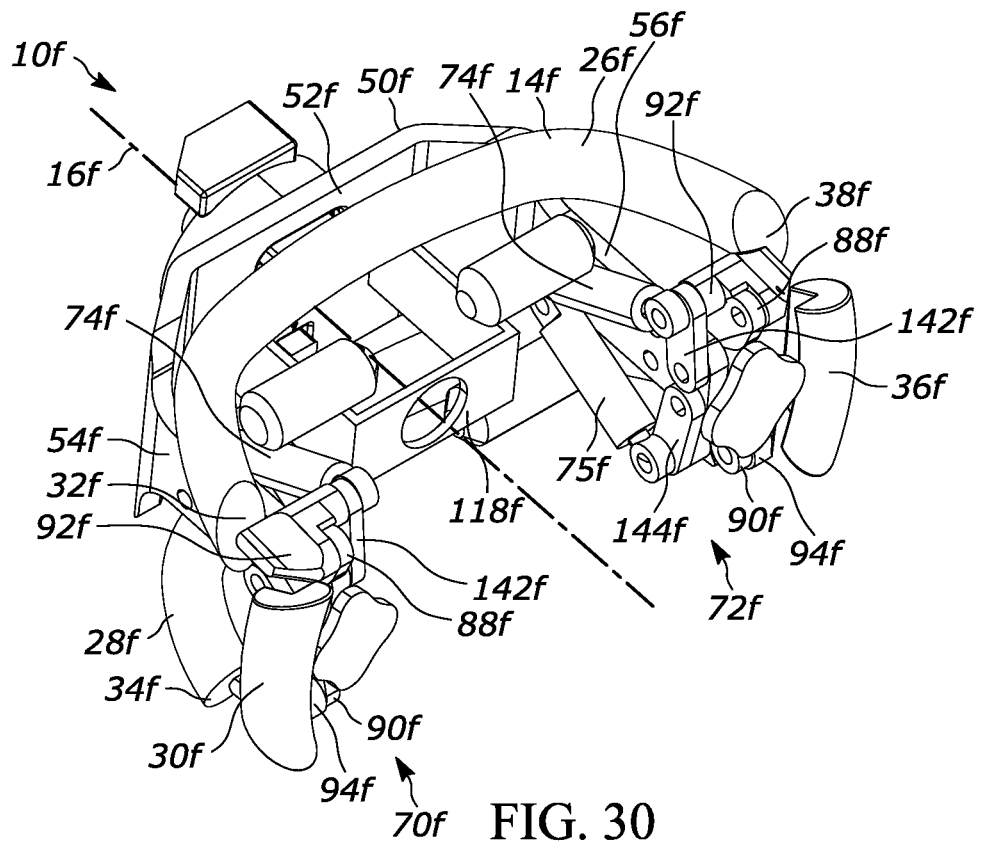
FIG. 30 is a partial perspective view of the example configuration of the steering wheel assembly of FIG. 28, including the steering wheel in the second position.
Figure 31:
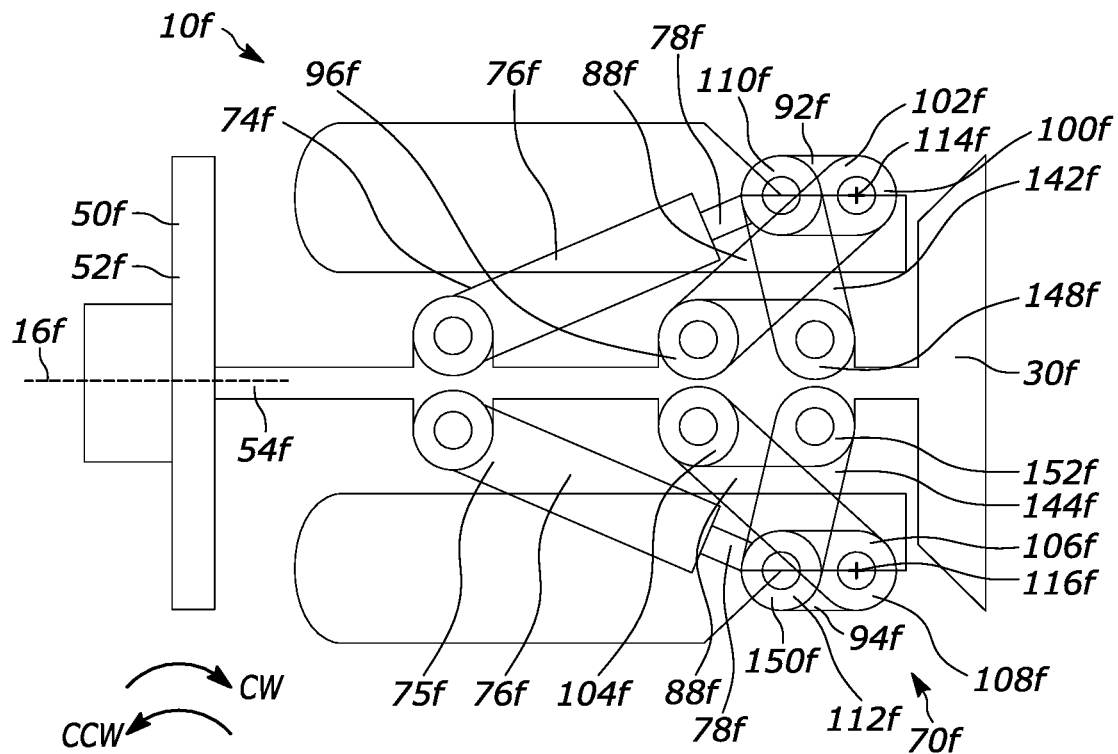
FIG. 31 is a schematic side view of the example configuration of the steering wheel assembly of FIG. 30, including the steering wheel in the second position.
Figure 32:
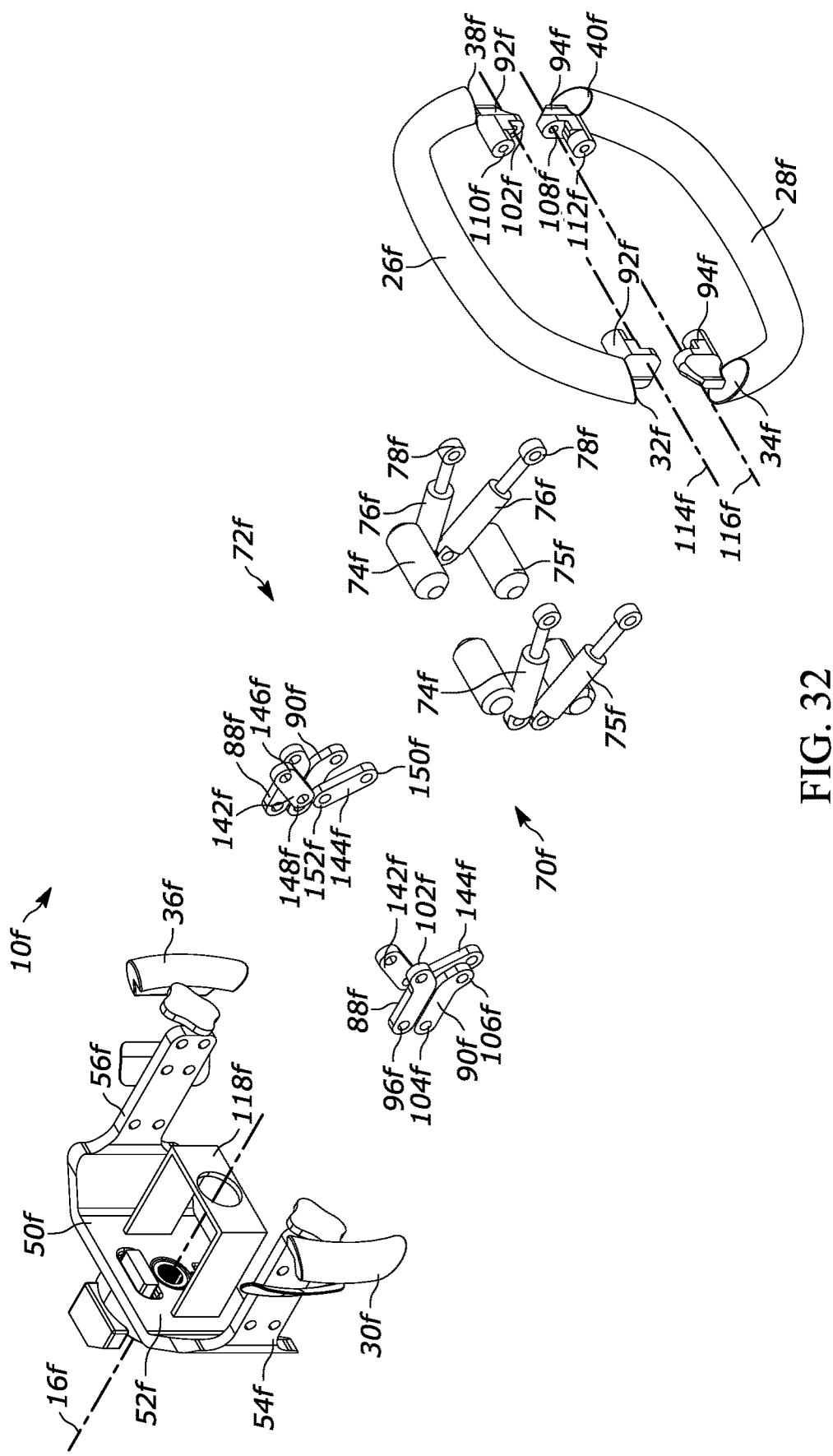
FIG. 32 is an exploded view of the steering wheel assembly of FIG. 28.

The steering wheel 14f can be moved between the steering and folded positions by switching portions 70f, 72f of the steering wheel assembly 10f. As shown in FIGS. 28 and 30, the steering wheel assembly 10f has a first switching portion 70f adjacent the first support arm 54f and a second switching portion 72f adjacent the second support arm 56f. The first and second switching portions 70f, 72f mirror one another and operate in a similar manner. Thus, for the sake of brevity, only the first switching portion 70f will be described below.

As shown in FIGS. 28-32, the first switching portion 70f includes first and second linear actuators 74f, 75f each having a mounting portion 76f and a driving portion 78f. Each mounting portion 78f of the first and second linear actuators 74f, 75f is pivotably connected to the first support arm 54f. The driving portion 78f of the first linear actuator 74f is operably connected to the first end 32f of the first rim portion 28f. The driving portion 78f of the second linear actuator 75f is operably connected to the first end 34f of the second rim portion 28f.

The first link 88f has a first end 96f pivotably connected to the first support arm 54f of the support member 50f. A second end 100f of the first link 88f is pivotably connected to a first end 102f of a first pivot extension 92f. The first pivot extension 92f is on the first end 32f of the first rim portion 26f. A second end 110f of the first pivot extension 92f is pivotably connected to the driving portion 78f of the first linear actuator 74f. The second end 110f of the first pivot extension 92f is also pivotably connected to a first end 146f of a first pivot arm 142f. A second end 148f of the first pivot arm 142f is pivotably connected to the first support arm 54f.

The second link 90f has a first end 104f pivotably connected to the first support arm 54f of the support member 50f. A second end 106f of the second link 90f is pivotably connected to a first end 108f of a second pivot extension 94f. The second pivot extension 94f is on the first end 34f of the second rim portion 28f. A second end 112f of the second pivot extension 94f is pivotably connected to the driving portion 78f of the second linear actuator 75f. The second end 112f of the second pivot extension 94f is also pivotably connected to a first end 150f of a second pivot arm 144f. A second end 152f of the second pivot arm 144f is pivotably connected to the first support arm 54f.

As shown in FIGS. 28-31, with the steering wheel 14f in the steering position, actuation of the first and second linear actuators 74f, 75f causes the first and second rim portions 26f, 28f to pivot relative to the support member 50f from the steering position to the folded position. Upon actuation of the first and second linear actuators 74f, 75f, the driving portions 78f linearly move relative to the mounting portions 76f toward the base portion 52f of the support member 50f. The linearly moving driving portion 78f of the first linear actuator 74f pivots the first pivot arm 142f in the counterclockwise direction CCW relative to the support member. The first linear actuator 74f pivots in the counterclockwise direction CCW relative to the support member 50f. The first pivot extension 92f pivots in the counterclockwise direction relative to the second end 100f of the first link 88f. The first link 88f also pivots in the counterclockwise direction CCW relative to the support member 50f. The first rim portion 26f pivots in the counterclockwise direction CCW relative to the first link 88f from the steering position to the folded position. The first rim portion 26f pivots about a first pivot axis 114f relative to the first link 88f.

The linearly moving driving portion 78f of the second linear actuator 75f pivots the second pivot arm 144f in the clockwise direction CW relative to the support member. The second linear actuator 75f pivots in the clockwise CW direction relative to the support member 50f. The second pivot extension 94f pivots in the clockwise direction CW relative to the second end 106f of the second link 90f. The second link 90f also pivots in the clockwise direction CW relative to the support member 50f. The second rim portion 28f pivots in the clockwise direction CW relative to the second link 90f from the steering position to the folded position. The second rim portion 28f pivots about a second pivot axis 116f relative to the second link 90f. The first and second pivot axes 114f, 116f extend generally parallel to each other and transverse to the steering axis 16f.

The first and second linear actuators 74f, 75f can be actuated to reverse the above described process and cause the first and second rim portions 26f, 28f to pivot about the first and second pivot axes 114f, 116f, respectively, relative to the first and second links 88f, 90f from the folded position to the steering position.

FIGS. 33-37 depict another example of the steering wheel assembly 10g. The support member 50g of the steering wheel assembly 10g is substantially similar to the support member 50a of steering wheel assembly 10a. However, the support member 50g does not include first and second guide channels. The first and second support arms 54g, 56g of the support member 50g instead have first and second guide openings 158g, 160g, respectively, that guide linear movement of a carriage 58g relative to the support member 50g.

First and second rim portions 26g, 28g of a steering wheel 14g have first ends 32g, 34g connected to the first support arm 54g by links 88g, 90g. Second ends 38g, 40g of the first and second rim portions 26g, 28g are connected to the second support arm 56g by other links 88g, 90g. First and second central rim portions 30g, 36g of the steering wheel 14g are connected to the carriage 58g.

The carriage 58g includes a base portion 60g and first and second carriage arms 62g, 64g that extend from the base portion. The first and second carriage arms 62g, 64g extend generally parallel to each other and the steering axis 16g. The first carriage arm 62g has a first guide bar 162g connected thereto that extends generally parallel to the first carriage arm. The first guide bar 162g slides in the first guide opening 158g of the first support arm 54g. The second carriage arm 64g has a second guide bar 164g connected thereto that extends generally parallel to the second carriage arm. The second guide bar 164g slides in the second guide opening 160g of the second support arm 56g.

Figure 33:
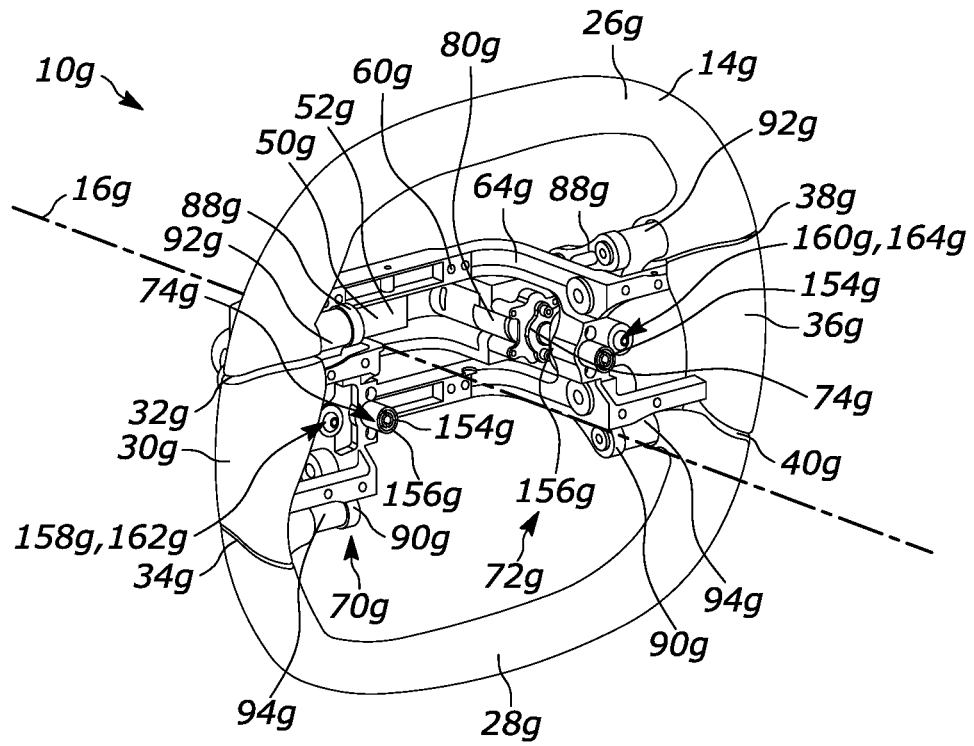
FIG. 33 is a partial perspective view of an example configuration of the steering wheel assembly of FIG. 1, including the steering wheel in the first position.
Figure 34:
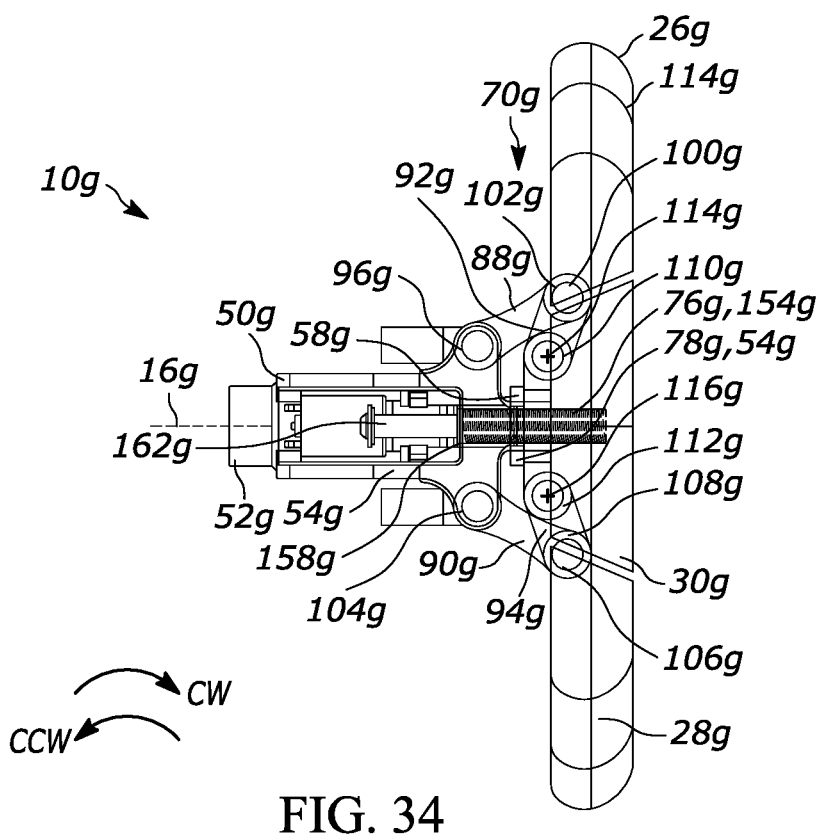
FIG. 34 is a schematic side view of the example configuration of the steering wheel assembly of FIG. 33, including the steering wheel in the first position.
Figure 35:
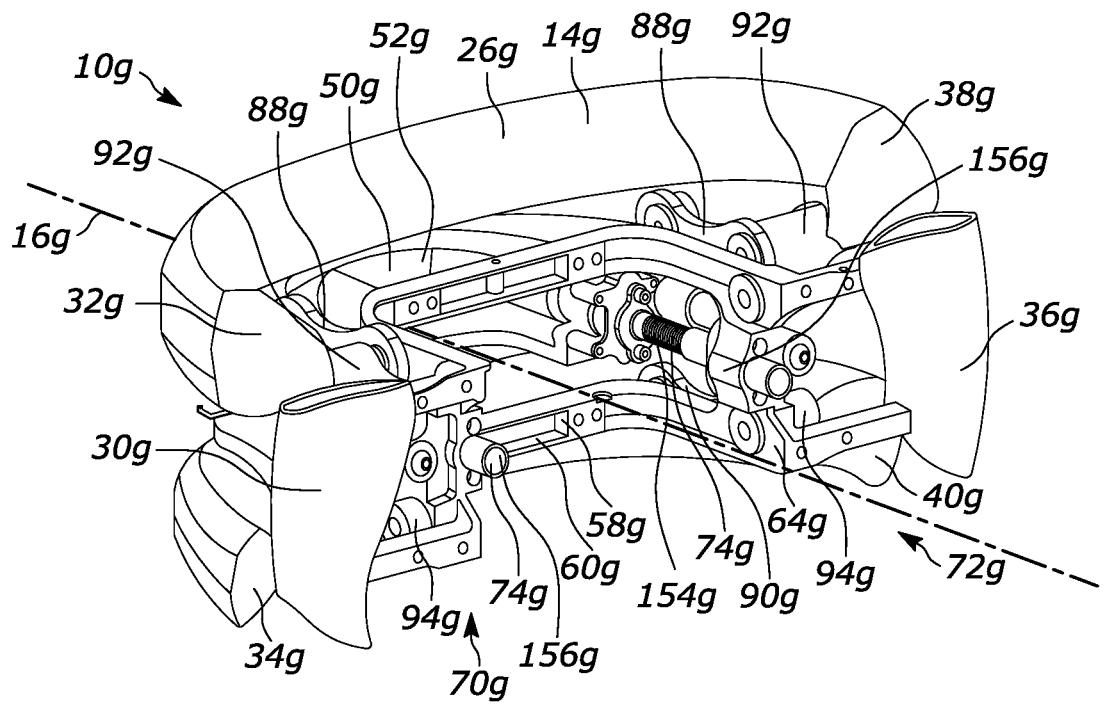
FIG. 35 is a partial perspective view of the example configuration of the steering wheel assembly of FIG. 33, including the steering wheel in the second position.
Figure 36:
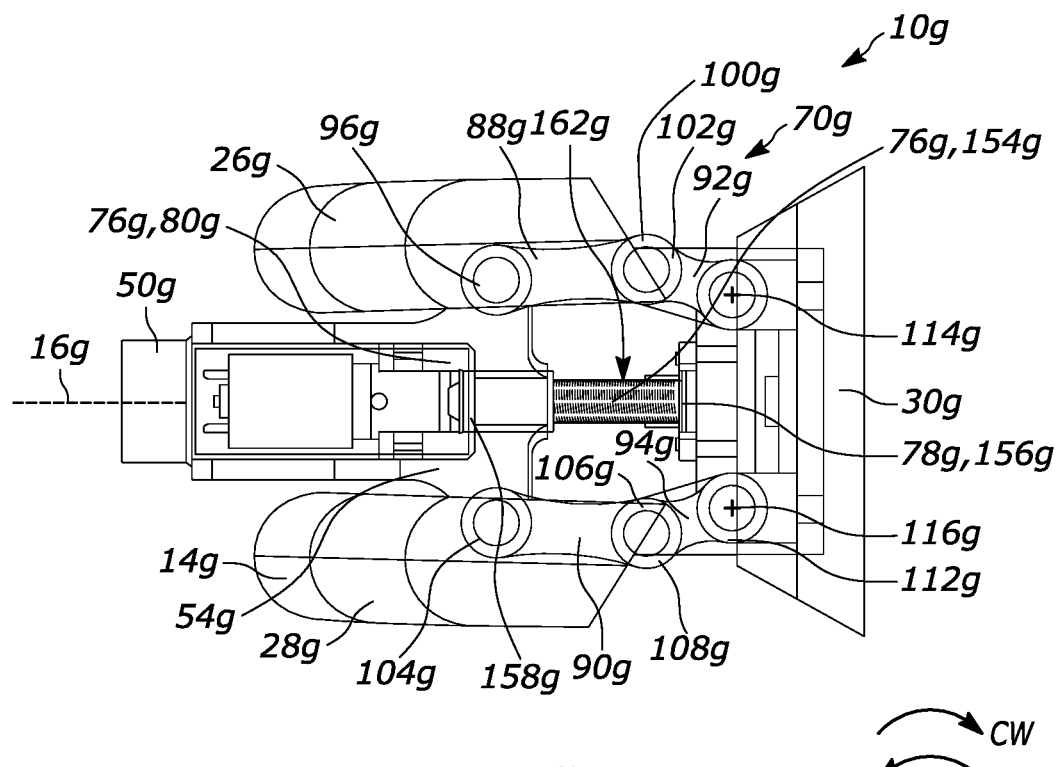
FIG. 36 is a schematic side view of the example configuration of the steering wheel assembly of FIG. 35, including the steering wheel in the second position.
Figure 37:
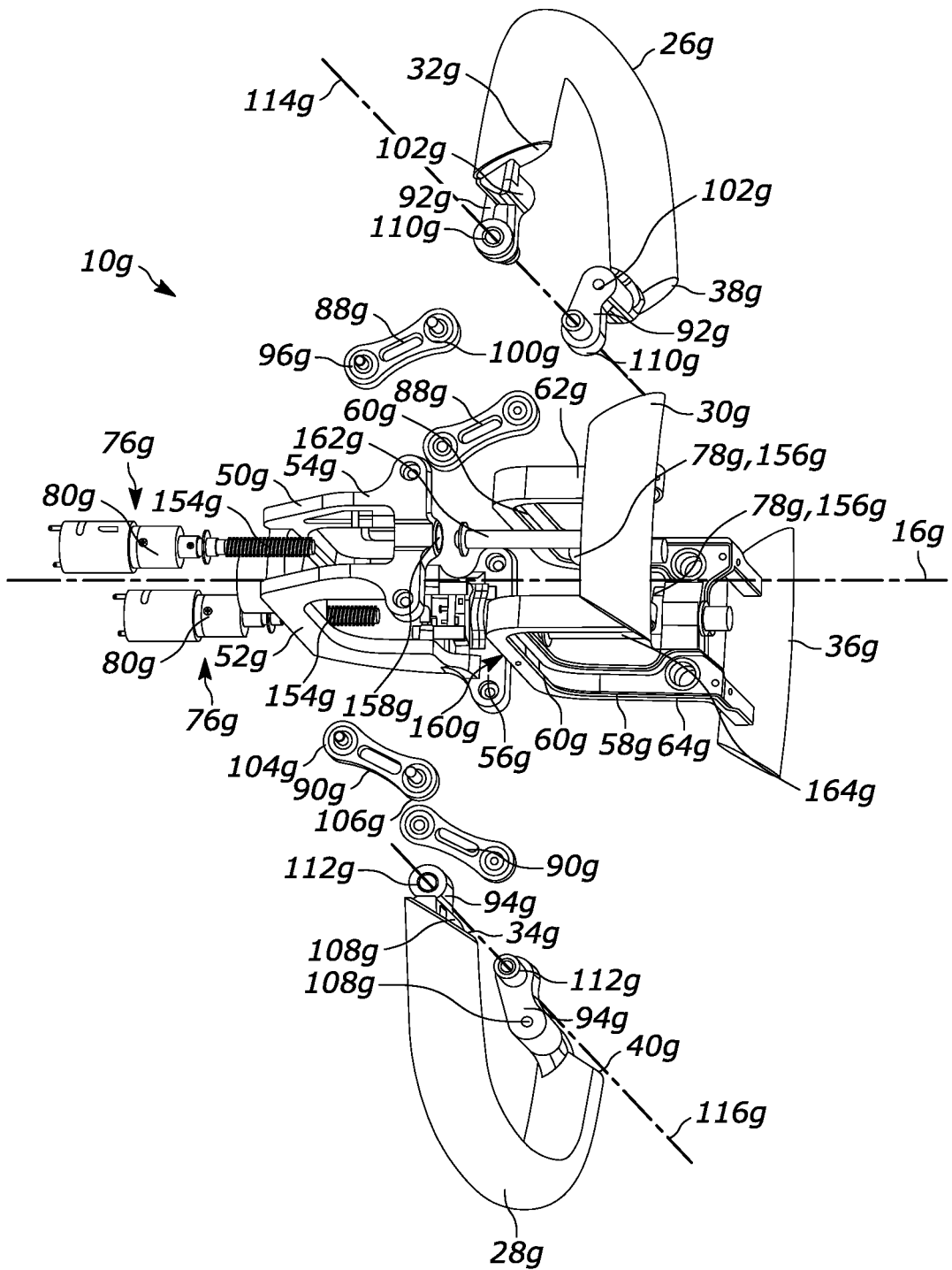
FIG. 37 is an exploded view of the steering wheel assembly of FIG. 33.

The steering wheel 14g can be moved between the steering and folded positions by switching portions 70g, 72g of the steering wheel assembly 10g. As shown in FIGS. 33 and 35, the steering wheel assembly 10g has a first switching portion 70g adjacent the first support arm 54g and a second switching portion 72g adjacent the second support arm 56g. The first and second switching portions 70g, 72g mirror one another and operate in a similar manner. Thus, for the sake of brevity, only the first switching portion 70g will be described below.

As shown in FIGS. 33-37, the first switching portion 70g includes a linear actuator 74g having a mounting portion 76g and a driving portion 78g. The mounting portion 76g of the linear actuator 74g can include a leadscrew 154g rotatably connected to a housing 80g. The housing 80g is fixedly connected to the support member 50g. The driving portion 78g of the linear actuator 74g can include a leadscrew nut 156g that is connected and linearly movable relative to the leadscrew 154g. The leadscrew nut 156g is fixedly connected to the first carriage arm 62g. The linear actuator 74g can be electrically, hydraulically, and/or pneumatically powered. The linear actuator 74g can be electrically connected to a controller that actuates the linear actuator 74g when the vehicle occupant desires and/or when certain vehicle conditions are met, such as when the vehicle 12 is parked.

A first end 96g of the first link 88g is pivotably connected to the first support arm 54g. A second end 100g of the first link 88g is pivotably connected to a first end 102g of a first pivot extension 92g. The first pivot extension 92g is on the first end 32g of the first rim portion 26g.

A first end 104g of the second link 90g is pivotably connected to the first support arm 54g. A second end 106g of the second link 90g is pivotably connected to a first end 108g of a second pivot extension 94g. The second pivot extension 94g is on the first end 34g of the second rim portion 28g. Second ends 110g, 112g of the first and second pivot extensions 92g, 94g are pivotably connected to the first carriage arm 62g.

As shown in FIGS. 33-36, with the steering wheel 14g in the steering position, actuation of the linear actuator 74g causes the first and second rim portions 26g, 28g to pivot relative to the support member 50g from the steering position to the folded position. Upon actuation of the linear actuator 74g, the leadscrew 154g rotates relative to the housing 80g and relative to the leadscrew nut 156g. Rotation of the leadscrew 154g linearly moves the leadscrew nut 156g along the leadscrew away from the base portion 52g of the support member 50g relative to the leadscrew and to the support member. The linearly moving leadscrew nut 156g linearly moves the carriage 58g away from the base portion 52g relative to the support member 50g. The linearly moving carriage 58g causes the first pivot extension 92g to pivot in a counterclockwise direction CCW relative to the second end 100g of the first link 88g. The linearly moving carriage 58g also causes the second pivot extension 94g to pivot in a clockwise direction CW relative to the second end 106g of the second link 90g.

As the first pivot extension 92g pivots relative to the first link 88g, the first rim portion 26g pivots in the counterclockwise direction CCW relative to the carriage 58g from the steering position to the folded position. The first rim portion 26a pivots about a first pivot axis 114g relative to the carriage 58g. As the second pivot extension 94g pivots relative to the second link 90g, the second rim portion 28g pivots in the clockwise direction CW relative to the carriage 58g from the steering position to the folded position. The second rim portion 28g pivots about a second pivot axis 116g relative to the carriage 58g. The first and second pivot axes 114g, 116g extend generally parallel to each other and transverse to the steering axis 16g.

The linear actuator 74g can be actuated to reverse the above described process and cause the first and second rim portions 26g, 28g to pivot about the first and second pivot axes 114g, 116g, respectively, relative to the carriage 58g from the folded position to the steering position.

Figure 38:
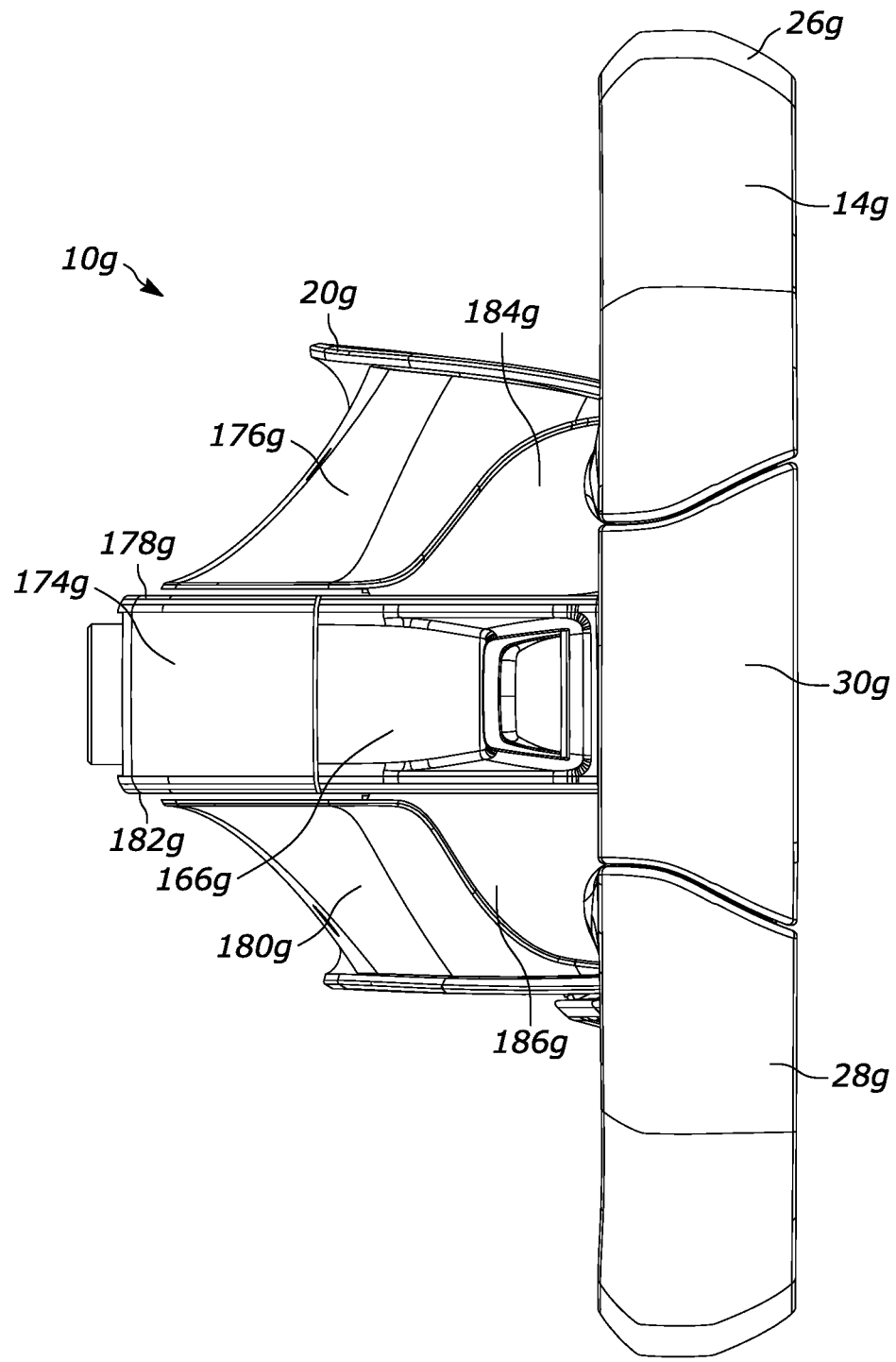
FIG. 38 is a side view of the steering wheel assembly of FIG. 33, including the steering wheel in the first position.
Figure 39:
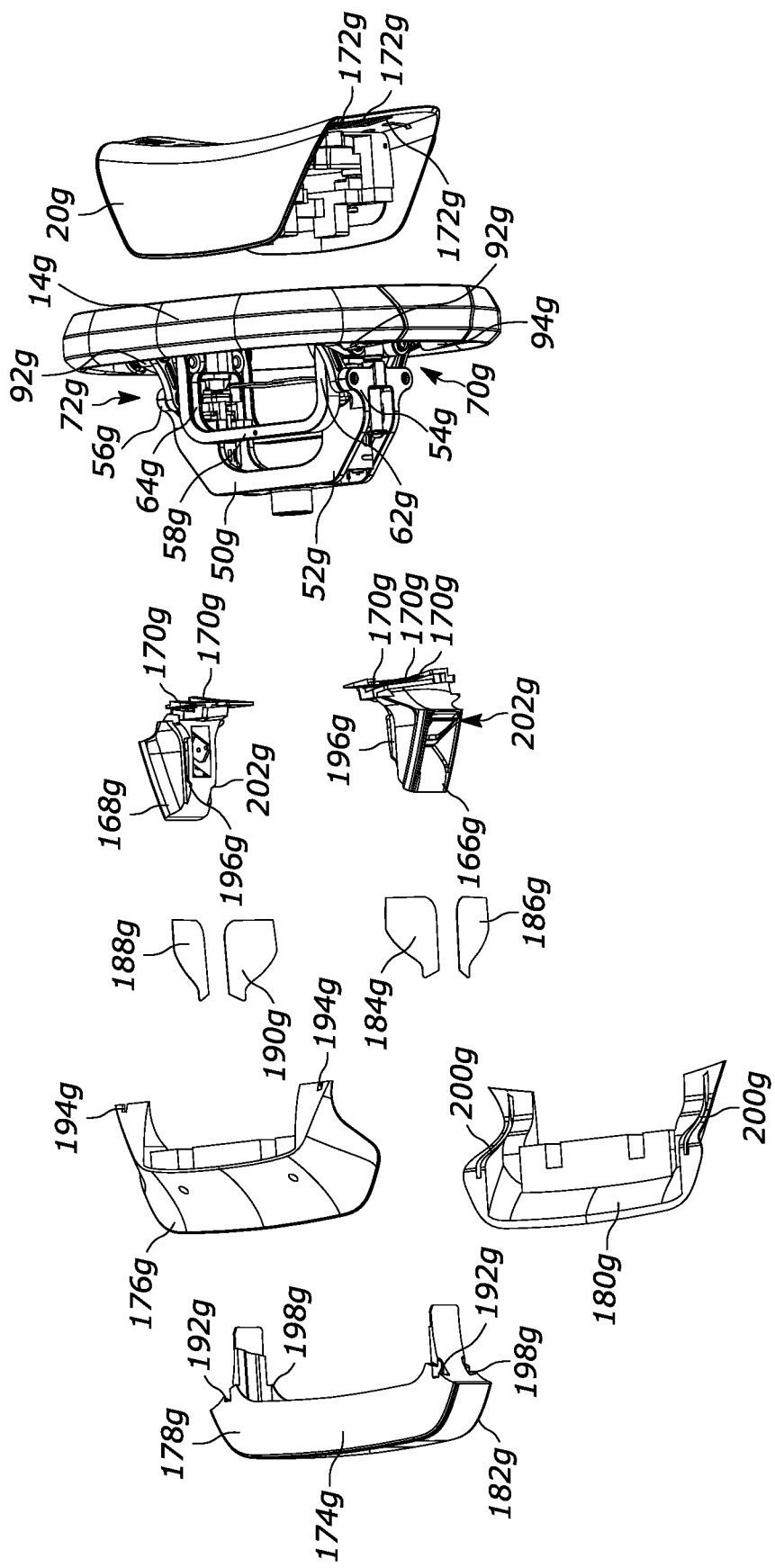
FIG. 39 is an exploded view of the steering wheel assembly of FIG. 38.

As shown in FIGS. 38-39, the housing 20g can be fixedly connected to the carriage 58g so that the housing moves with the carriage relative to the support member 50g. A first switch assembly 166g can be connected to the first carriage arm 62g. A second switch assembly 168g can be connected to the second carriage arm 64g. The first and second switch assemblies 166g, 168g include occupant actuatable switches 170g that extend through openings 172g in the housing 20g.

A first cover 174g can be fixedly attached to the base portion 52g and the first and second support arms 54g, 56g. A second cover 176g can be fixedly attached to the housing 20g and extend toward a first surface 178g of the first cover 174g. A third cover 180g can be fixedly attached to the housing 20g and extend toward a second surface 182g of the first cover 174g. The second surface 182g of the first cover 174g is opposite the first surface 178g. The first, second, and third covers 174g, 176g, 180g together with the housing 20g cover and enclose portions of the support member 50g, the carriage 58g, the first switching portion 70g and the second switching portion 72g.

First and second flexible inserts 184g, 186g may be provided to overlie and cover portions of the first switching portion 70g, the support member 50g and/or the carriage 58g. Third and fourth flexible inserts 188g, 190g may be provided to overlie and cover portions of the second switching portion 72g, the support member 50g and/or the carriage 58g. The third and fourth flexible inserts 188g, 190g mirror the first and second flexible inserts 184g, 186g and operate in a similar manner. Thus, for the sake of brevity, only the first and second flexible inserts 184g, 186g will be described below.

The first flexible insert 184g is held within, such as by being press fit or by adhesive bonding, a first channel 192g that extends along the first cover 174g, the second cover 176g and the first switching assembly 166g. The first flexible insert 184g can also be attached to the first pivot extension 92g. The second flexible insert 186g is held within, such as by being press fit or by adhesive bonding, a second channel 194g that extends along the first cover 174g, the third cover 180g and the first switching assembly 166g. The second flexible insert 186g can also be attached to the second pivot extension 94g. Alternatively, the first and second flexible inserts 184g, 186g can be attached to the steering wheel assembly 10g in any other desired manner.

The first and second flexible inserts 184g, 186g may have an elastic wire frame for press fitting the first and second flexible inserts in the first and second channels 192g, 194g. The first and second flexible inserts 184g, 186g can be at least partially formed from one or more deformable, flexible and/or stretchable materials, such as leather or elastic fabrics. Therefore, the first flexible insert 184g can flex, deform and/or stretch to conform to the movements of the second cover 176g, the first switching assembly 166g and the first pivot extension 92g. Similarly, the second flexible insert 186g can flex, deform and/or stretch to conform to the movements of the third cover 180g, the first switching assembly 166g and the second pivot extension 94g. The first and second flexible inserts 184g, 186g can thus flex as the steering wheel 14g is pivoted between the steering and folded positions to cover portions of the steering wheel assembly 10g regardless of whether the steering wheel is in the steering position, in the folded position or transitioning between the steering and folded positions.

FIGS. 40-43 depict another example of the steering wheel assembly 10h. The steering wheel assembly 10h includes a support member 50h having a base portion 52h connectable to a steering column that extends through the dashboard or support surface 15. First and second support arms 54h, 56h extend from the base portion 52h. The first and second support arms 54h, 56h extend generally parallel to each other and the steering axis 16h.

Pivot extensions 92h, 94h on first ends 32h, 34h of first and second rim portions 26h, 28h of a steering wheel 14h pivotably connect the first and second rim portions 26h, 28h to the support member 50h. Pivot extensions 92h, 94h on second ends 38h, 40h of the first and second rim portions 26h, 28h pivotably connect the first and second rim portions 26h, 28h to the support member 50h. A first central rim portion 30h is connected to the first support arm 54h. A second central rim portion 36h is connected to the second support arm 56h.

Figure 40:
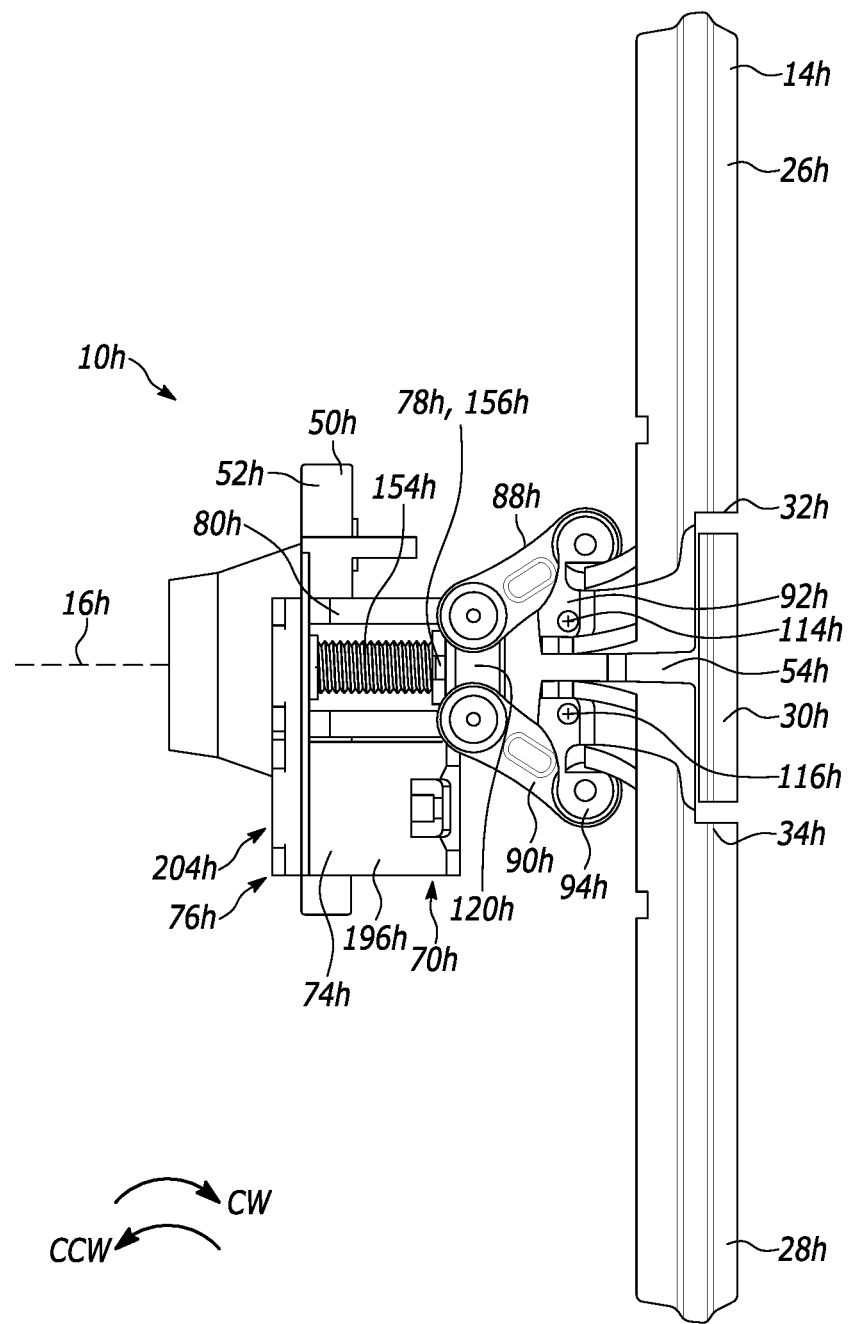
FIG. 40 is a schematic side view of an example configuration of the steering wheel assembly of FIG. 1, including the steering wheel in the first position.
Figure 41:
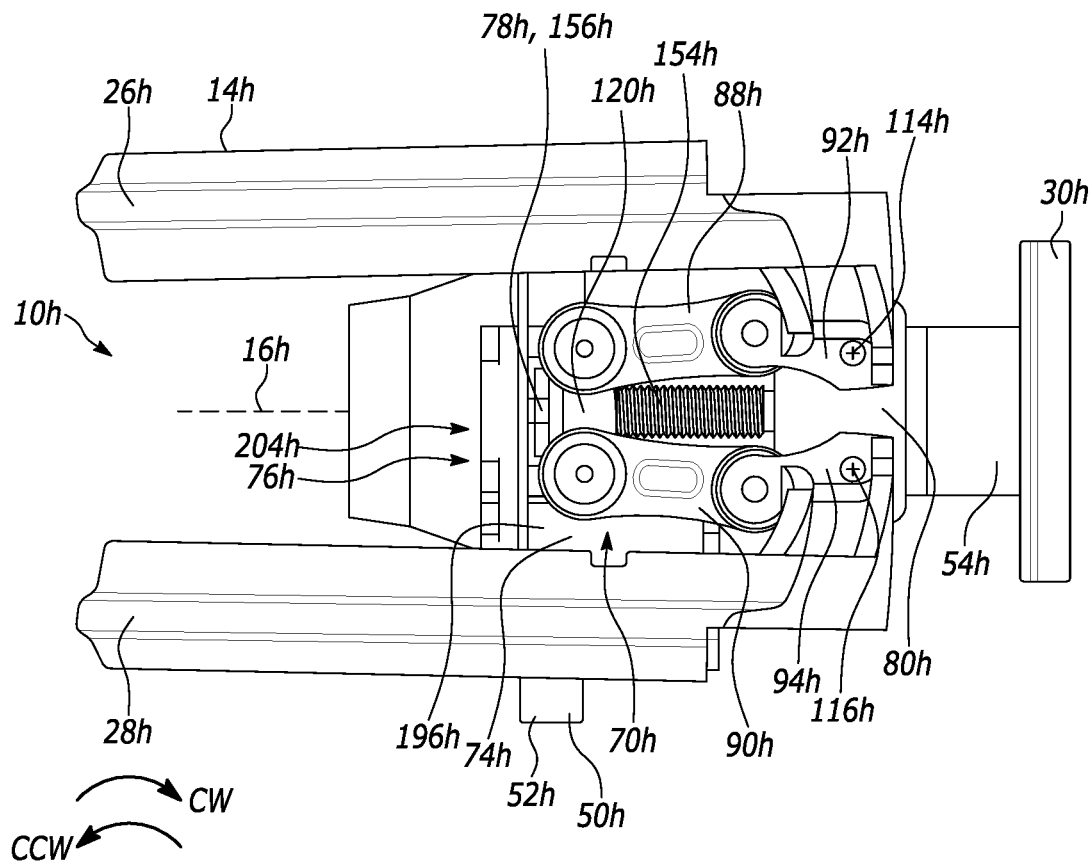
FIG. 41 is a schematic side view of the example configuration of the steering wheel assembly of FIG. 40, including the steering wheel in the second position.
Figure 42:
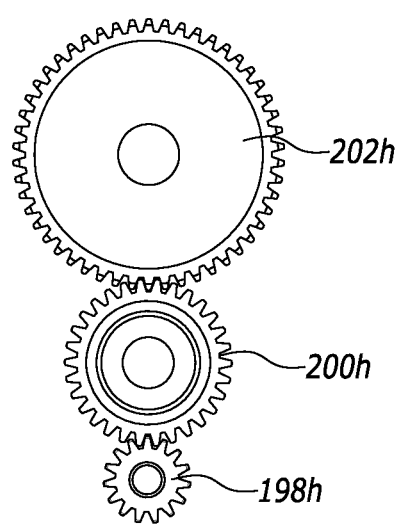
FIG. 42 is a schematic rear view of a portion of the steering wheel assembly of FIG. 40.
Figure 43:
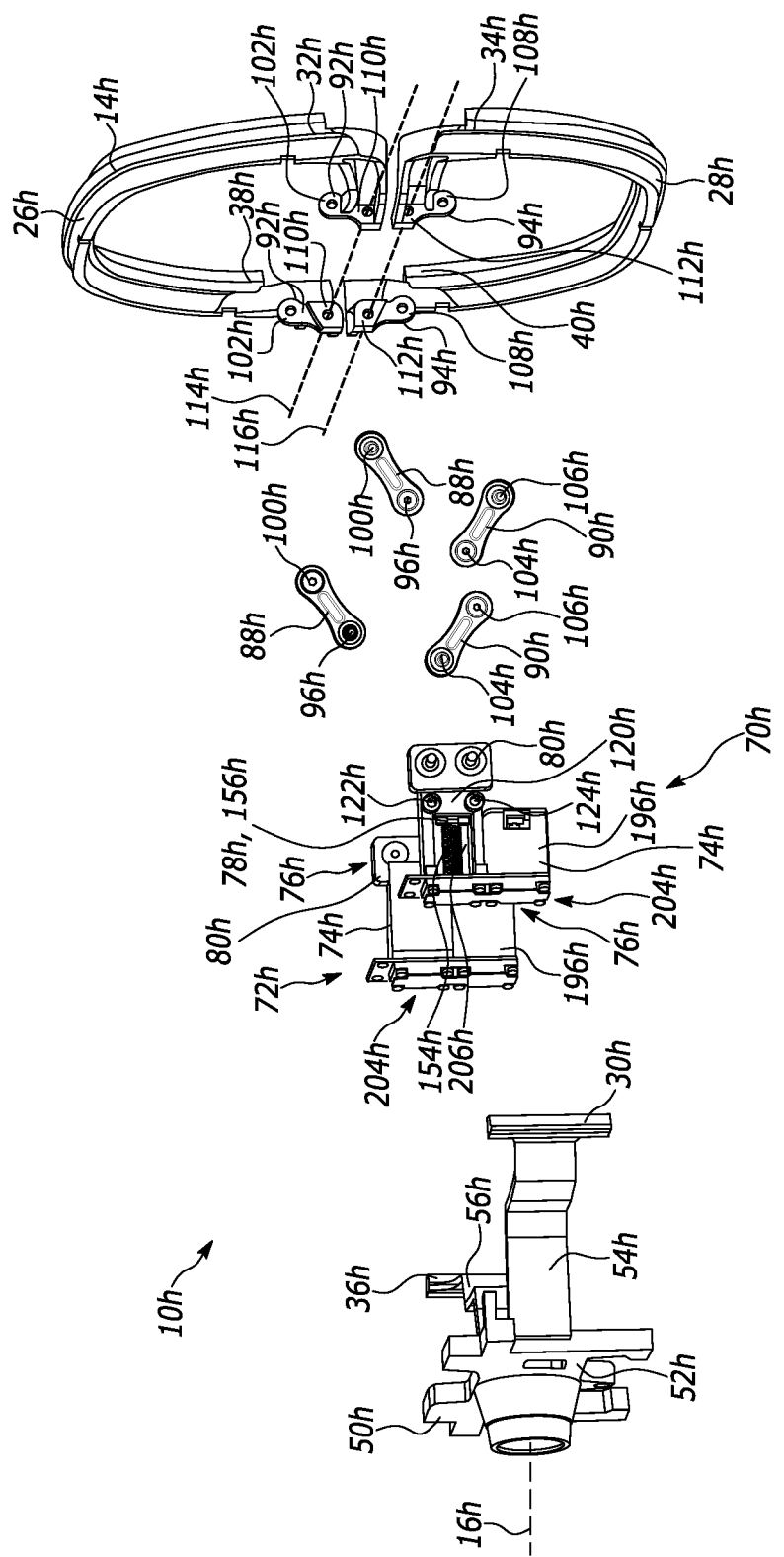
FIG. 43 is an exploded view of the steering wheel assembly of FIG. 40.

The steering wheel 14h can be moved between the steering and folded positions by switching portions 70h, 72h of the steering wheel assembly 10h. As shown in FIGS. 40-41 and 43, the steering wheel assembly 10h has a first switching portion 70h adjacent the first support arm 54h and a second switching portion 72h adjacent the second support arm 56h. The first and second switching portions 70h, 72h mirror one another and operate in a similar manner. Thus, for the sake of brevity, only the first switching portion 70h will be described below.

As shown in FIGS. 40-43, the first switching portion 70h includes a linear actuator 74h having a mounting portion 76h and a driving portion 78h. The mounting portion 76h can include a leadscrew 154h rotatably connected to a housing 80h. The housing 80h is fixedly connected to the support member 50h. A motor 196h that causes the leadscrew 154h to rotate can be fixedly connected to the housing 80h. Gearing 198h, 200h, 202h provided in a gearing portion 204h of the housing 80h operably connects the leadscrew 154h to the motor 196h. For example, the motor 196h can be connected to and, when actuated, rotate a first gear 198h with respect to the housing 80h. A second gear 200h can be rotatably mounted in the gearing portion and engage the first gear 198h so that rotation of the first gear 198h causes the second gear 200h to rotate relative to the housing 80h. A third gear 202h can be rotatably mounted in the gearing portion 204h and engage the second gear 200h so that rotation of the second gear 200h causes the third gear 202h to rotate relative to the housing 80h. The leadscrew 154h can be fixedly connected to the third gear 202h and rotate with the third gear 202h with respect to the housing 80h.

The driving portion 78h of the linear actuator 74h can include a leadscrew nut 156h that is connected and linearly movable relative to the leadscrew 154h. The leadscrew nut 156h can be adjacent to and/or engage an inner surface 206h of the housing 80h. The inner surface 206h of the housing 80h can thus help guide linear movement of the leadscrew nut 156h relative to the housing 80h and the leadscrew 154h. The linear actuator 74h can be electrically, hydraulically, and/or pneumatically powered. The linear actuator 74h can be electrically connected to a controller that actuates the linear actuator 74h when the vehicle occupant desires and/or when certain vehicle conditions are met, such as when the vehicle 12 is parked.

A first end 96h of the first link 88h is pivotably connected to a first end 122h of a connecting link 120h. The connecting link 120h can be formed separately from the leadscrew nut 156h and then connected to the leadscrew nut 156h, or connected to the leadscrew nut 156h by being formed with the leadscrew nut 156h as one piece. A second end 100h of the first link 88h is pivotably connected to a first end 102h of the first pivot extension 92h.

A first end 104h of the second link 90h is pivotably connected to a second end 124h of the connecting link 120h. A second end 106h of the second link 90h is pivotably connected to a first end 108*h* of the second pivot extension 94*h*. Second ends 110*h*, 112*h* of the first and second pivot extensions 92*h*, 94*h* are pivotably connected to the housing 80*h*.

Although the first ends 96*h*, 104*h* of the first and second links 88*h*, 90*h* are connected to the leadscrew nut 156*h* by the connecting link 120*h*, the connecting link 120*h* can be omitted and the first ends 96*h*, 104*h* can be directly connected to the leadscrew nut 156*h*.

As shown in FIGS. 40-41, with the steering wheel 14*h* in the steering position, actuation of the linear actuator 74*h* causes the first and second rim portions 26*h*, 28*h* to pivot relative to the support member 50*h* from the steering position to the folded position. Upon actuation of the linear actuator 74*h*, the leadscrew 154*h* rotates relative to the housing 80*h* and relative to the leadscrew nut 156*h*. Rotation of the leadscrew 154*h* linearly moves the leadscrew nut 156*h* along the leadscrew 154*h* toward the base portion 52*h* of the support member 50*h* relative to the leadscrew 154*h* and to the support member 50*h*. The first and second links 88*h*, 90*h* move toward the base portion 52*h* with the leadscrew nut 156*h*. The first pivot extension 92*h* pivots in the counterclockwise direction CCW relative to the support member 50*h* and the housing 80*h*. The second pivot extension 94*h* pivots in the clockwise direction CW relative to the support member 50*h* and the housing 80*h*.

As the first pivot extension 92*h* pivots relative to the support member 50*h* and the housing 80*h*, the first rim portion 26*h* pivots in the counterclockwise direction CCW relative to the support member from the steering position to the folded position. The first rim portion 26*h* pivots about a first pivot axis 114*h* relative to the support member 50*h* and the housing 80*h*. As the second pivot extension 94*h* pivots relative to the support member 50*h* and the housing 80*h*, the second rim portion 28*h* pivots in the clockwise direction CW relative to the support member 50*h* from the steering position to the folded position. The second rim portion 28*h* pivots about a second pivot axis 116*h* relative to the support member 50*h* and the housing 80*h*. The first and second pivot axes 114*h*, 116*h* extend generally parallel to each other and transverse to the steering axis 16*h*.

The linear actuator 74*h* can be actuated to reverse the above described process and cause the first and second rim portions 26*h*, 28*h* to pivot about the first and second pivot axes 114*h*, 116*h*, respectively, relative to the support member 50*h* and the housing 80*h* from the folded position to the steering position.

Although not shown in FIGS. 40-43, the housing 20, the airbag 22 and/or the inflator 24 can be fixedly connected to the support member 50*h* so that the housing 20, the airbag 22 and/or the inflator 24 do not linearly move relative to the support member 50*h* as the first and second rim portions 26*h*, 28*h* move between the folded and steering positions.

Figure 44:
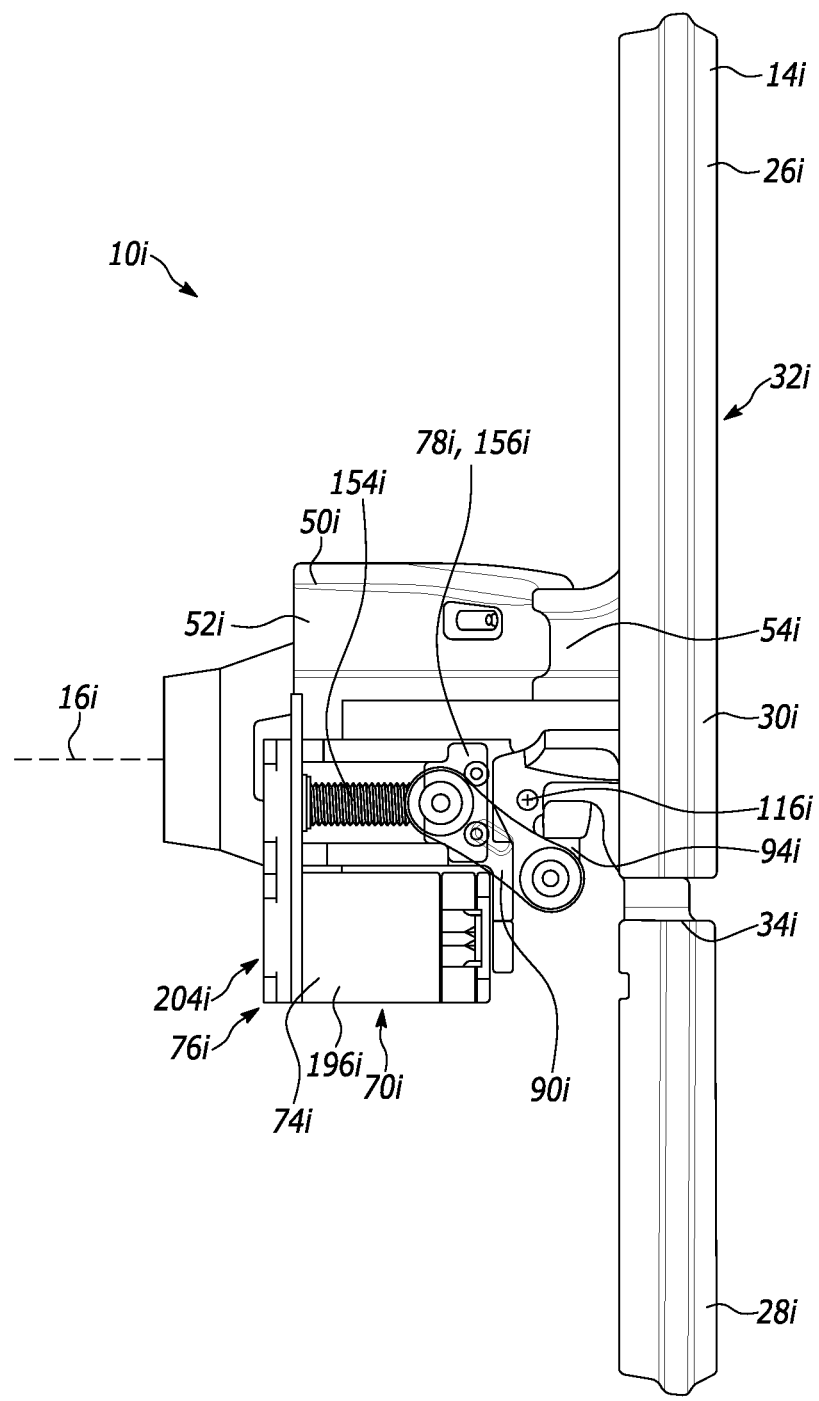
FIG. 44 is a schematic side view of an example configuration of the steering wheel assembly of FIG. 1, including the steering wheel in the first position.
Figure 45:
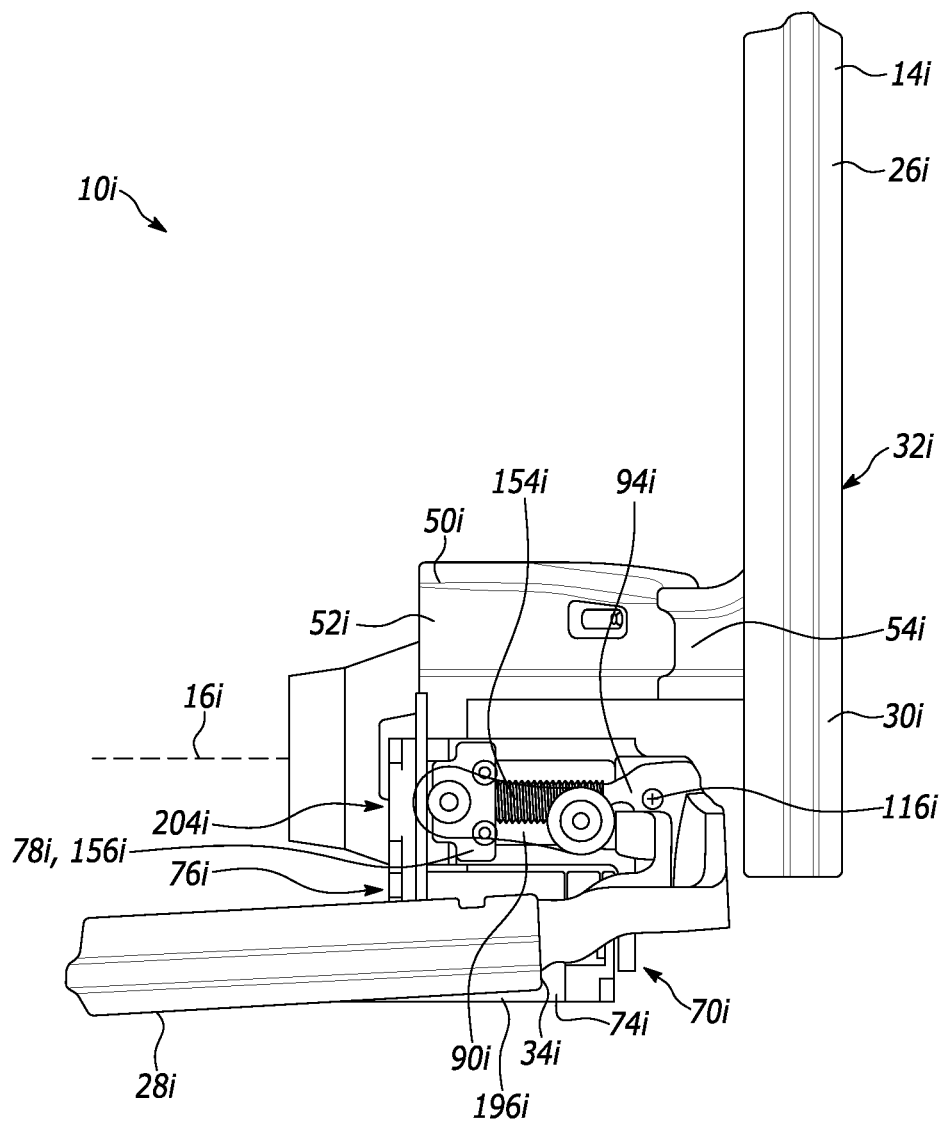
FIG. 45 is a schematic side view of the example configuration of the steering wheel assembly of FIG. 44, including the steering wheel in the second position.
Figure 46:
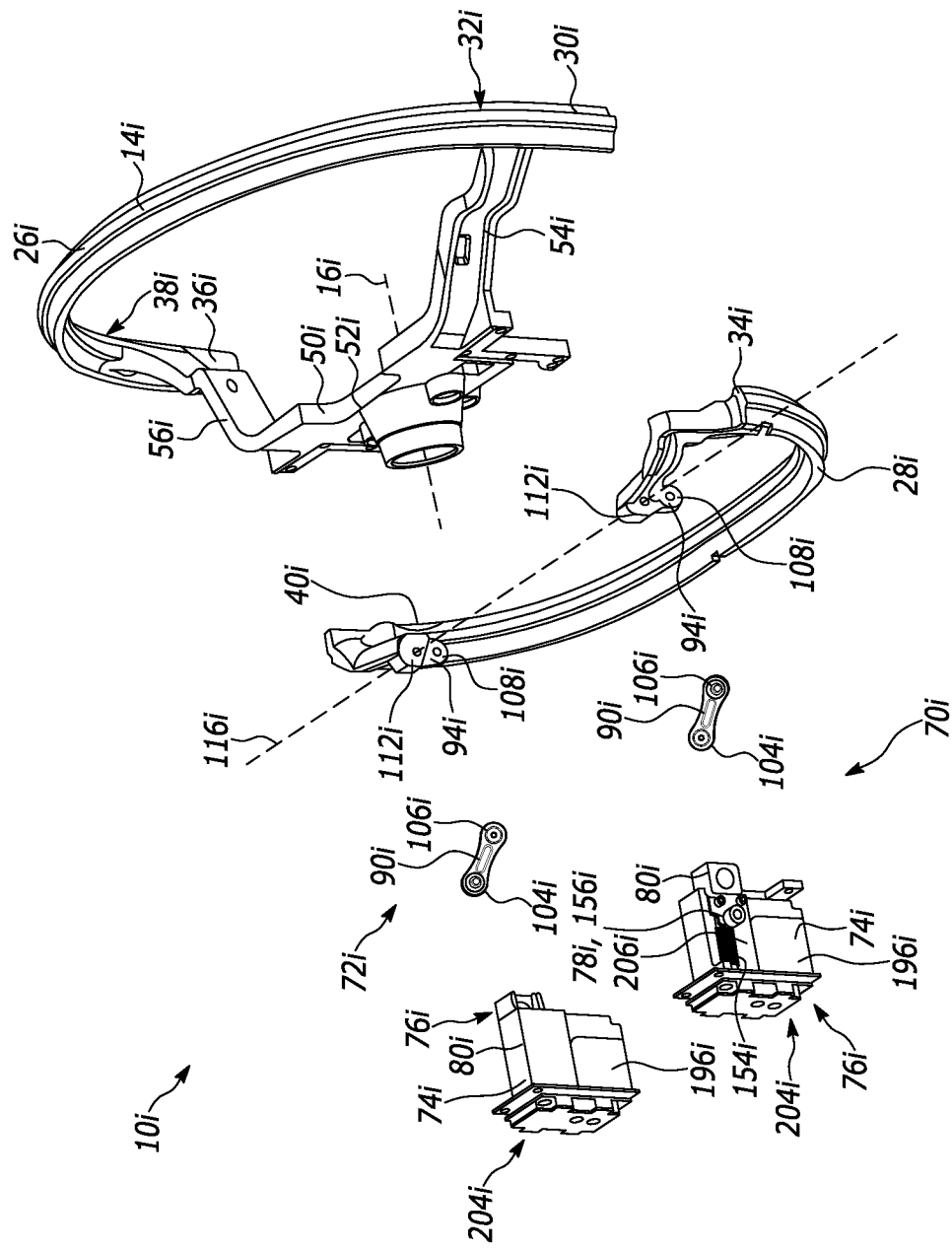
FIG. 46 is an exploded view of the steering wheel assembly of FIG. 44.

FIGS. 44-46 depict another example of the steering wheel assembly 10*i*. The steering wheel assembly 10*i* includes a support member 50*i* having a base portion 52*i* connectable to a steering column that extends through the dashboard or support surface 15. First and second support arms 54*i*, 56*i* extend from the base portion 52*i*. The first and second support arms 54*i*, 56*i* extend generally parallel to each other and the steering axis 16*i*.

A pivot extension 94*i* on a first end 34*i* of a second rim portion 28*i* of a steering wheel 14*i* pivotably connects the second rim portion 28*i* to the support member 50*i*. A pivot extension 94*i* on a second end 40*i* of the second rim portion 28*i* pivotably connects the second rim portion 28*i* to the support member 50*i*. A first central rim portion 30*i* is connected to the first support arm 54*i*. A second central rim portion 36*i* is connected to the second support arm 56*i*. A first end 32*i* of a first rim portion 26*i* of the steering wheel 14*i* is connected to the first central rim portion 30*i* and a second end 38*i* of the first rim portion 26*i* is connected to the second central rim portion 36*i*. The first rim portion 26*i* may be formed separately from and then connected to the first and second central rim portions 30*i*, 36*i*, or may be formed with the first and second central rim portions 30*i*, 36*i* as one piece.

The steering wheel 14*i* can be moved between the steering and folded positions by switching portions 70*i*, 72*i* of the steering wheel assembly 10*i*. As shown in FIG. 44-46, the steering wheel assembly 10*i* has a first switching portion 70*i* adjacent the first support arm 54*i* and a second switching portion 72*i* adjacent the second support arm 56*i*. The first and second switching portions 70*i*, 72*i* mirror one another and operate in a similar manner. Thus, for the sake of brevity, only the first switching portion 70*i* will be described below.

The first switching portion 70*i* includes a linear actuator 74*i* having a mounting portion 76*i* and a driving portion 78*i*. The mounting portion 76*i* can include a leadscrew 154*i* rotatably connected to a housing 80*i*. The housing 80*i* is fixedly connected to the support member 50*i*. A motor 196*i* that causes the leadscrew 154*i* to rotate can be fixedly connected to the housing 80*i*. Gearing provided in a gearing portion 204*i* of housing 80*i* operably connects the leadscrew 154*i* to the motor 196*i*. For example, the motor 196*i* can be connected to and, when actuated, rotate a first gear (which can be similar to the first gear 198*h*) with respect to the housing 80*i*. A second gear (which can be similar to the second gear 200*h*) can be rotatably mounted in the gearing portion 204*i* and engage the first gear in the gearing portion 204*i* so that rotation of the first gear causes the second gear to rotate relative to the housing 80*i*. A third gear (which can be similar to the third gear 202*h*) can be rotatably mounted in the gearing portion 204*i* and engage the second gear so that rotation of the second gear causes the third gear to rotate relative to the housing 80*i*. The leadscrew 154*i* can be fixedly connected to the third gear and rotate with the third gear with respect to the housing 80*i*.

The driving portion 78*i* of the linear actuator 74*i* can include a leadscrew nut 156*i* that is connected and linearly movable relative to the leadscrew 154*i*. The leadscrew nut 156*i* can be adjacent to and/or engage an inner surface 206*i* of the housing 80*i*. The inner surface 206*i* of the housing 80*i* can thus help guide linear movement of the leadscrew nut 156*i* relative to the housing 80*i* and the leadscrew 154*i*. The linear actuator 74*i* can be electrically, hydraulically, and/or pneumatically powered. The linear actuator 74*i* can be electrically connected to a controller that actuates the linear actuator 74*i* when the vehicle occupant desires and/or when certain vehicle conditions are met, such as when the vehicle 12 is parked.

A first end 104*i* of a link 90*i* is pivotably connected to the leadscrew nut 156*i*. A second end 106*i* of the link 90*i* is pivotably connected to a first end 108*i* of the pivot extension 94*i*. A second end 112*i* of the pivot extension 94*i* is pivotably connected to the housing 80*i*.

As shown in FIGS. 44-45, with the steering wheel 14*i* in the steering position, actuation of the linear actuator 74*i* causes the second rim portion 28*i* to pivot relative to the support member 50*i* from the steering position to the folded position. Upon actuation of the linear actuator 74*i*, the leadscrew 154*i* rotates relative to the housing 80*i* and relative to the leadscrew nut 156*i*. Rotation of the leadscrew 154*i* linearly moves the leadscrew nut 156*i* along the leadscrew 154*i* toward the base portion 52*i* of the support member 50*i* relative to the leadscrew 154*i* and to the support member 50*i*. The link 90*i* moves toward the base portion 52*i* with the leadscrew nut 156*i*. The pivot extension 94*i* pivots in the clockwise direction CW relative to the support member 50*i* and the housing 80*i*.

As the pivot extension 94*i* pivots relative to the support member 50*i* and the housing 80*i*, the second rim portion 28*i* pivots in the clockwise direction CW relative to the support member 50*i* from the steering position to the folded position. The second rim portion 28*i* pivots about a pivot axis 116*i* relative to the support member 50*i* and the housing 80*i*. The pivot axis 116*i* extends transverse to the steering axis 16*i*. As shown in FIG. 45, when the steering wheel 14*i* is in the folded position, the first rim portion 26*i* extends transverse to the steering axis 16*i* and the second rim portion 28*i* extends generally parallel to and/or in the same general direction as the steering axis 16*i*.

The linear actuator 74*i* can be actuated to reverse the above described process and cause the second rim portion 28*i* to pivot about the pivot axis 116*i* relative to the support member 50*i* and the housing 80*i* from the folded position to the steering position. Although not shown in FIGS. 44-46, the housing 20, the airbag 22 and/or the inflator 24 can be fixedly connected to the support member 50*i* so that the housing 20, the airbag 22 and/or the inflator 24 do not linearly move relative to the support member 50*i* as the second rim portion 28*i* moves between the folded and steering positions.

Although only the second rim portion 28*i* pivots when the steering wheel 14*i* moves between the folded and steering positions, the steering wheel assembly 10*i* can be adapted so that the first rim portion 26*i* pivots instead of the second rim portion 28*i*. Additionally, the steering wheel assembly 10*i* can be adapted so that the first and second central rim portions 30*i*, 36*i* pivot with either the first rim portion 26*i* or the second rim portion 28*i* when the steering wheel 14*i* moves between the folded and steering positions.

FIGS. 47-50 depict another example of the steering wheel assembly 10*j*. The steering wheel assembly 10*j* includes a support member 50*j* having a base portion 52*j* connectable to a steering column that extends through the dashboard or support surface 15. First and second support arms 54*j*, 56*j* extend from the base portion 52*j*. The first and second support arms 54*j*, 56*j* extend generally parallel to each other and the steering axis 16*j*.

A pivot extension 94*j* on a first end 34*j* of a second rim portion 28*j* of a steering wheel 14*j* pivotably connects the second rim portion 28*j* to the support member 50*j*. A pivot extension 94*j* on a second end 40*j* of the second rim portion 28*j* pivotably connects the second rim portion 28*j* to the support member 50*j*. A first central rim portion 30*j* is connected to the first support arm 54*j*. A second central rim portion 36*j* is connected to the second support arm 56*j*. A first end 32*j* of a first rim portion 26*j* of the steering wheel 14*j* is connected to the first central rim portion 30*j* and a second end 38*j* of the first rim portion 26*j* is connected to the second central rim portion 36*j*. The first rim portion 26*j* may be formed separately from and then connected to the first and second central rim portions 30*j*, 36*j*, or may be formed with the first and second central rim portions 30*j*, 36*j* as one piece.

The steering wheel 14*j* can be moved between the steering and folded positions by switching portions 70*j*, 72*j* of the steering wheel assembly 10*j*. As shown in FIG. 47-50, the steering wheel assembly 10*j* has a first switching portion 70*j* adjacent the first support arm 54*j* and a second switching portion 72*j* adjacent the second support arm 56*j*. The first and second switching portions 70*j*, 72*j* mirror one another and operate in a similar manner. Thus, for the sake of brevity, only the first switching portion 70*j* will be described below.

The first switching portion 70*j* includes a linear actuator 74*j* having a mounting portion 76*j* and a driving portion 78*j*. The mounting portion 76*j* can include a leadscrew 154*j* rotatably connected to a housing 80*j*. The housing 80*j* is fixedly connected to the support member 50*j*. A motor 196*j* that causes the leadscrew 154*j* to rotate can be fixedly connected to the housing 80*j* and/or to the support member 50*j*. The motor 196*j* can be a single motor that causes the leadscrew 154*j* of each of the first and second switching portions 70*j*, 72*j* to rotate.

Gearing 208*j*, 210*j*, 212*j*, 214*j*, 216*j*, 218*j* at least partially provided in or connected to a gearing portion 204*j* of the housing 80*j* operably connects the leadscrew 154*j* to the motor 196*j*. For example, the motor 196*j* can be connected to and, when actuated, rotate a driving portion 208*j* of a bevel gear 210*j* with respect to the housing 80*j*. A driven portion 212*j* of the bevel gear 210*j* can be rotatably mounted in the gearing portion 204*j* and engage the driving portion 208*j* so that rotation of the driving portion 208*j* causes the driven portion 212*j* to rotate relative to the housing 80*j*. The driven portion 212*j* is fixedly connected to an end of a transmission shaft 214*j* that is rotatably mounted in the gearing portion 204*j*. The transmission shaft 214*j* thus is rotatable with the driven portion 212*j* relative to the housing 80*j*. A first gear 216*j* is fixedly connected to the other end of the transmission shaft 214*j* and is rotatable with the transmission shaft 214*j*. A second gear 218*j* can be rotatably mounted in the gearing portion 204*j* and engage the first gear 216*j* so that rotation of the first gear 216*j* causes the second gear 218*j* to rotate relative to the housing 80*j*. The leadscrew 154*j* can be fixedly connected to the second gear 218*j* and rotate with the second gear 218*j* with respect to the housing 80*j*.

The driving portion 78*j* of the linear actuator 74*j* can include a leadscrew nut 156*j* that is connected and linearly movable relative to the leadscrew 154*j*. The leadscrew nut 156*j* can be adjacent to and/or engage an inner surface 206*j* of the housing 80*j*. The inner surface 206*j* of the housing 80*j* can thus help guide linear movement of the leadscrew nut 156*j* relative to the housing 80*j* and the leadscrew 154*j*. The linear actuator 74*j* can be electrically, hydraulically, and/or pneumatically powered. The linear actuator 74*j* can be electrically connected to a controller that actuates the linear actuator 74*j* when the vehicle occupant desires and/or when certain vehicle conditions are met, such as when the vehicle 12 is parked.

A first end 104*j* of a link 90*j* is pivotably connected to the leadscrew nut 156*j*. A second end 106*j* of the link 90*j* is pivotably connected to a first end 108*j* of the pivot extension 94*j*. A second end 112*j* of the pivot extensions 94*j* is pivotably connected to the housing 80*j*.

Figure 47:
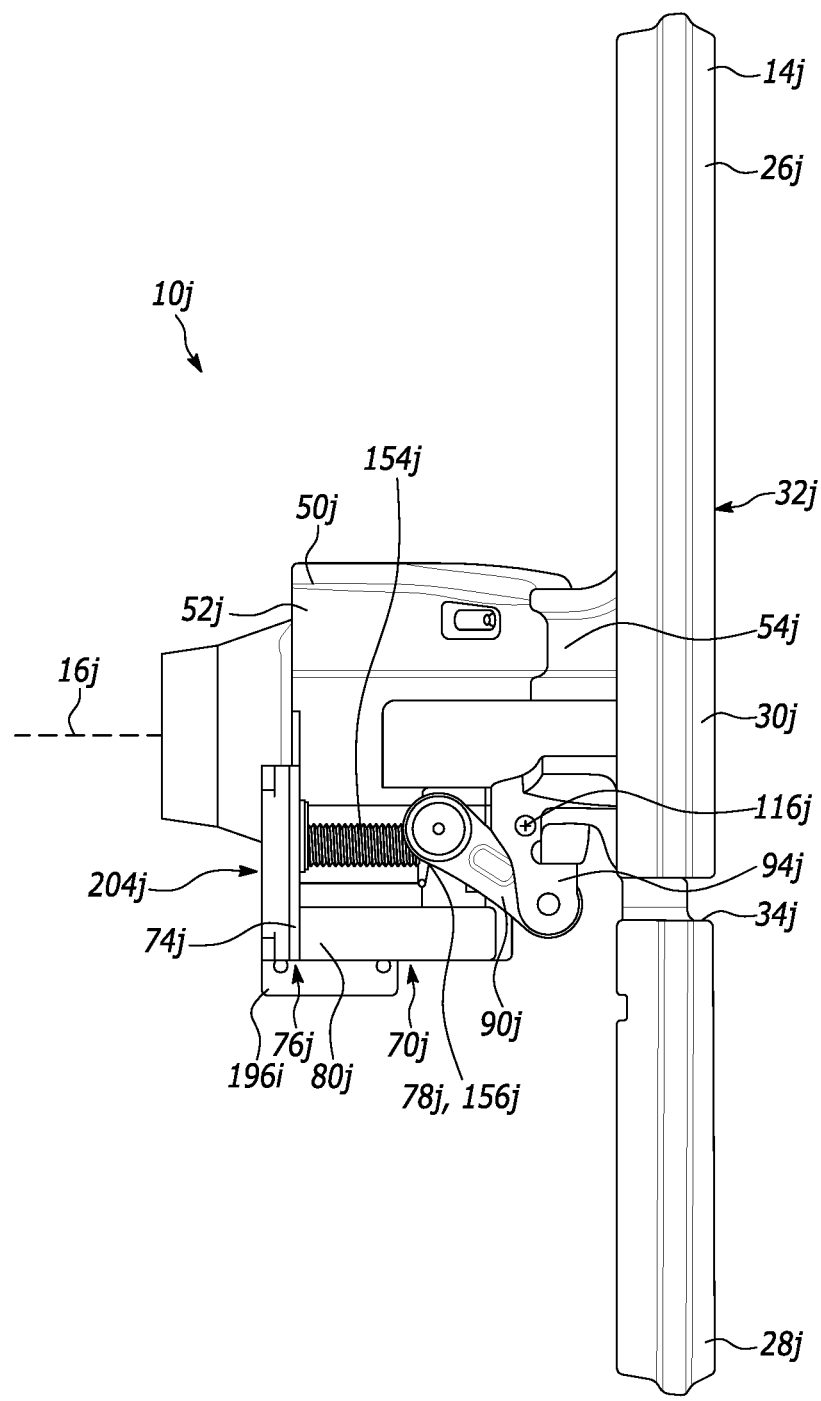
FIG. 47 is a schematic side view of an example configuration of the steering wheel assembly of FIG. 1, including the steering wheel in the first position.
Figure 48:
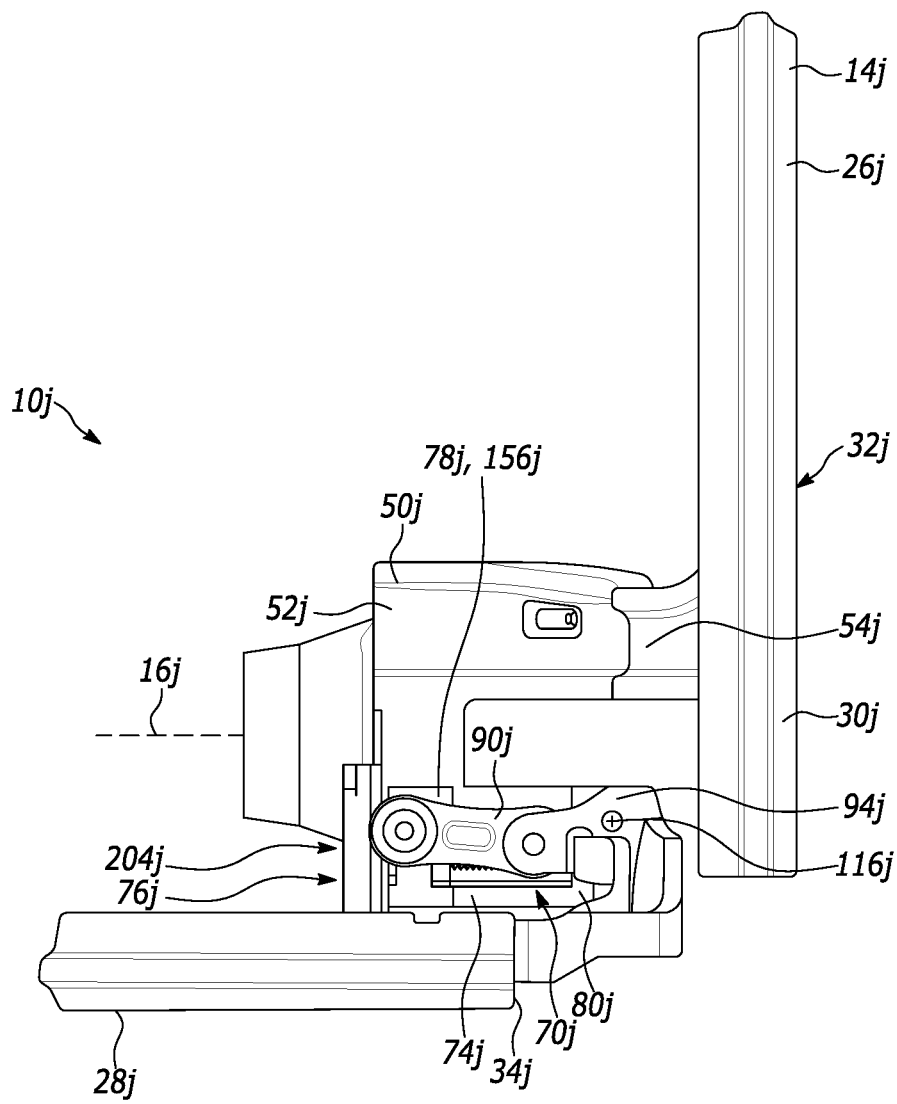
FIG. 48 is a schematic side view of the example configuration of the steering wheel assembly of FIG. 47, including the steering wheel in the second position.
Figure 49:
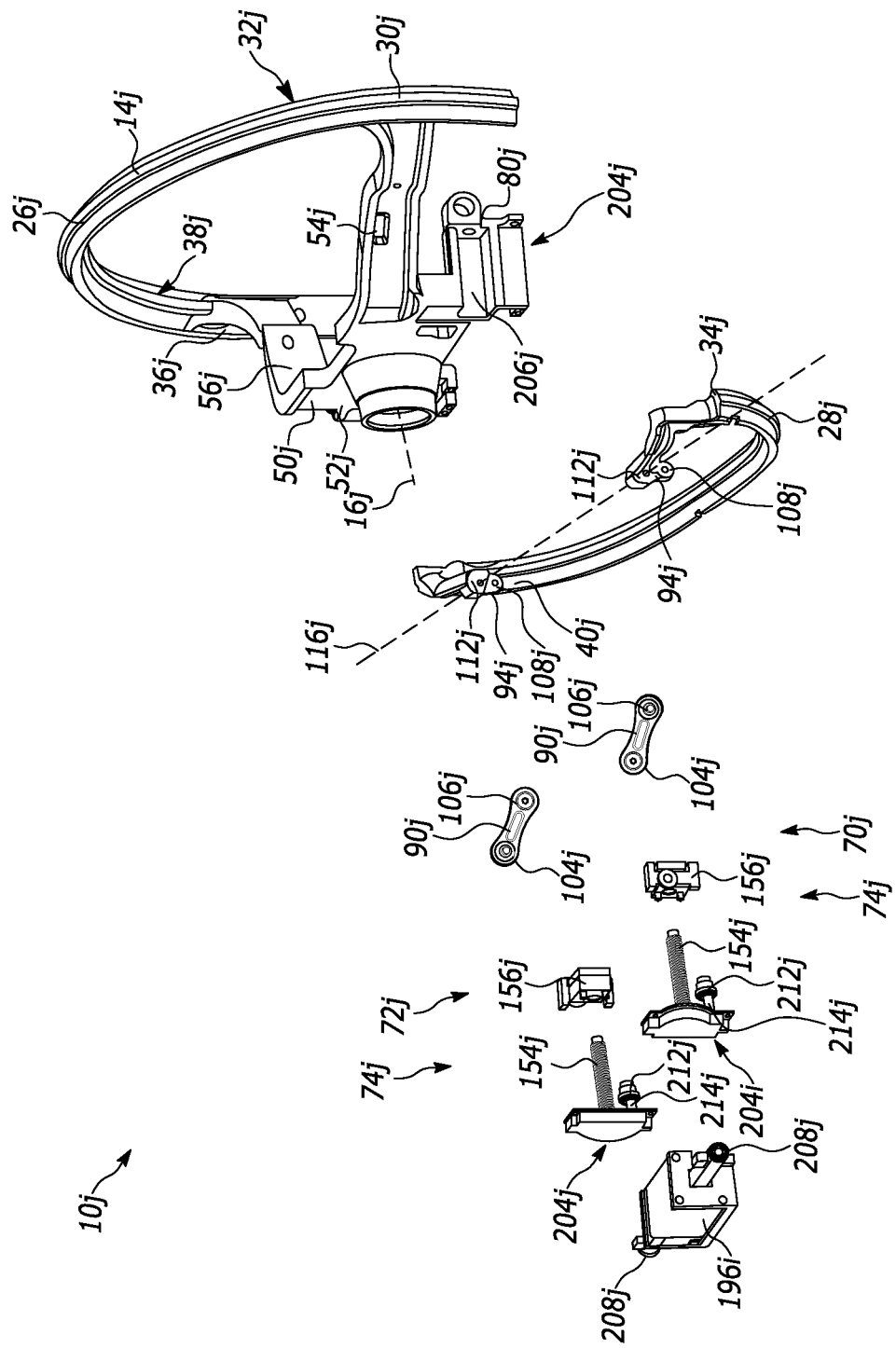
FIG. 49 is an exploded view of the steering wheel assembly of FIG. 47.
Figure 50:
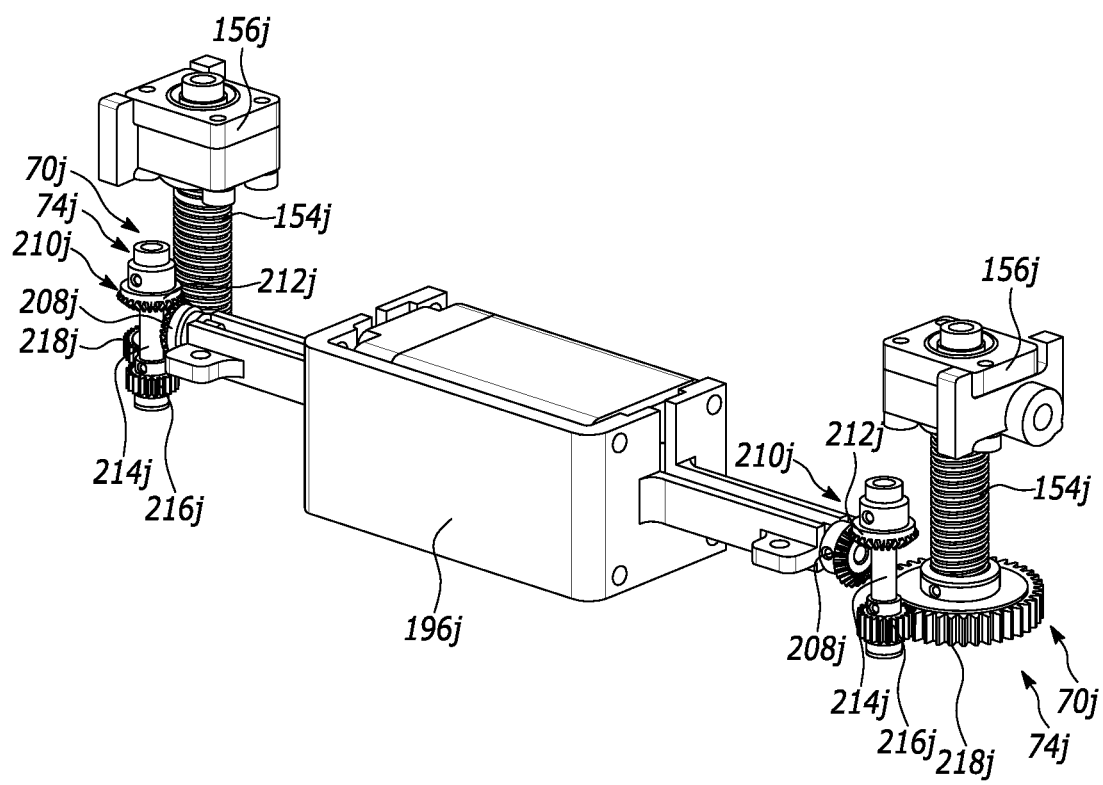
FIG. 50 is a schematic perspective top view of a portion of the steering wheel assembly of FIG. 47.

As shown in FIGS. 47-48, with the steering wheel 14*j* in the steering position, actuation of the linear actuator 74*j* causes the second rim portion 28*j* to pivot relative to the support member 50*j* from the steering position to the folded position. Upon actuation of the linear actuator 74*j*, the leadscrew 154*j* rotates relative to the housing 80*j* and relative to the leadscrew nut 156*j*. Rotation of the leadscrew 154*j* linearly moves the leadscrew nut 156*j* along the leadscrew 154*j* toward the base portion 52*j* of the support member 50*j* relative to the leadscrew 154*j* and to the support member 50j. The link 90j moves toward the base portion 52j with the leadscrew nut 156j. The pivot extension 94j pivots in the clockwise direction CW relative to the support member 50j and the housing 80j.

As the pivot extension 94j pivots relative to the support member 50j and the housing 80j, the second rim portion 28j pivots in the clockwise direction CW relative to the support member 50j from the steering position to the folded position. The second rim portion 28j pivots about a pivot axis 116j relative to the support member 50j and the housing 80j. The pivot axis 116j extends transverse to the steering axis 16j. As shown in FIG. 48, when the steering wheel 14j is in the folded position, the first rim portion 26j extends transverse to the steering axis 16j and the second rim portion 28j extends generally parallel to and/or in the same general direction as the steering axis 16j.

The linear actuator 74j can be actuated to reverse the above described process and cause the second rim portion 28j to pivot about the pivot axis 116j relative to the support member 50j and the housing 80j from the folded position to the steering position. Although not shown in FIGS. 47-50, the housing 20, the airbag 22 and/or the inflator 24 can be fixedly connected to the support member 50j so that the housing 20, the airbag 22 and/or the inflator 24 do not linearly move relative to the support member 50j as the second rim portion 28j moves between the folded and steering positions.

Although only the second rim portion 28j pivots when the steering wheel 14j moves between the folded and steering positions, the steering wheel assembly 10j can be adapted so that the first rim portion 26j pivots instead of the second rim portion 28j. Additionally, the steering wheel assembly 10j can be adapted so that the first and second central rim portions 30j, 36j pivot with either the first rim portion 26j or the second rim portion 28j when the steering wheel 14j moves between the folded and steering positions.

Figure 51:
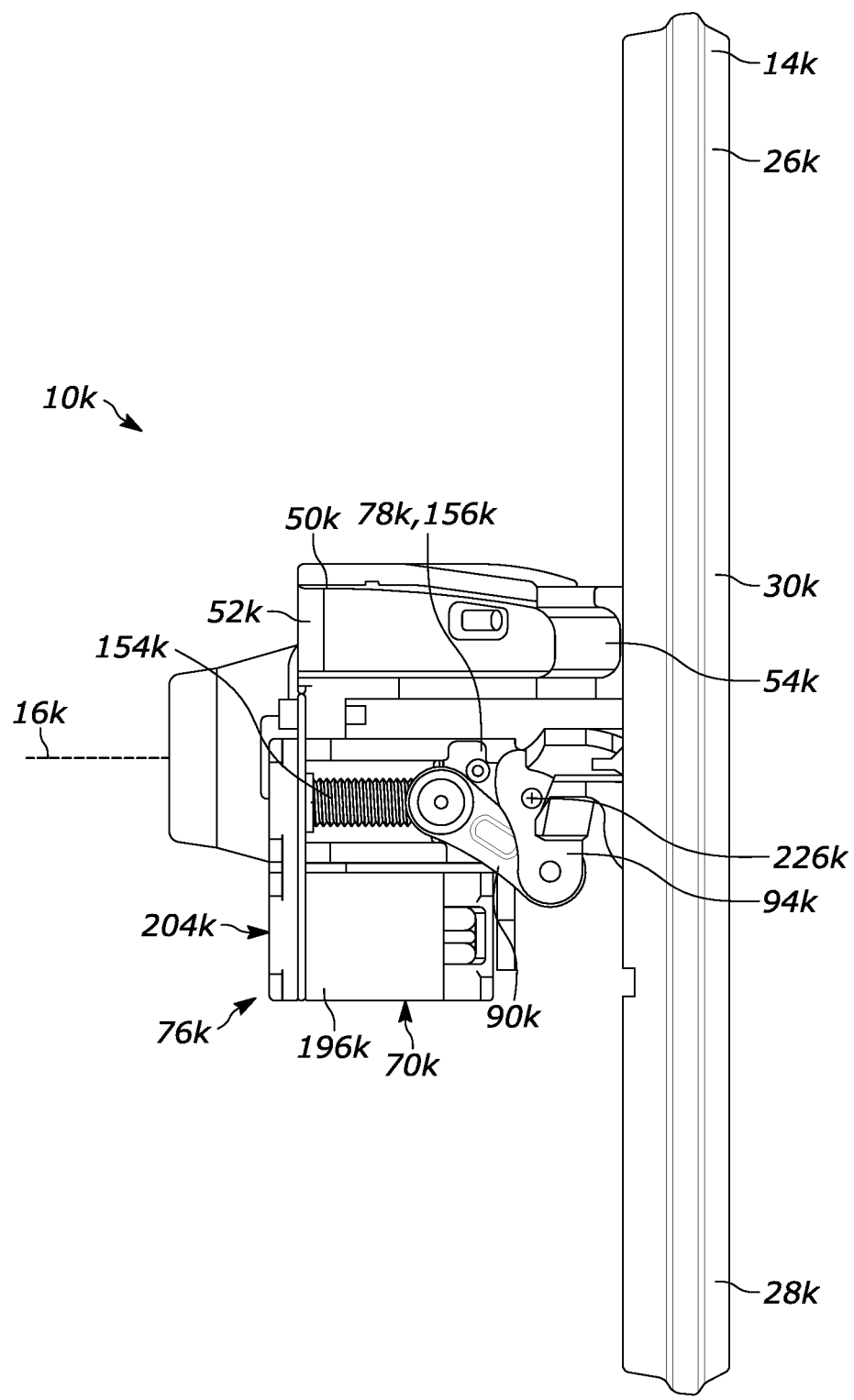
FIG. 51 is a schematic side view of an example configuration of the steering wheel assembly of FIG. 1, including the steering wheel in the first position.
Figure 52:
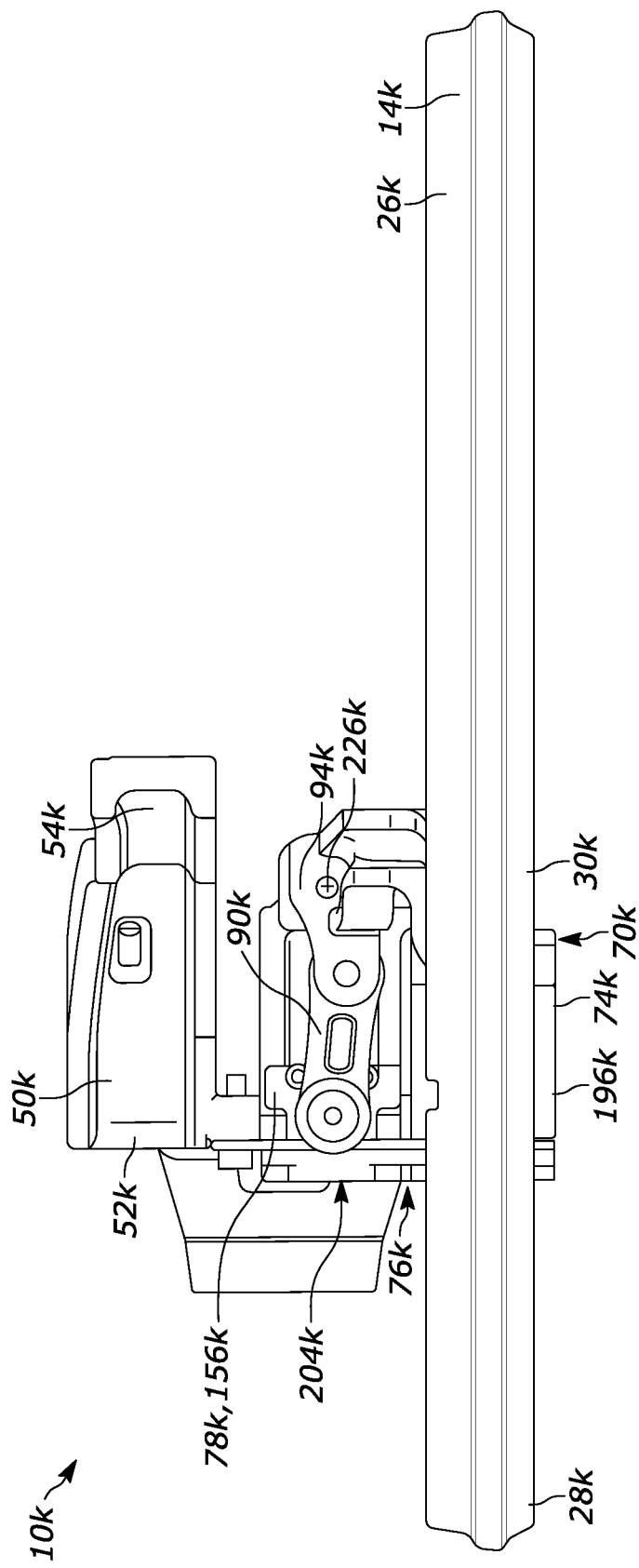
FIG. 52 is a schematic side view of the example configuration of the steering wheel assembly of FIG. 51, including the steering wheel in the second position.
Figure 53:
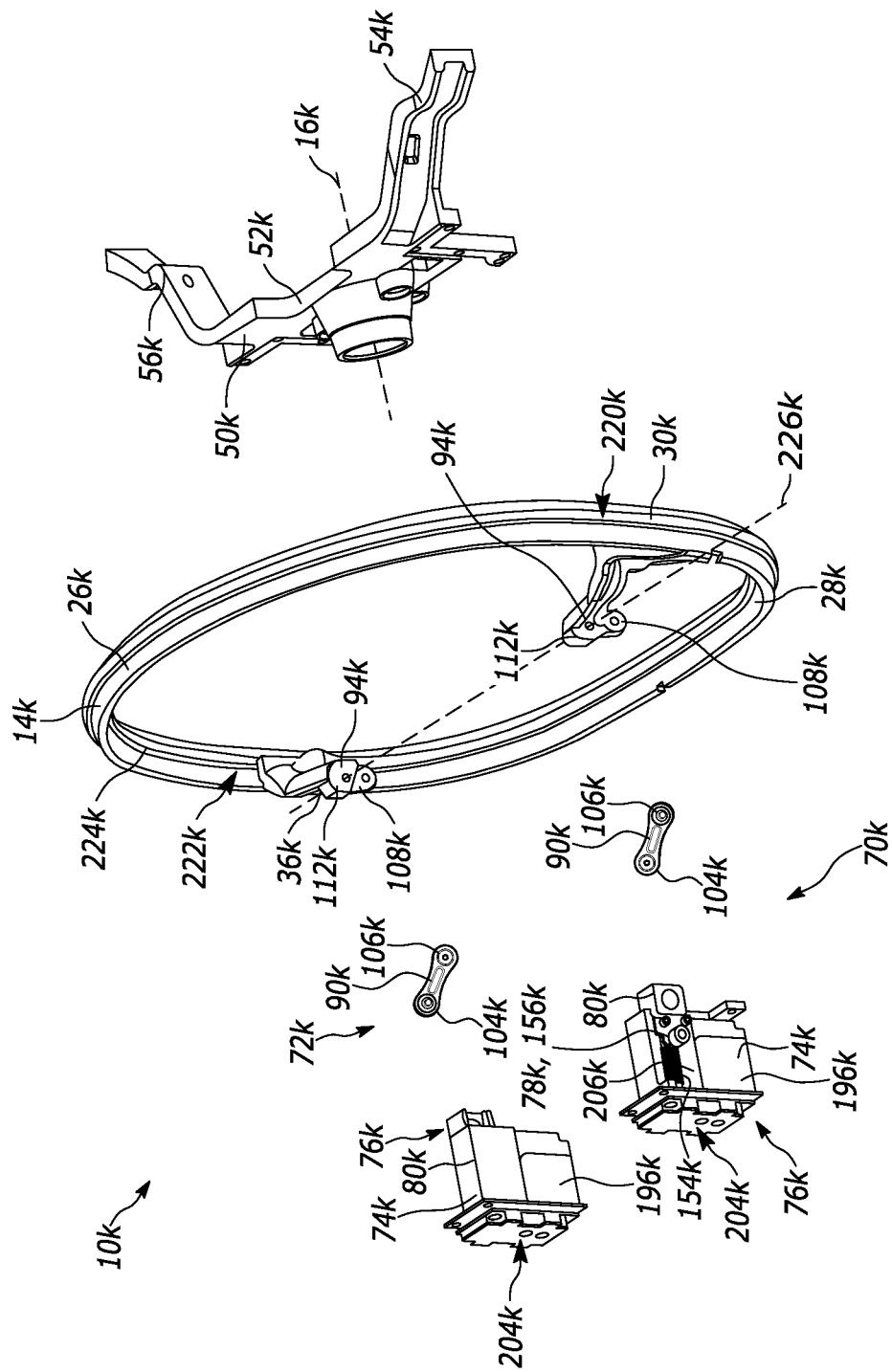
FIG. 53 is an exploded view of the steering wheel assembly of FIG. 51.

FIGS. 51-53 depict another example of the steering wheel assembly 10k. The steering wheel assembly 10k includes a support member 50k having a base portion 52k connectable to a steering column that extends through the dashboard or support surface 15. First and second support arms 54k, 56k extend from the base portion 52k. The first and second support arms 54k, 56k extend generally parallel to each other and the steering axis 16k.

Pivot extensions 94k attached to first and second sides 220k, 222k of a steering wheel 14k pivotably connect the steering wheel 14k to the support member 50k. Each of the pivot extensions 94k can be attached to an inner peripheral surface 224k of the steering wheel 14k at one or more of a first or upper rim portion 26k, a second or lower rim portion 28k (FIGS. 51-53), a first central rim portion 30k and a second central rim portion 36k. The first central rim portion 30k extends between the first and second rim portions 26k, 28k on the first side 220k of the steering wheel 14k, while the second central rim portion 36k extends between the first and second rim portions 26k, 28k on the second side 222k of the steering wheel 14k. The rim portions 26k, 28k, 30k, 36k and the pivot extensions 94k may be formed as one piece. Alternatively, one or more of the first rim portion 26k, the second rim portion 28k, the first central rim portion 30k, the second central rim portion 36k and the pivot extensions 94k may be formed separately and then connected to the other of the rim portions 26k, 28k, 30k, 36k and/or pivot extensions 94k. Although the steering wheel 14k is described as having a first or upper rim portion 26k, a second or lower rim portion 28k, a first central rim portion 30k and a second central rim portion 36k, it is contemplated that the steering wheel may have a desired shape and include any desired rim portions.

The steering wheel 14k can be moved between steering and folded positions by switching portions 70k, 72k of the steering wheel assembly 10k. As shown in FIGS. 51-53, the steering wheel assembly 10k has a first switching portion 70k adjacent the first support arm 54k and a second switching portion 72k adjacent the second support arm 56k. The first and second switching portions 70k, 72k mirror one another and operate in a similar manner. Thus, for the sake of brevity, only the first switching portion 70k will be described below.

The first switching portion 70k includes a linear actuator 74k having a mounting portion 76k and a driving portion 78k. The mounting portion 76k can include a leadscrew 154k rotatably connected to a housing 80k. The housing 80k is fixedly connected to the support member 50k. A motor 196k that causes the leadscrew 154k to rotate can be fixedly connected to the housing 80k. Gearing provided in a gearing portion 204k of the housing 80k operably connects the leadscrew 154k to the motor 196k. For example, the motor 196k can be connected to and, when actuated, rotate a first gear (which can be similar to the first gear 198h) with respect to the housing 80k. A second gear (which can be similar to the second gear 200h) can be rotatably mounted in the gearing portion 204k and engage the first gear in the gearing portion 204k so that rotation of the first gear causes the second gear to rotate relative to the housing 80k. A third gear (which can be similar to the third gear 202h) can be rotatably mounted in the gearing portion 204k and engage the second gear so that rotation of the second gear causes the third gear to rotate relative to the housing 80k. The leadscrew 154k can be fixedly connected to the third gear and rotate with the third gear with respect to the housing 80k.

The driving portion 78k of the linear actuator 74k can include a leadscrew nut 156k that is connected and linearly movable relative to the leadscrew 154k. The leadscrew nut 156k can be adjacent to and/or engage an inner surface 206k of the housing 80k. The inner surface 206k of the housing 80k can thus help guide linear movement of the leadscrew nut 156k relative to the housing 80k and the leadscrew 154k. The linear actuator 74k can be electrically, hydraulically, and/or pneumatically powered. The linear actuator 74k can be electrically connected to a controller that actuates the linear actuator 74k when the vehicle occupant desires and/or when certain vehicle conditions are met, such as when the vehicle 12 is parked.

A first end 104k of a link 90k is pivotably connected to the leadscrew nut 156k. A second end 106k of the link 90k is pivotably connected to a first end 108k of the pivot extension 94k. A second end 112k of the pivot extension 94k is pivotably connected to the housing 80k.

As shown in FIGS. 51-52, with the steering wheel 14k in the steering position, actuation of the linear actuator 74k causes the entirety of the steering wheel 14k (i.e., all of the rim portions 26k, 28k, 30k, 36k) to pivot relative to the support member 50k from the steering position to the folded position. Upon actuation of the linear actuator 74k, the leadscrew 154k rotates relative to the housing 80k and relative to the leadscrew nut 156k. Rotation of the leadscrew 154k linearly moves the leadscrew nut 156k along the leadscrew 154k toward the base portion 52k of the support member 50k relative to the leadscrew 154k and to the support member 50k. The link 90k moves toward the base portion 52k with the leadscrew nut 156k. The pivot extension 94k pivots in the clockwise direction CW relative to the support member 50k and the housing 80k.

As the pivot extension 94k pivots relative to the support member 50k and the housing 80k, the steering wheel 14k pivots in the clockwise direction CW relative to the support member 50k from the steering position to the folded position. All of the rim portions 26k, 28k, 30k, 36k thus pivot together as a single unit in the same direction (e.g., the clockwise direction) from the steering position to the folded position. The entirety of the steering wheel 14k pivots about a single pivot axis 226k relative to the support member 50k and the housing 80k. The pivot axis 226k extends transverse to the steering axis 16k. As shown in FIG. 52, when the steering wheel 14k is in the folded position, the steering wheel 14k and, thus, the rim portions 26k, 28k, 30k, 36k extend generally parallel to and/or in the same general direction as the steering axis 16k. It should also be appreciated that, the rim portions 26k, 28k, 30k, 36k, when in the folded position, can extend along a single plane that extends generally parallel to and/or in the same general direction as the steering axis 16k.

The linear actuator 74k can be actuated to reverse the above described process and cause the steering wheel 14k to pivot about the pivot axis 226k relative to the support member 50k and the housing 80k from the folded position to the steering position. As shown in FIG. 51, when the steering wheel 14k is in the steering position, the steering wheel 14k and, thus, the rim portions 26k, 28k, 30k, 36k extend transverse to the steering axis 16k. Although not shown in FIGS. 51-53, the housing 20, the airbag 22 and/or the inflator 24 can be fixedly connected to the support member 50k so that the housing 20, the airbag 22 and/or the inflator 24 do not linearly move relative to the support member 50k as the steering wheel 14k moves between the folded and steering positions.

FIGS. 54-57 depict another example of the steering wheel assembly 10m. The steering wheel assembly 10m includes a support member 50m having a base portion 52m connectable to a steering column that extends through the dashboard or support surface 15. First and second support arms 54m, 56m extend from the base portion 52m. The first and second support arms 54m, 56m extend generally parallel to each other and the steering axis 16m.

Pivot extensions 94m on first and second sides 220m, 222m of a steering wheel 14m pivotably connect the steering wheel 14m to the support member 50m. Each of the pivot extensions 94m can be attached to an inner peripheral surface 224m of the steering wheel 14m at one or more of a first or upper rim portion 26m, a second or lower rim portion 28m (FIGS. 54-56), a first central rim portion 30m and a second central rim portion 36m. The first central rim portion 30m extends between the first and second rim portions 26m, 28m on the first side 220m of the steering wheel 14m, while the second central rim portion 36m extends between the first and second rim portions 26m, 28m on the second side 222m of the steering wheel 14m. The rim portions 26m, 28m, 30m, 36m and the pivot extensions 94m may be formed as one piece. Alternatively, one or more of the first rim portion 26m, the second rim portion 28m, the first central rim portion 30m, the second central rim portion 36m and the pivot extensions 94m may be formed separately and then connected to the other of the rim portions 26m, 28m, 30m, 36m and/or pivot extensions 94m. Although the steering wheel 14m is described as having a first or upper rim portion 26m, a second or lower rim portion 28m, a first central rim portion 30m and a second central rim portion 36m, it is contemplated that the steering wheel may have a desired shape and include any desired rim portions.

The steering wheel 14m can be moved between steering and folded positions by switching portions 70m, 72m of the steering wheel assembly 10m. As shown in FIG. 54-57, the steering wheel assembly 10m has a first switching portion 70m adjacent the first support arm 54m and a second switching portion 72m adjacent the second support arm 56m. The first and second switching portions 70m, 72m mirror one another and operate in a similar manner. Thus, for the sake of brevity, only the first switching portion 70m will be described below.

The first switching portion 70m includes a linear actuator 74m having a mounting portion 76m and a driving portion 78m. The mounting portion 76m can include a leadscrew 154m rotatably connected to a housing 80m. The housing 80m is fixedly connected to the support member 50m. A motor 196m that causes the leadscrew 154m to rotate can be fixedly connected to the housing 80m and/or to the support member 50m. The motor 196m can be a single motor that causes the leadscrew 154m of each of the first and second switching portions 70m, 72m to rotate.

Gearing 208m, 210m, 212m, 214m, 216m, 218m at least partially provided in or connected to a gearing portion 204m of the housing 80m operably connects the leadscrew 154m to the motor 196m. For example, the motor 196m can be connected to and, when actuated, rotate a driving portion 208m of a bevel gear 210m with respect to the housing 80m. A driven portion 212m of the bevel gear 210m can be rotatably mounted in the gearing portion 204m and engage the driving portion 208m so that rotation of the driving portion 208m causes the driven portion 212m to rotate relative to the housing 80m. The driven portion 212m is fixedly connected to an end of a transmission shaft 214m that is rotatably mounted in the gearing portion 204m. The transmission shaft 214m thus is rotatable with the driven portion 212m relative to the housing 80m. A first gear 216m is fixedly connected to the other end of the transmission shaft 214m and is rotatable with the transmission shaft 214m. A second gear 218m can be rotatably mounted in the gearing portion 204m and engage the first gear 216m so that rotation of the first gear 216m causes the second gear 218m to rotate relative to the housing 80m. The leadscrew 154m can be fixedly connected to the second gear 218m and rotate with the second gear 218m with respect to the housing 80m.

The driving portion 78m of the linear actuator 74m can include a leadscrew nut 156m that is connected and linearly movable relative to the leadscrew 154m. The leadscrew nut 156m can be adjacent to and/or engage an inner surface 206m of the housing 80m. The inner surface 206m of the housing 80m can thus help guide linear movement of the leadscrew nut 156m relative to the housing 80m and the leadscrew 154m. The linear actuator 74m can be electrically, hydraulically, and/or pneumatically powered. The linear actuator 74m can be electrically connected to a controller that actuates the linear actuator 74m when the vehicle occupant desires and/or when certain vehicle conditions are met, such as when the vehicle 12 is parked.

A first end 104m of a link 90m is pivotably connected to the leadscrew nut 156m. A second end 106m of the link 90m is pivotably connected to a first end 108m of the pivot extension 94m. A second end 112m of the pivot extensions 94m is pivotably connected to the housing 80m.

Figure 54:
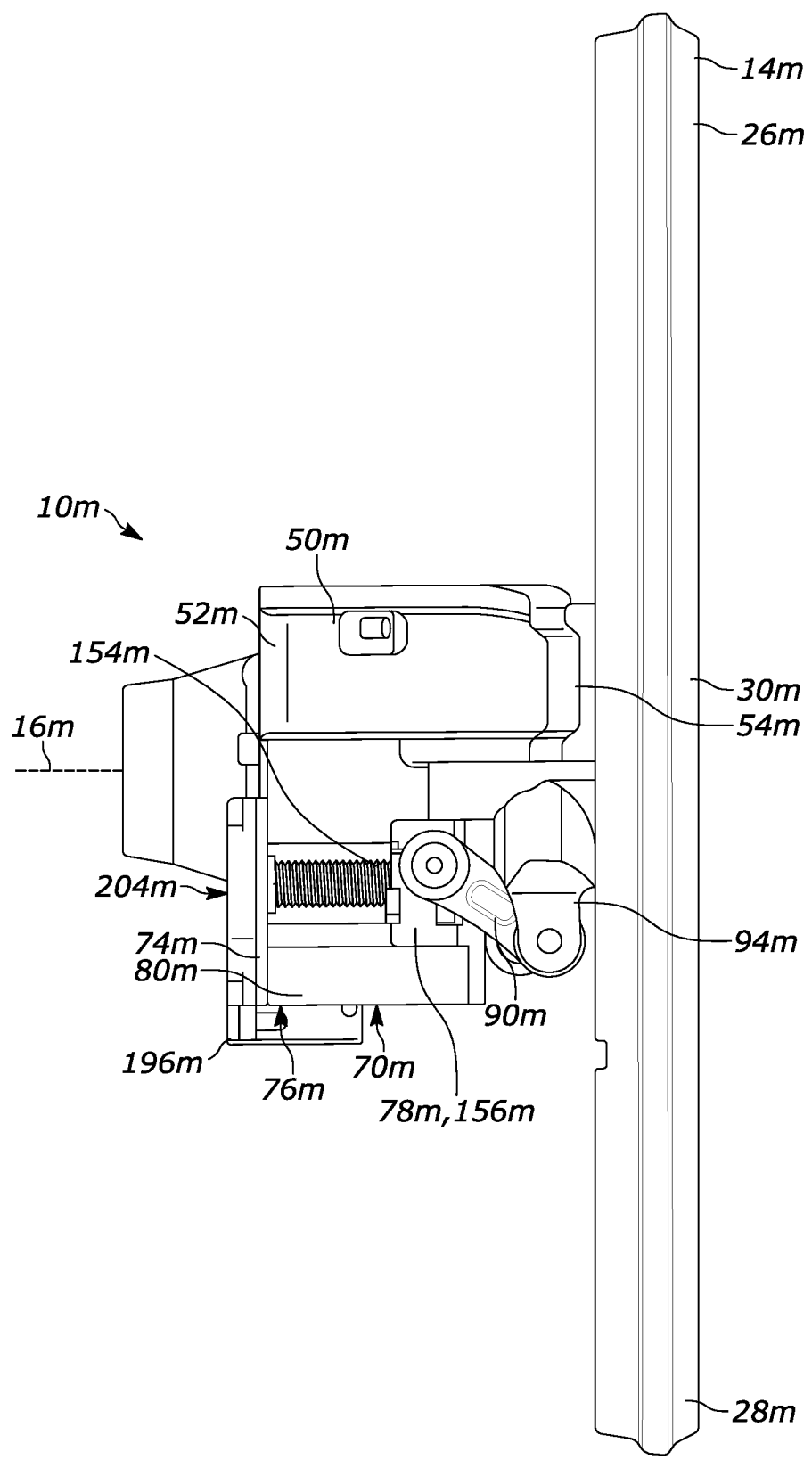
FIG. 54 is a schematic side view of an example configuration of the steering wheel assembly of FIG. 1, including the steering wheel in the first position.
Figure 55:
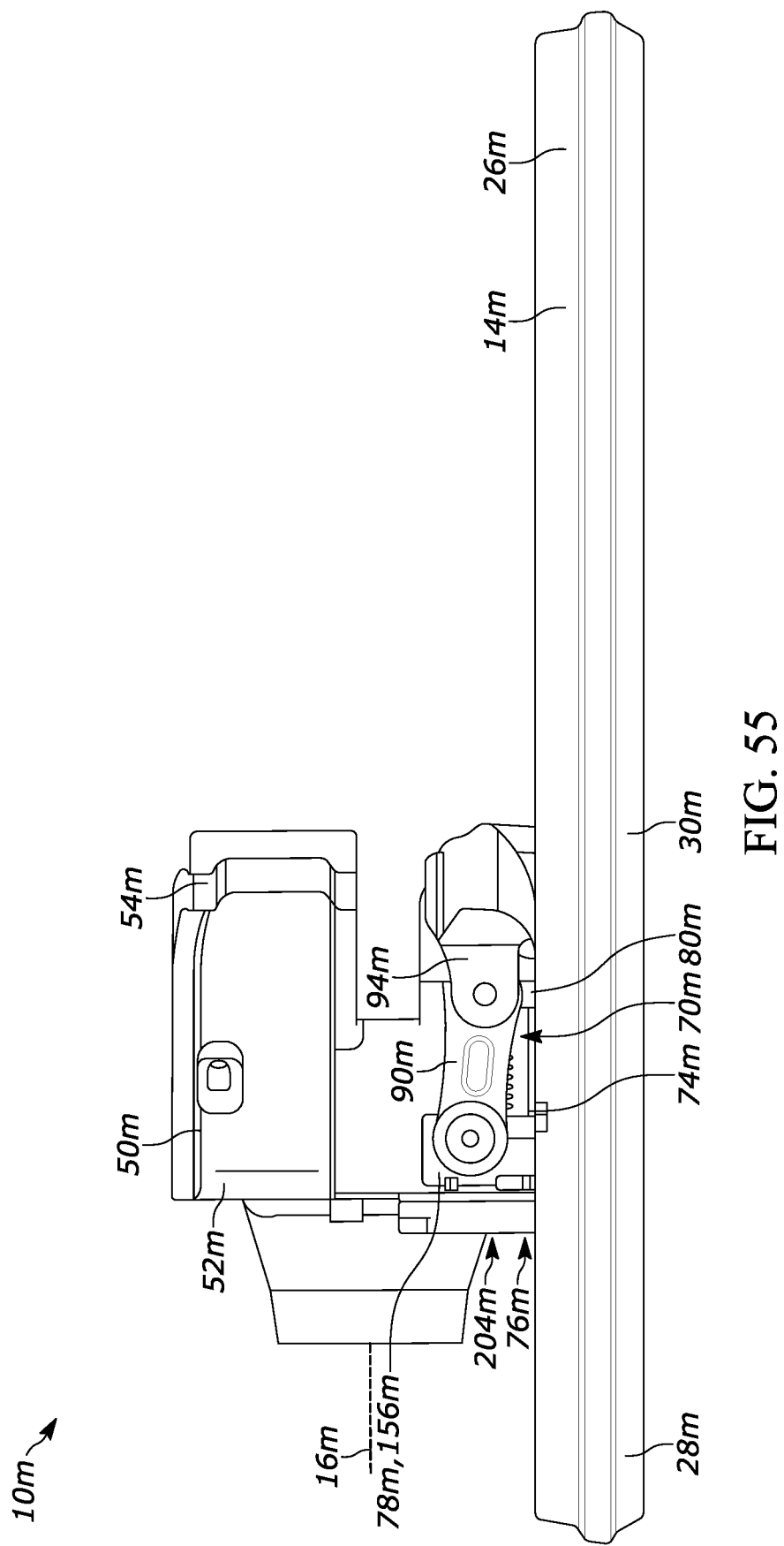
FIG. 55 is a schematic side view of the example configuration of the steering wheel assembly of FIG. 54, including the steering wheel in the second position.
Figure 56:
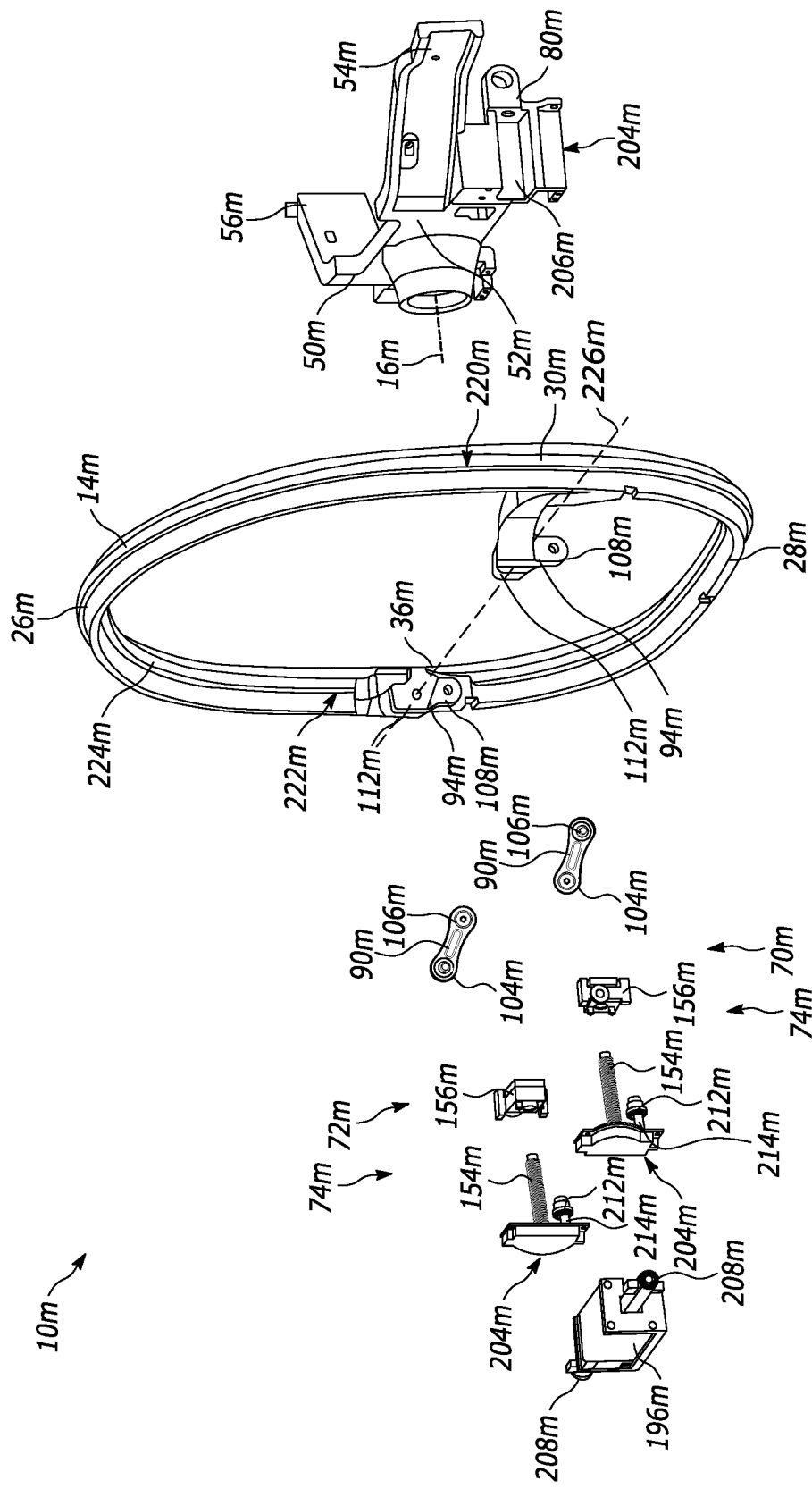
FIG. 56 is an exploded view of the steering wheel assembly of FIG. 54.

As shown in FIGS. 54-55, with the steering wheel 14m in the steering position, actuation of the linear actuator 74m causes the entirety of the steering wheel 14m (i.e., all of the rim portions 26k, 28k, 30k, 36k) to pivot relative to the support member 50m from the steering position to the folded position. Upon actuation of the linear actuator 74m, the leadscrew 154m rotates relative to the housing 80m and relative to the leadscrew nut 156m. Rotation of the leadscrew 154m linearly moves the leadscrew nut 156m along the leadscrew 154m toward the base portion 52m of the support member 50m relative to the leadscrew 154m and to the support member 50m. The link 90m moves toward the base portion 52m with the leadscrew nut 156m. The pivot extension 94m pivots in the clockwise direction CW relative to the support member 50m and the housing 80m.

As the pivot extension 94m pivots relative to the support member 50m and the housing 80m, the steering wheel 14m pivots in the clockwise direction CW relative to the support member 50m from the steering position to the folded position. All of the rim portions 26k, 28k, 30k, 36k thus pivot together as a single unit in the same direction (e.g., the clockwise direction) from the steering position to the folded position. The entirety of the steering wheel 14m pivots about a single pivot axis 226m relative to the support member 50m and the housing 80m. The pivot axis 226m extends transverse to the steering axis 16m. As shown in FIG. 55, when the steering wheel 14m is in the folded position, the steering wheel 14m and, thus, the rim portions 26m, 28m, 30m, 36m extend generally parallel to and/or in the same general direction as the steering axis 16m. It should also be appreciated that, the rim portions 26m, 28m, 30m, 36m, when in the folded position, can extend along a single plane that extends generally parallel to and/or in the same general direction as the steering axis 16m.

The linear actuator 74m can be actuated to reverse the above described process and cause the steering wheel 14m to pivot about the pivot axis 226m relative to the support member 50m and the housing 80m from the folded position to the steering position. As shown in FIG. 54, when the steering wheel 14m is in the steering position, the steering wheel 14m and, thus, the rim portions 26m, 28m, 30m, 36m extend transverse to the steering axis 16m. Although not shown in FIGS. 54-57, the housing 20, the airbag 22 and/or the inflator 24 can be fixedly connected to the support member 50m so that the housing 20, the airbag 22 and/or the inflator 24 do not linearly move relative to the support member 50m as the steering wheel 14m moves between the folded and steering positions.

From the above description of the invention, those skilled in the art will perceive improvements, changes and modifications. Such improvements, changes and modifications within the skill of the art are intended to be covered by the appended claims.

Having described the invention, the following is claimed:

1. A steering wheel assembly for a vehicle, comprising:
a support member connectable to a vehicle steering column;
a steering wheel having first and second rim portions, at least one of the first and second rim portions being pivotable about a pivot axis between a steering position and a folded position;
at least one linear actuator connected to the support member, the at least one linear actuator has a leadscrew and a leadscrew nut, the leadscrew being rotatable relative to the support member, the leadscrew nut being connected and linearly movable relative to the leadscrew, the leadscrew rotating relative to the leadscrew nut upon actuation of the at least one linear actuator, rotation of the leadscrew causing the leadscrew nut to linearly move on the leadscrew relative to the leadscrew;
a link having a first end connected to the leadscrew nut; and
a pivot extension connected to at least one of the first and second rim portions, a first end of the pivot extension being pivotably connected to a second end of the link, a second end of the pivot extension being connected to the support member, linear motion of the leadscrew nut causing the link to pivot the pivot extension relative to the support member, at least one of the first and second rim portions pivoting about the pivot axis relative to the support member as the pivot extension pivots relative to the support member.

2. The steering assembly recited in claim 1, wherein the at least one linear actuator is operably connected to the first and second rim portions, actuation of the at least one linear actuator pivoting the first rim portion about a first pivot axis and the second rim portions about a second pivot axis, the first and second pivot axes extending generally parallel to each other and transverse to a steering axis of the steering wheel.

3. The steering assembly recited in claim 1, wherein the at least one linear actuator includes a housing connected to the support member, the leadscrew being rotatably connected to the housing, and
the pivot extension is on an end of the first rim portion, the second end of the pivot extension being pivotably connected to the housing, linear motion of the leadscrew nut causing the link to pivot the pivot extension relative to the housing, the first rim portion pivoting relative to the support member about a first pivot axis as the pivot extension pivots relative to the housing, the steering assembly further comprising:
a second link having a first end connected to the leadscrew nut; and
a second pivot extension on an end of the second rim portion, a first end of the second pivot extension being pivotably connected to a second end of the second link, a second end of the second pivot extension being pivotably connected to the housing, linear motion of the leadscrew nut causing the second link to pivot the second pivot extension relative to the housing, the second rim portion pivoting about a second pivot axis relative to the support member as the second pivot extension pivots relative to the housing.

4. The steering assembly recited in claim 3, further comprising a connecting link for connecting the link and the second link to the leadscrew nut, the connecting link being connected to the leadscrew nut, the first ends of the link and the second link being pivotably connected to the connecting link.

5. The steering assembly recited in claim 1, wherein the at least one linear actuator includes a housing connected to the support member, the leadscrew being rotatably connected to the housing, and
the pivot extension is on an end of the second rim portion, the second end of the pivot extension being pivotably connected to the housing, linear motion of the leadscrew nut causing the link to pivot the pivot extension relative to the housing, the second rim portion pivoting about the pivot axis relative to the support member as the pivot extension pivots relative to the housing.

6. The steering assembly recited in claim 5, wherein the first rim portion is not pivotable, the first rim portion extending transverse to a steering axis and the second rim portion extending in the same general direction as the steering axis when the steering wheel is in the folded position.

7. The steering assembly recited in claim 1, wherein the at least one linear actuator further includes:
   a housing fixedly connected to the support member, the leadscrew being connected and rotatable relative to the housing; and
   a motor connected to the housing and/or the support member, the leadscrew being operably connected to the motor, the leadscrew rotating relative to the housing and the leadscrew nut upon actuation of the motor.

8. The steering assembly recited in claim 7, wherein the at least one linear actuator further includes:
   a first gear connected to the motor, the motor rotating the first gear with respect to the housing when actuated;
   a second gear rotatably mounted to the housing and engaging the first gear, rotation of the first gear causing the second gear to rotate relative to the housing; and
   a third gear rotatably mounted to the housing and engaging the second gear, rotation of the second gear causing the third gear to rotate relative to the housing, the leadscrew being fixedly connected to the third gear and rotatable with the third gear relative to the housing.

9. The steering assembly recited in claim 7, wherein the at least one linear actuator further includes:
   a bevel gear having a driving portion connected to and rotatable by the motor with respect to the housing, a driven portion of the bevel gear engaging the driving portion so that rotation of the driving portion causes the driven portion to rotate relative to the housing;
   a transmission shaft rotatably mounted to the housing, a first end of the transmission shaft having the driven portion of the bevel gear fixedly connected thereto, rotation of the driven portion causing the transmission shaft to rotate with the driven portion relative to the housing;
   a first gear fixedly connected to a second end of the transmission shaft and rotatable with the transmission shaft relative to the housing; and
   a second gear rotatably mounted to the housing and engaging the first gear, rotation of the first gear causing the second gear to rotate relative to the housing, the leadscrew being fixedly connected to the second gear and rotatable with the second gear relative to the housing.

10. The steering assembly recited in claim 1, wherein the pivot extension is on an end of the second rim portion, the second rim portion pivoting about the pivot axis relative to the support member as the pivot extension pivots relative to the support member, the first rim portion not being pivotable.

11. The steering assembly recited in claim 1, wherein the pivot extension is connected to both the first and second rim portions of the steering wheel, the first and second rim portions pivoting together as a single unit about a single pivot axis relative to the support member as the pivot extension pivots relative to the support member.

12. The steering assembly recited in claim 11, wherein the at least one linear actuator pivots the entirety of the steering wheel about the single pivot axis.

13. The steering assembly recited in claim 11, wherein when the steering wheel is in the folded position, the first and second rim portions extend along a single plane in the same general direction as a steering axis, the first and second rim portions extending transverse to the steering axis when the steering wheel is in the steering position.

14. The steering wheel assembly recited in claim 1, wherein the at least one linear actuator includes a motor, actuation of the motor rotating the leadscrew relative to the leadscrew nut.

15. The steering wheel assembly recited in claim 1, further comprising an airbag module including:
   a housing fixedly connected to the support member;
   an airbag inflatable from a stored condition in which the airbag is stored in the housing to a deployed condition, the airbag being configured to be positioned between a vehicle occupant and the steering wheel when in the deployed condition; and
   an inflator in the housing and configured to provide inflation fluid to the airbag.

16. A steering wheel assembly for a vehicle, comprising:
   a support member connectable to a vehicle steering column;
   a steering wheel having first and second rim portions;
   at least one linear actuator including a mounting portion connected to the support member and a driving portion connected and linearly movable relative to the mounting portion;
   a link having a first end connected to the driving portion; and
   a pivot extension attached to the steering wheel, a first end of the pivot extension being pivotably connected to a second end of the link, a second end of the pivot extension being pivotably connected to the mounting portion, actuation of the linear actuator causing the driving portion to move linearly relative to the mounting portion, linear motion of the driving portion causing the link to pivot the pivot extension relative to the mounting portion, the first and second rim portions pivoting together as a single unit about a single pivot axis relative to the support member between steering and folded positions as the pivot extension pivots relative to the mounting portion.

17. The steering assembly recited in claim 16, wherein the mounting portion includes a leadscrew and the driving portion includes a leadscrew nut, the leadscrew being rotatable relative to the support member, the leadscrew nut being connected and linearly movable relative to the leadscrew, the steering wheel being operably connected to the leadscrew nut via the link and the pivot extension, the leadscrew rotating relative to the leadscrew nut upon actuation of the at least one linear actuator, rotation of the leadscrew causing the leadscrew nut to linearly move on the leadscrew relative to the leadscrew, linear motion of the leadscrew nut causing the first and second rim portions to pivot about the single pivot axis.

18. The steering assembly recited in claim 17, wherein the mounting portion is a housing connected to the support member, the leadscrew being rotatably connected to the housing.

19. A steering wheel assembly, comprising:
   a support member connectable to a vehicle steering column;
   a steering wheel having first and second rim portions, at least one of the first and second rim portions being pivotable about a pivot axis between a steering position and a folded position;
   at least one linear actuator connected to the support member and operably connected to at least one of the first and second rim portions, actuation of the linear actuator pivoting at least one of the first and second rim portions about the pivot axis; and at least one flexible insert overlying and covering a portion of the steering wheel assembly, the at least one flexible insert flexing as the steering wheel is pivoted between the steering and folding positions.

20. A steering wheel assembly for a vehicle, comprising:

a support member having a base portion connectable to a vehicle steering column and first and second support arms extending substantially in the same direction as a steering axis from the base portion;

a steering wheel rotatable about the steering axis and having first and second rim portions, at least one of the first and second rim portions being pivotable about a pivot axis between a steering position and a folded position, each of the first and second rim portions having a first end adjacent the first support arm and a second end adjacent the second support arm, the pivot axis of at least one of the first and second rim portions extending through the first and second ends of at least one of the first and second rim portions;

at least one first linear actuator having a first mounting portion connected to the support member adjacent the first support arm and a first driving portion operably connected to the first end of at least one of the first and second rim portions; and at least one second linear actuator having a second mounting portion connected to the support member adjacent the second support arm and a second driving portion operably connected to the second end of at least one of the first and second rim portions, linear motion of the second driving portion relative to the second mounting portion and the first driving portion relative to the first mounting portion pivoting at least one of the first and second rim portions between the steering and folded positions.

* * * * *